US008509593B2

(12) United States Patent
Okubo et al.

(10) Patent No.: US 8,509,593 B2
(45) Date of Patent: Aug. 13, 2013

(54) RECORDING MEDIUM, PLAYBACK APPARATUS, RECORDING APPARATUS, PLAYBACK METHOD, RECORDING METHOD, AND PROGRAM

(75) Inventors: Masafumi Okubo, Osaka (JP); Tomokazu Kanamaru, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/562,442

(22) Filed: Jul. 31, 2012

(65) Prior Publication Data

US 2012/0294585 A1    Nov. 22, 2012

Related U.S. Application Data

(63) Continuation-in-part of application No. 12/490,649, filed on Jun. 24, 2009, now Pat. No. 8,265,453.

(60) Provisional application No. 61/109,618, filed on Oct. 30, 2008.

(30) Foreign Application Priority Data

Jun. 26, 2008    (JP) .................................. 2008-166807

(51) Int. Cl.
H04N 9/80    (2006.01)
(52) U.S. Cl.
USPC .......................................................... 386/241
(58) Field of Classification Search
USPC ................................................. 386/200, 241
See application file for complete search history.

(56) References Cited

U.S. PATENT DOCUMENTS

| | | |
|---|---|---|
| 2002/0110058 A1 | 8/2002 | Hamada et al. |
| 2004/0027890 A1 | 2/2004 | Nakanishi et al. |
| 2005/0248561 A1 | 11/2005 | Ito et al. |
| 2006/0078301 A1 | 4/2006 | Ikeda et al. |
| 2006/0140091 A1 | 6/2006 | Iwamoto et al. |
| 2007/0223876 A1 | 9/2007 | Hashimoto et al. |
| 2007/0286576 A1 | 12/2007 | Ikeda et al. |
| 2008/0008450 A1 | 1/2008 | Ikeda et al. |
| 2008/0018731 A1 | 1/2008 | Era |
| 2008/0025697 A1 | 1/2008 | Ikeda et al. |
| 2008/0031601 A1 | 2/2008 | Hashimoto et al. |
| EP 1863032 | 12/2007 | |

(Continued)

FOREIGN PATENT DOCUMENTS

| EP | 1501316 | 1/2005 |
|---|---|---|
| EP | 1818932 | 8/2007 |

(Continued)

OTHER PUBLICATIONS

Extended European Search Report from E.P.O. in EP Pat. Appl. No. 09769908.6, mail date is Nov. 28, 2011.
International Search Repot that issued with respect to patent family member International Patent Application No. PCT/JP2009/002905, mail date is Sep. 29, 2009.

Primary Examiner — Huy T Nguyen
(74) Attorney, Agent, or Firm — Greenblum & Bernstein, P.L.C.

(57) ABSTRACT

A BD-ROM has recorded thereon: a plurality of subtitle streams each configured for playback in sync with a video stream; and PlayList information. The PlayList information includes PlayItem information and a display method flag. The PlayItem information defines a playback section with information indicating In_time and Out_time of a playback time axis of the video stream and includes a stream information table. The display method flag indicates whether or not control according to a subtitle display method is valid. The stream information table specifies to, a playback apparatus, one of the subtitle streams to be selected if the control according to the subtitle display method is valid.

6 Claims, 49 Drawing Sheets

(56) References Cited

U.S. PATENT DOCUMENTS

| | | |
|---|---|---|
| 2008/0232772 A1 | 9/2008 | Ikeda et al. |
| 2008/0232773 A1 | 9/2008 | Ikeda et al. |
| 2008/0232774 A1 | 9/2008 | Ikeda et al. |
| 2009/0087169 A1 | 4/2009 | Nakanishi et al. |
| 2009/0142041 A1 | 6/2009 | Nagasawa et al. |
| 2009/0279867 A1 | 11/2009 | Hamada et al. |

FOREIGN PATENT DOCUMENTS

| | | |
|---|---|---|
| JP | 10-208446 | 8/1998 |
| JP | 2001-333335 | 11/2001 |
| JP | 2003-100055 | 4/2003 |
| JP | 2005-252989 | 9/2005 |
| WO | 2004/082297 | 9/2004 |

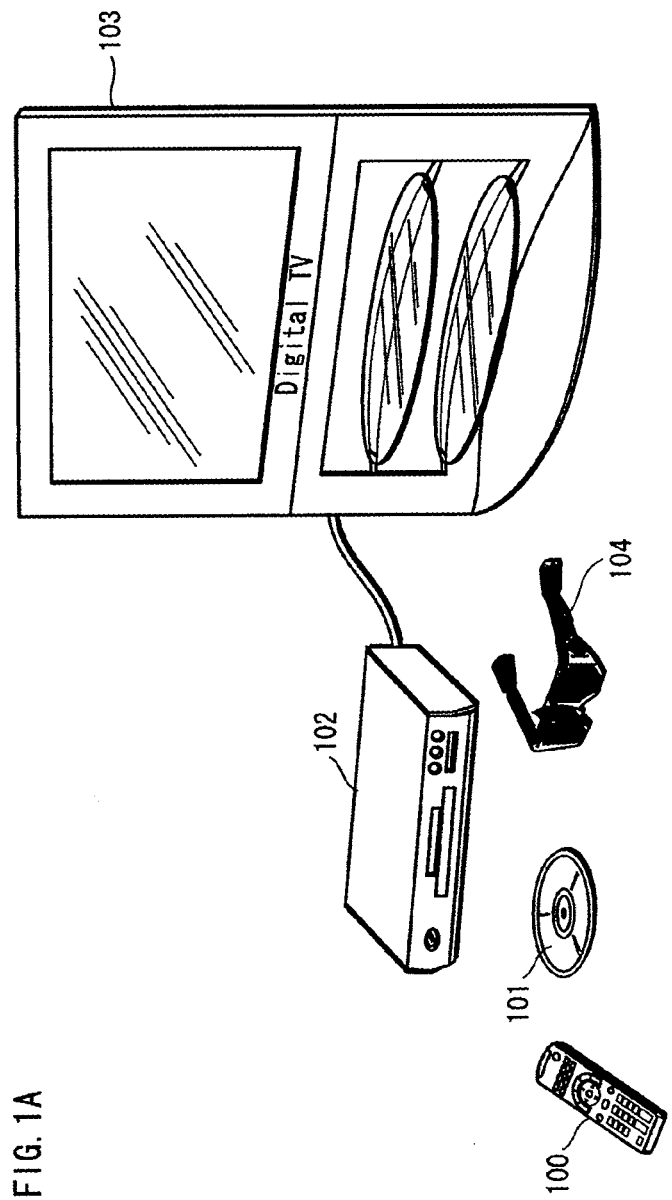
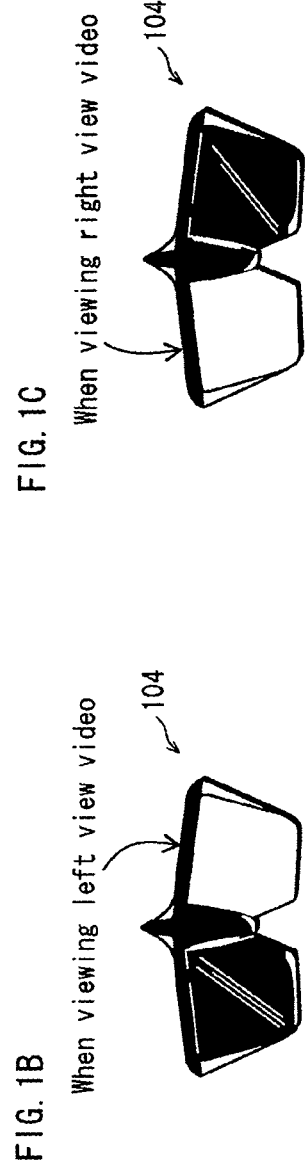
FIG. 1A
FIG. 1B When viewing left view video
FIG. 1C When viewing right view video

FIG. 6A

| PID range | PES stream type |
|---|---|
| 0x0100 | Program map |
| 0x1001 | PCR |
| 0x1011 | BaseView video (L or R) |
| 0x1012 | EnhancedView video (L or R) |
| 0x1100-0x111F | Audio |
| 0x1220-0x123F | BaseView subtitle graphics (L or R) |
| 0x1240-0x125F | EnhancedView subtitle graphics (L or R) |
| ⋮ | ⋮ |
| 0x1800 | Text subtitles |

FIG. 6B

Source packet sequence of BaseView

| Video =0x 1011 | Video =0x 1011 | Audio =0x 1100 | Audio =0x 1100 | PG =0x 1220 | PG =0x 1221 | PG =0x 1222 | PG =0x 1223 | PG =0x 1224 | PG =0x 1225 | PG =0x 1226 |
|---|---|---|---|---|---|---|---|---|---|---|

Source packet sequence of EnhancedView

| Video =0x 1012 | Video =0x 1012 | Audio =0x 1101 | Audio =0x 1101 | PG =0x 1240 | PG =0x 1241 | PG =0x 1242 | PG =0x 1243 | PG =0x 1244 | PG =0x 1245 |
|---|---|---|---|---|---|---|---|---|---|

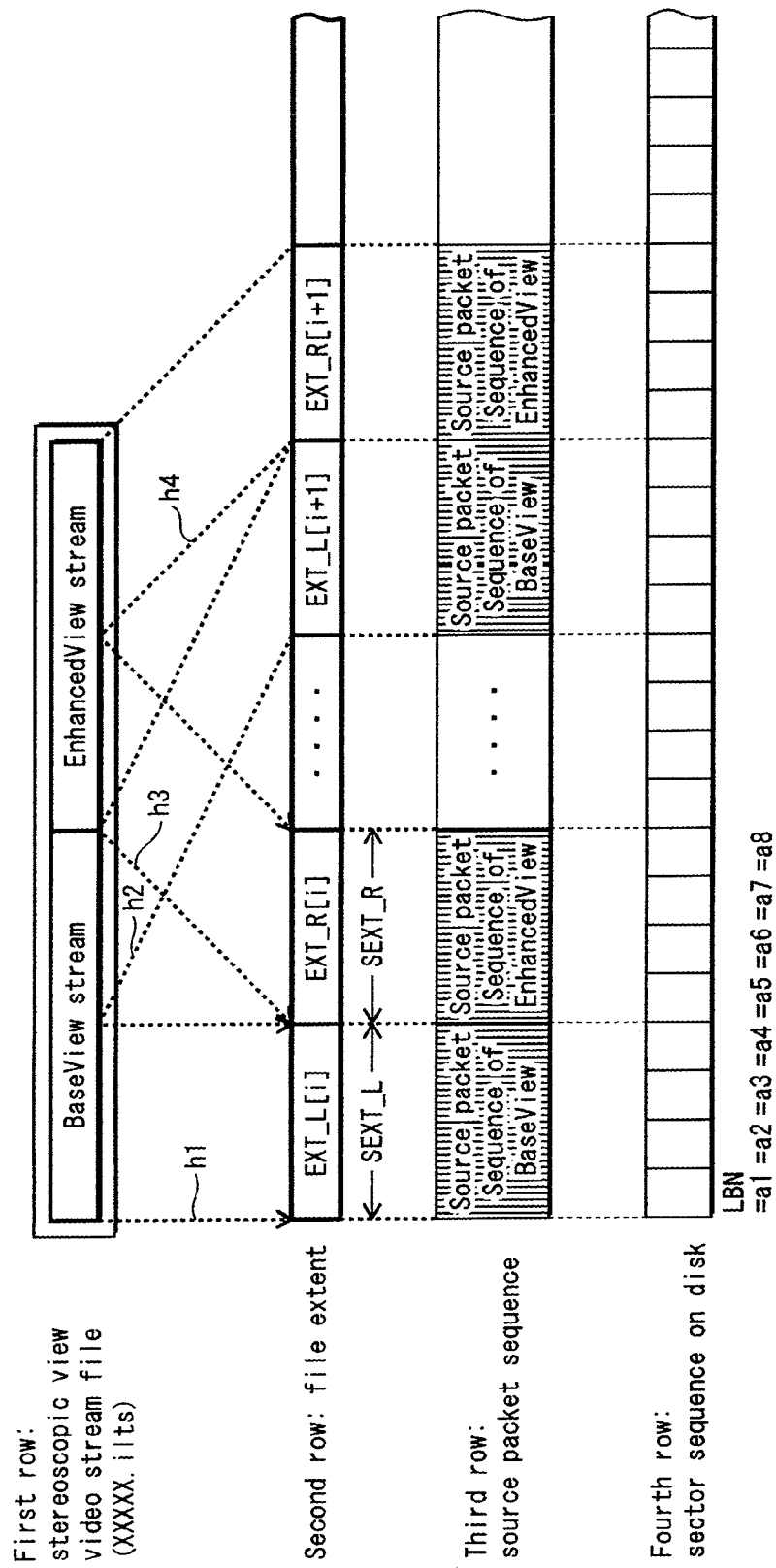

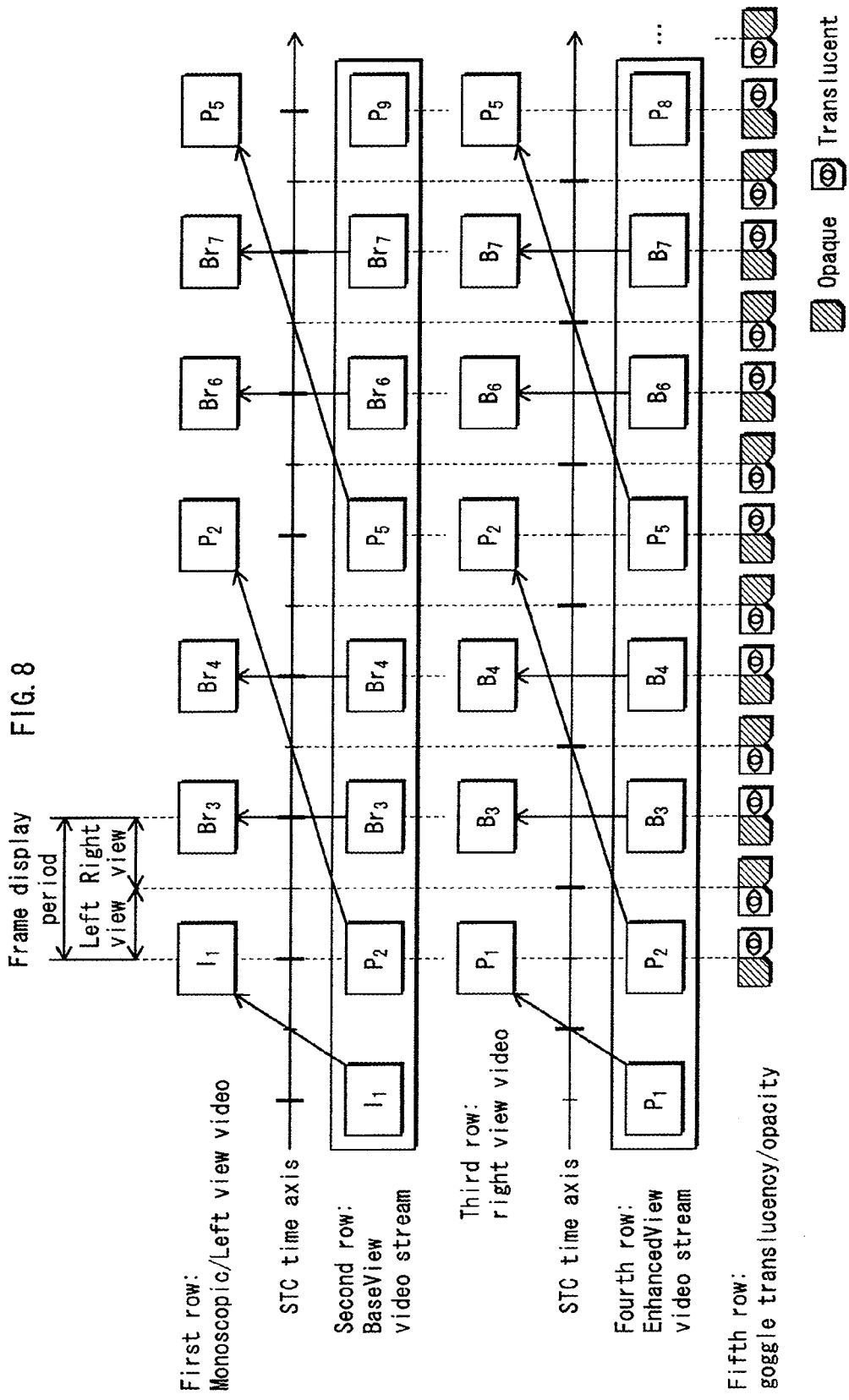

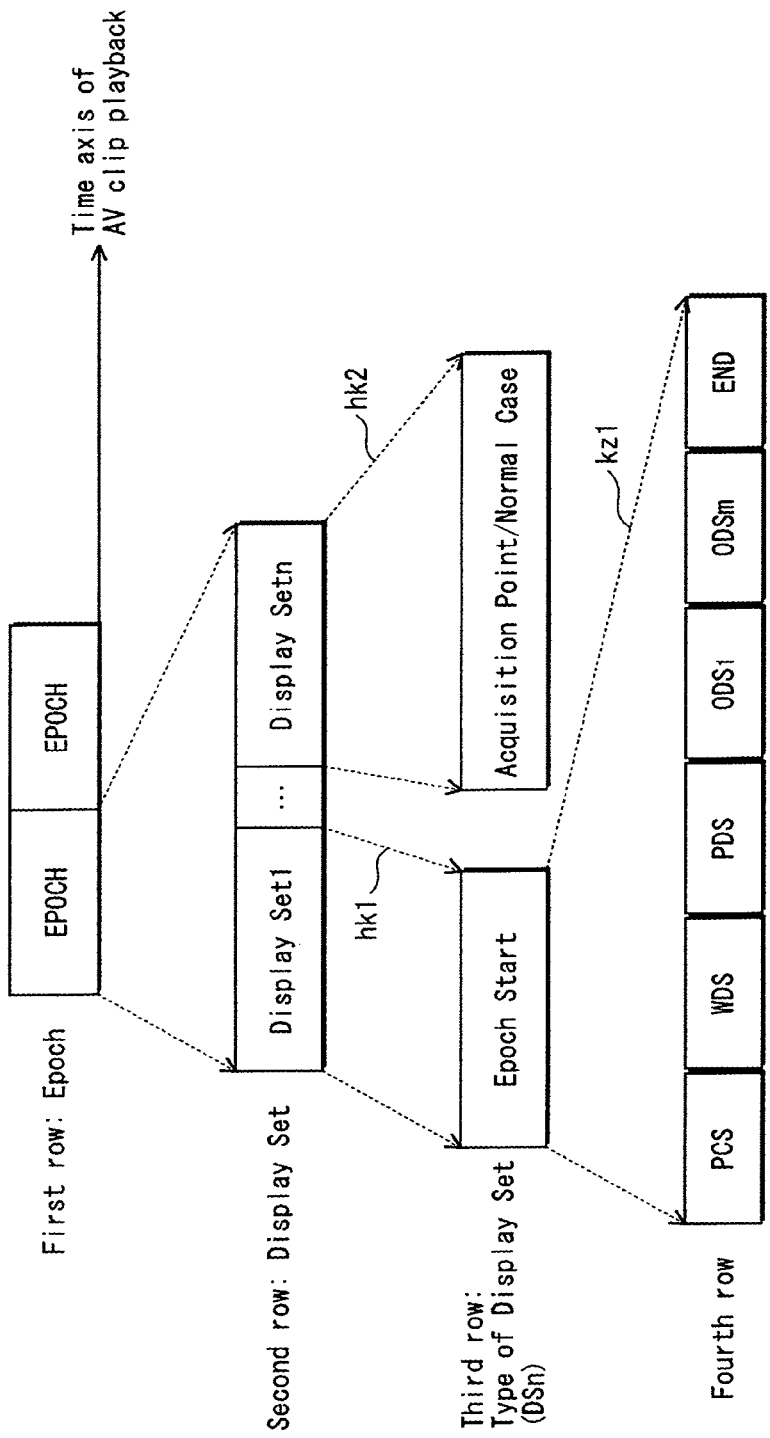

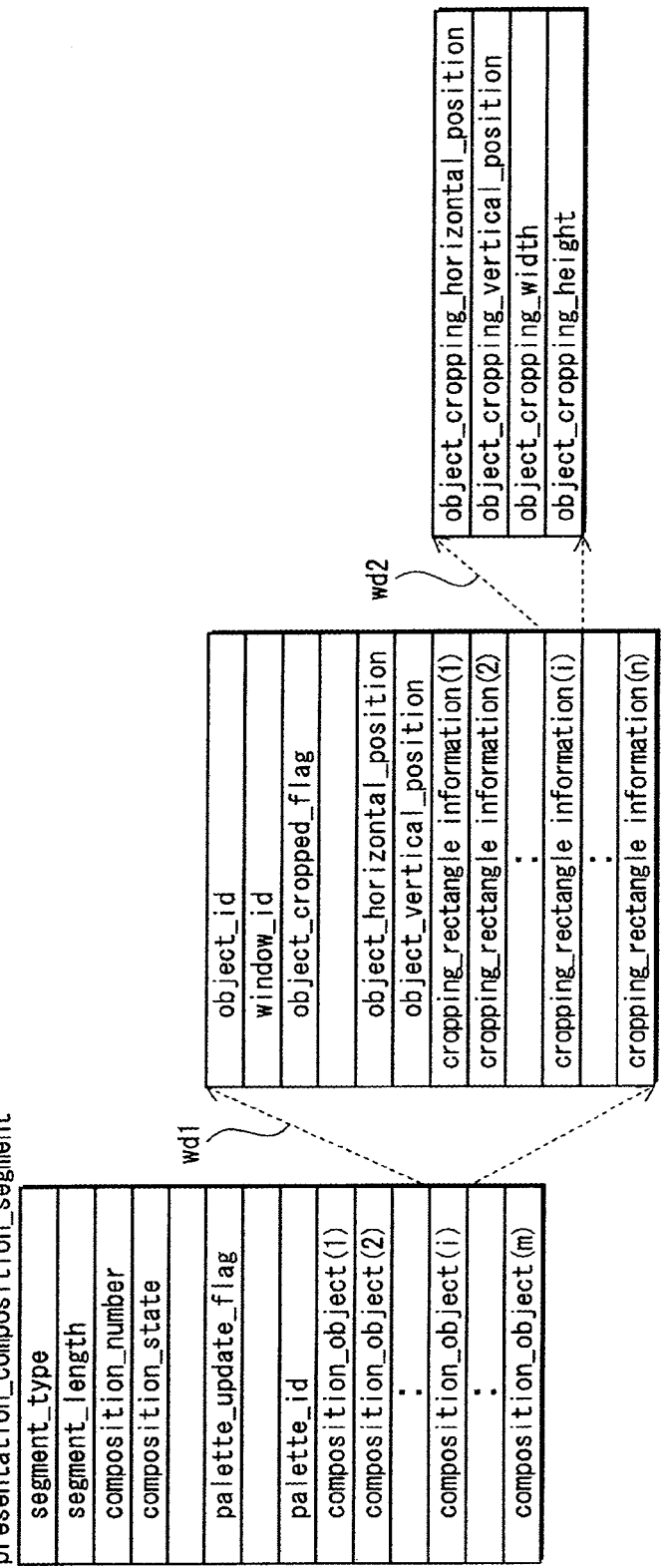

(Japanese subtitles
"Let's get started!" in Hiragana)

(Japanese subtitles "Osaka"
with Kana reading)

(Japanese subtitles "Go Game Club" with large-size characters)

FIG. 18D

This is
Stereogram

FIG. 18E

This is
Stereogram

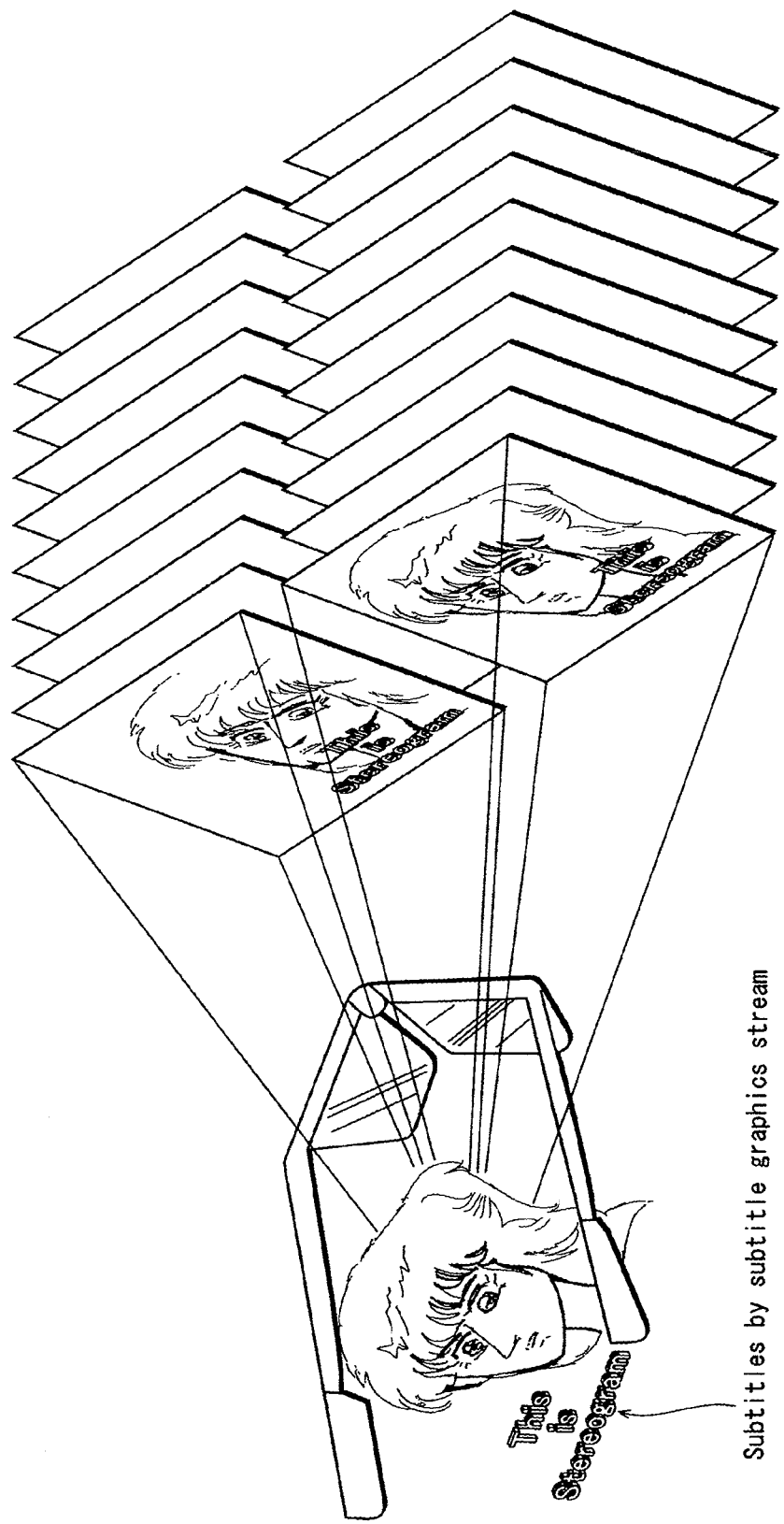

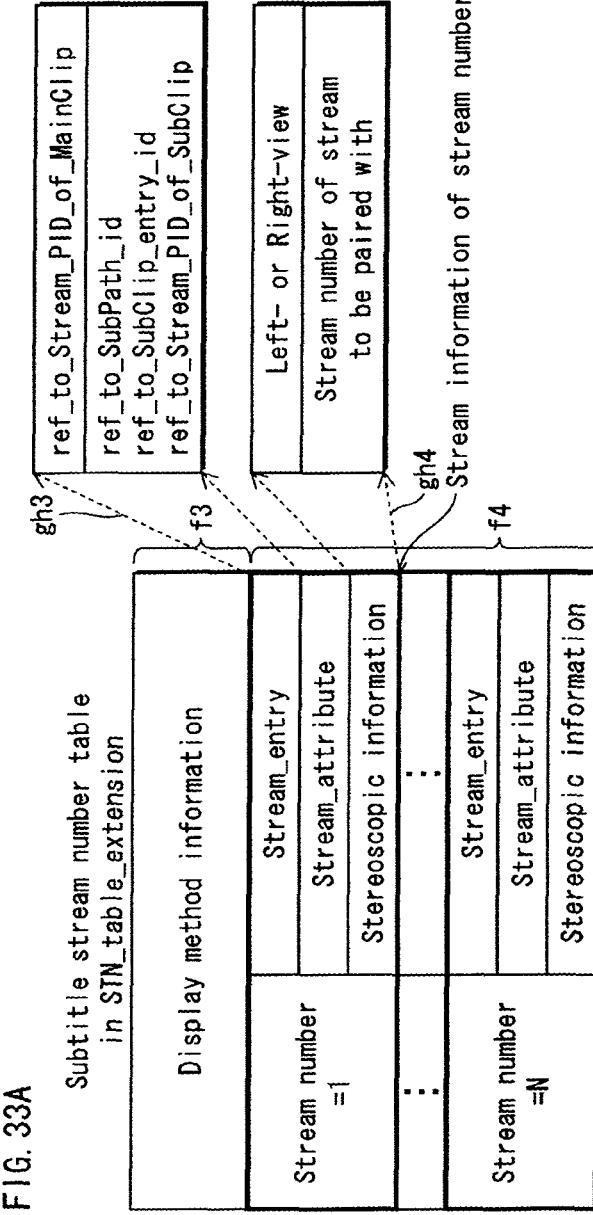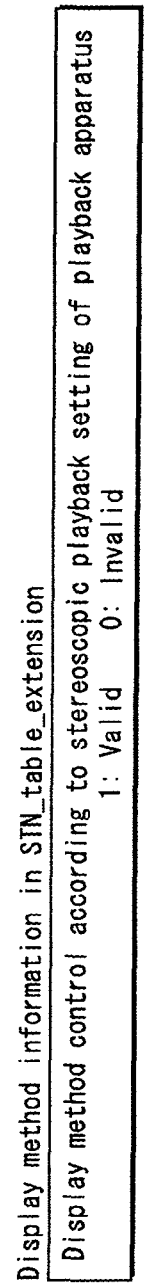
FIG. 33A
FIG. 33B

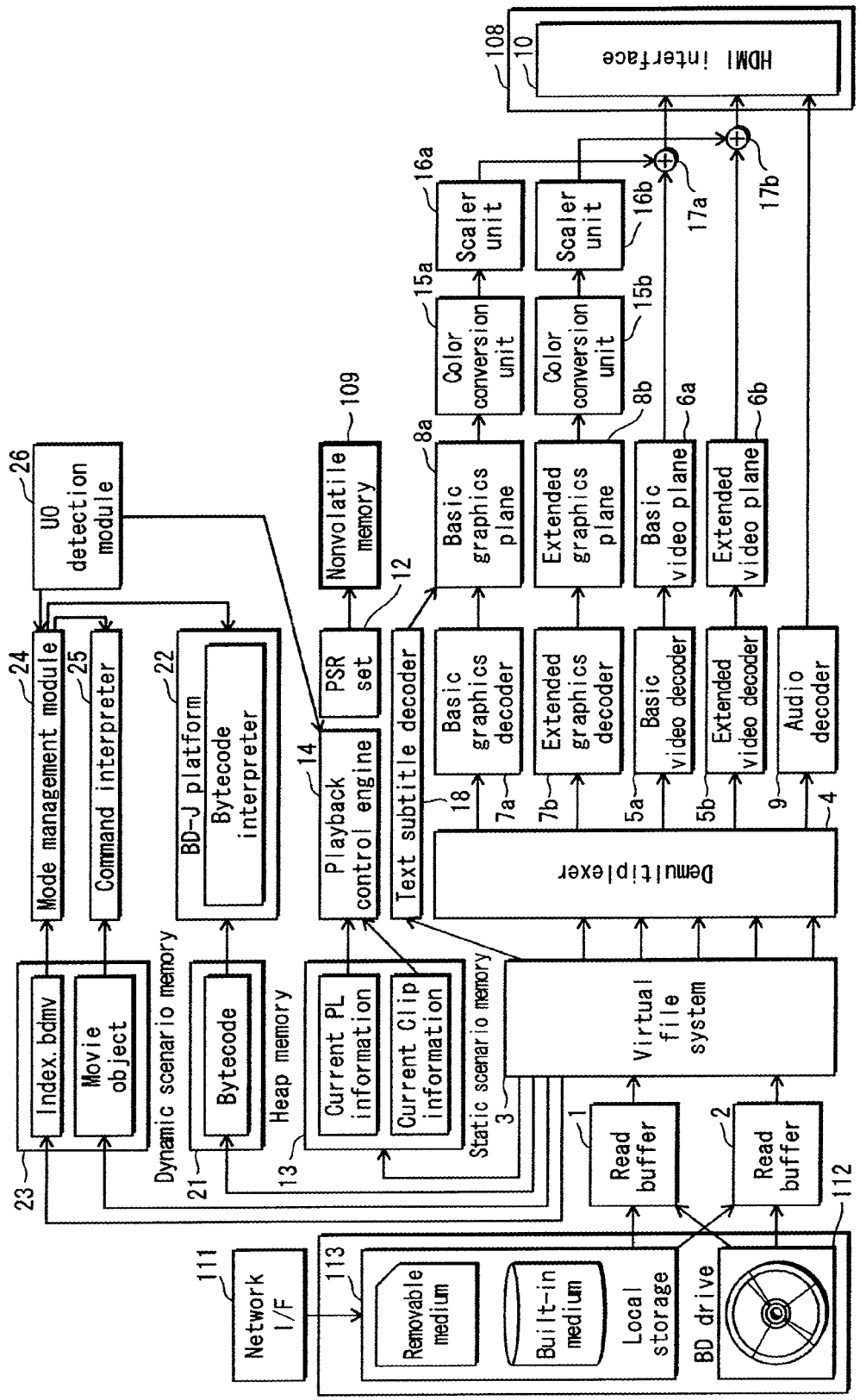

FIG. 45A

Source packet sequence of BaseView

| Video =0x 1011 | Video =0x 1011 | Audio =0x 1100 | Audio =0x 1100 | PG =0x 1220 | PG =0x 1221 | PG =0x 1222 | PG =0x 1223 | PG =0x 1224 | PG =0x 1225 | PG =0x 1226 |
|---|---|---|---|---|---|---|---|---|---|---|

Source packet sequence of EnhancedView

| Video =0x 1012 | Video =0x 1012 | Audio =0x 1101 | Audio =0x 1101 | PG =0x 1240 | PG =0x 1241 | PG =0x 1242 | PG =0x 1243 | PG =0x 1244 | PG =0x 1245 |
|---|---|---|---|---|---|---|---|---|---|

FIG. 45B

PlayList information

PlayItem information #1

STN_table

| Display method control according to user's age is valid | | | |
|---|---|---|---|
| Stream number = 1 | Japanese | No | 0x1220 |
| Stream number = 2 | Japanese | Hiragana | 0x1221 |
| Stream number = 3 | Japanese | Large-size characters | 0x1222 |
| Stream number = 4 | English | No | 0x1223 |

Extension_Data

STN_table_extension corresponding to PlayItem #1

| Display method control according to stereoscopic playback settings is valid | | | |
|---|---|---|---|
| Stream number = 6 | Japanese | To be paired with Subtitles = 7 | 0x1225 |
| Stream number = 7 | Japanese | To be paired with Subtitles = 6 | 0x1240 |
| Stream number = 8 | English | To be paired with Subtitles = 9 | 0x1226 |
| Stream number = 9 | English | To be paired with Subtitles = 8 | 0x1241 |

FIG. 46
Run-length data contained in
TS packets having PID = 0x1221
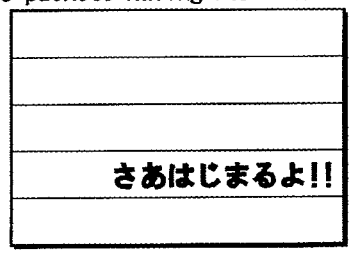
(Japanese subtitles
"Let's get started!")
Run-length data contained in
TS packets having PID = 0x1222
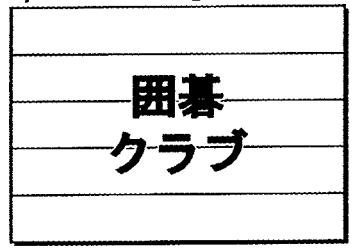
(Japanese subtitles
"Go Game Club")
Run-length data contained in
TS packets having PID = 0x1242
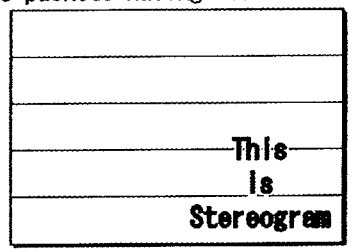
Run-length data contained in
TS packets having PID = 0x1243
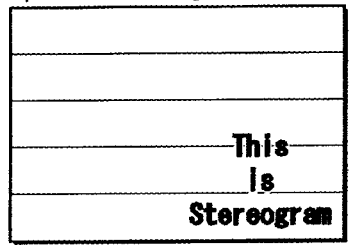

FIG. 47A

- PSR13 = 4
  ※User is 4 years old
- PSR16 = Japanese
- Stereoscopic playback capability = No
- Stereoscopic playback flag = Off

FIG. 47B

PlayList information

PlayItem information #1

STN_table

| Display method control according to user's age is valid | | | |
|---|---|---|---|
| Stream number = 1 | Japanese | No | 0x1220 |
| Stream number = 2 | Japanese | Hiragana | 0x1221 |
| Stream number = 3 | Japanese | Large-size characters | 0x1222 |
| Stream number = 4 | English | No | 0x1223 |

FIG. 47C

PSR2

Stream number = 2

FIG. 47D

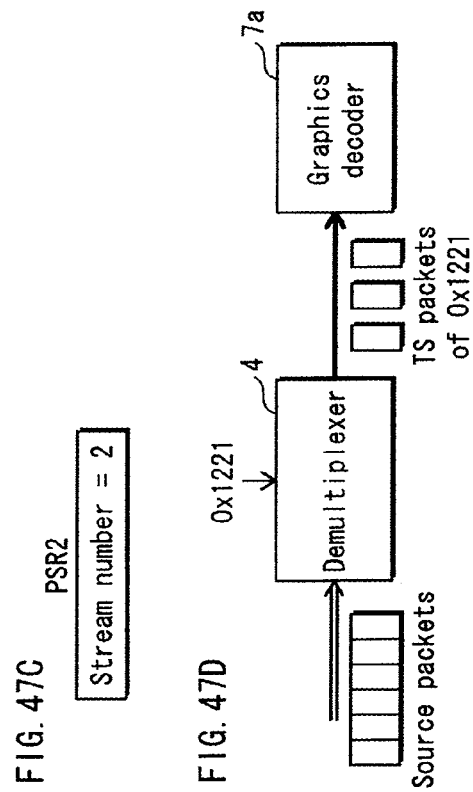

Source packets → Demultiplexer (4) → TS packets of 0x1221 → Graphics decoder (7a)

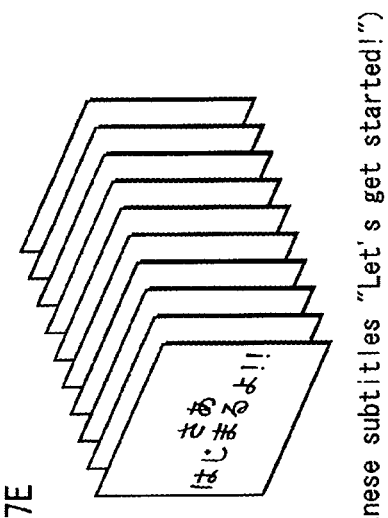

(Japanese subtitles "Let's get started!")

(Japanese subtitles "Go Game Club")

RECORDING MEDIUM, PLAYBACK APPARATUS, RECORDING APPARATUS, PLAYBACK METHOD, RECORDING METHOD, AND PROGRAM

CROSS REFERENCE TO RELATED APPLICATION

The present application is a continuation application of U.S. patent application Ser. No. 12/490,649, filed on Jun. 24, 2009, which claims the benefit of U.S. Provisional Pat. Appl. No. 61/109,618, filed on Oct. 30, 2008, and claims the priority of Japanese Pat. Appl. No. 2008-166807, filed on Jun. 26, 2008. The disclosure of each of these documents, including the specification, drawings, and claims, is incorporated herein by reference in its entirety.

BACKGROUND OF THE INVENTION (1) Field of the Invention

The present invention relates to the field of displaying graphics subtitles.

(2) Description of the Related Art

The term "graphics subtitles" relates to a technique of displaying subtitles by decoding graphics data compressed using run-length coding, and this technique has been used in the field of BD-ROM playback apparatuses as well as the field of DVB-MHP and DVD-Video. Generally, graphics subtitles are displayed by decoding a graphics subtitle stream. A graphics subtitle stream is a sequence of PES packets and such PES packets include packets containing graphics data, packets containing pallet data, and packets containing control data. The graphics data is run-length data that represents runs of the identical code values by counts of the same code values occurring consecutively.

The pallet data associates each code value with brightness and color difference. The control data includes a reference value specifying a specific piece of pallet data to be used for color conversion, information defining a display area on the plane memory for rendering graphics, and information defining the display coordinates of the graphics on the plane memory. The pallet data instructs the graphics display and color conversion based on the reference value.

The processes required to be performed by a playback apparatus for rendering graphics subtitles are limited to: decompression of run-length data, rendering to the plane memory, color conversion with reference to the color lookup table, and so on. Thus, the entire processing by the playback apparatus to display subtitles is simplified.

Citation List

[Patent Literature]
Patent Document 1: JP Patent Application No. 10-208446
Patent Document 2: WO 2004/082297

SUMMARY OF THE INVENTION

Technical Problem

It is noted that users that view movies on a playback apparatus are expected to include a wide variety of age groups ranging from elderly people to young children. In addition, playback apparatuses include a wide variety models ranging from relatively inexpensive models to high-end models. In the near future, a new model capable of switching between stereoscopic display and monoscopic (i.e., two-dimensional) display is expected to be introduced. From the standpoint of movie makers, it is desirable to implement display of subtitles with special features in accordance with the specifications of various playback apparatuses and various users.

Note that control information multiplexed in a graphics subtitle stream contains information indicating the display area and coordinates on the plane memory. Thus, by changing the display coordinates and the range of the display area that are set in the control information, display effects, such as scroll, wipe, cut-in, and cut-out, can be implemented. However, the display effect that can be implemented with the use of control information is limited to those mentioned above. That is to say, there is no prospect that the use of control information makes it possible to implement variety of featured display controls in a manner to meet the specifications of a playback apparatus employed and/or with the variety of users.

Naturally, such a featured display control may be implemented by adding a control item to the control information to be multiplexed into a subtitle stream or by changing the format of the control information to be multiplexed into a subtitle stream. Yet, such ideas inevitably sacrifice the compatibility with the control information having been used in the manufacturing and developing of playback apparatuses, which may not be approved by the manufacturers. The patent literatures 1 and 2 mentioned above both disclose techniques realized by expanding or revising the existing data structure. Thus, the compatibility of the control information is said to be disregarded.

The present invention aims to provide a recording medium that implements a display method of subtitles to be changed in accordance with the processing capacity of a playback apparatus used and the age of a user, without compromising the compatibility with the existing data structure of a graphics subtitle stream.

Solution to Problem

In order to solve the aim noted above, a recording medium according to the present invention has recorded thereon: a plurality of subtitle streams each provided for playback in sync with a video stream; and PlayList information. The PlayList information includes playback section information and a display method flag. The playback section information defines a playback section with information indicating an IN time and an OUT time on a playback time axis of the video stream and includes a stream information table. The display method flag indicates whether or not control according to a subtitle display method is valid. The stream information table specifies, to a playback apparatus, one of the subtitle streams to be selected if the control according to the subtitle display method is valid during the playback section.

Advantageous Effects of Invention

The recording medium according to the present invention includes PlayList information which in turn includes a display method flag indicating whether or not control according to a specific subtitle display method is valid in a corresponding playback section. The PlayList information also includes a stream information table specifying, to a playback apparatus, which of a plurality of subtitle streams should be selected if control according to the specific subtitle display method is valid. This structure achieves the following advantageous effect, even if the contents of control information multiplexed into a subtitle stream is in compliant with an existing data structure to maintain compatibility. That is, as long as various subtitle streams are recorded on the recording medium and supplied to a playback apparatus, the playback apparatus is enabled to select a suitable one of the subtitle streams according to the configuration of the playback apparatus and to display subtitles according to a specific display method. As described above, through the process of selecting one of subtitle streams that is in compliant with a valid display method, the playback apparatus is enabled to display subtitles having unique characteristics. Thus, there is no need to make any change to the control information.

As described above, the present invention implements that a display method is switched in accordance with whether or not the stereoscopic display is supported and/or how old the user is. This allows manufacturers to implement the switching of display methods of subtitles in accordance with the configuration, which helps to promote differentiation from their competitors.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 1A, 1B, and 1C depict a mode of use of a recording medium and a playback apparatus;

FIGS. 6A and 6B depict the correspondences between possible numerical ranges of packet IDs of TS packets, and PES stream types of TS packets having the respective packet IDs;

FIG. 7 depicts an exemplary interleaving arrangement;

FIG. 8 depicts an exemplary internal structure of BaseView and EnhancedView streams for stereoscopic viewing;

FIG. 12 depicts the logical structure constituted by various types of functional segments;

FIGS. 15A and 15B depict the data structure of WDS and PCS;

FIGS. 18A-18E depict types of graphics subtitles defined by ODSs;

FIG. 20 depicts one example of a stereoscopic image perceived by a viewer when playback of a pair of BaseView and EnhancedView video streams are executed in synchronism with playback of a pair of BaseView and EnhancedView subtitle streams;

FIGS. 33A and 33B depict the internal structure of a subtitle stream information table included in STN_table_extension;

FIG. 35 depicts the internal structure of the playback apparatus in detail;

FIGS. 45A and 45B depict source packet strings and PlayList information to be processed;

FIG. 46 depicts examples of subtitles;

FIGS. 47A-47E depict subtitles displayed by the playback apparatus according to the configuration information indicating that "the user's age=4";

DESCRIPTION OF THE PREFERRED EMBODIMENTS

Figure 2:
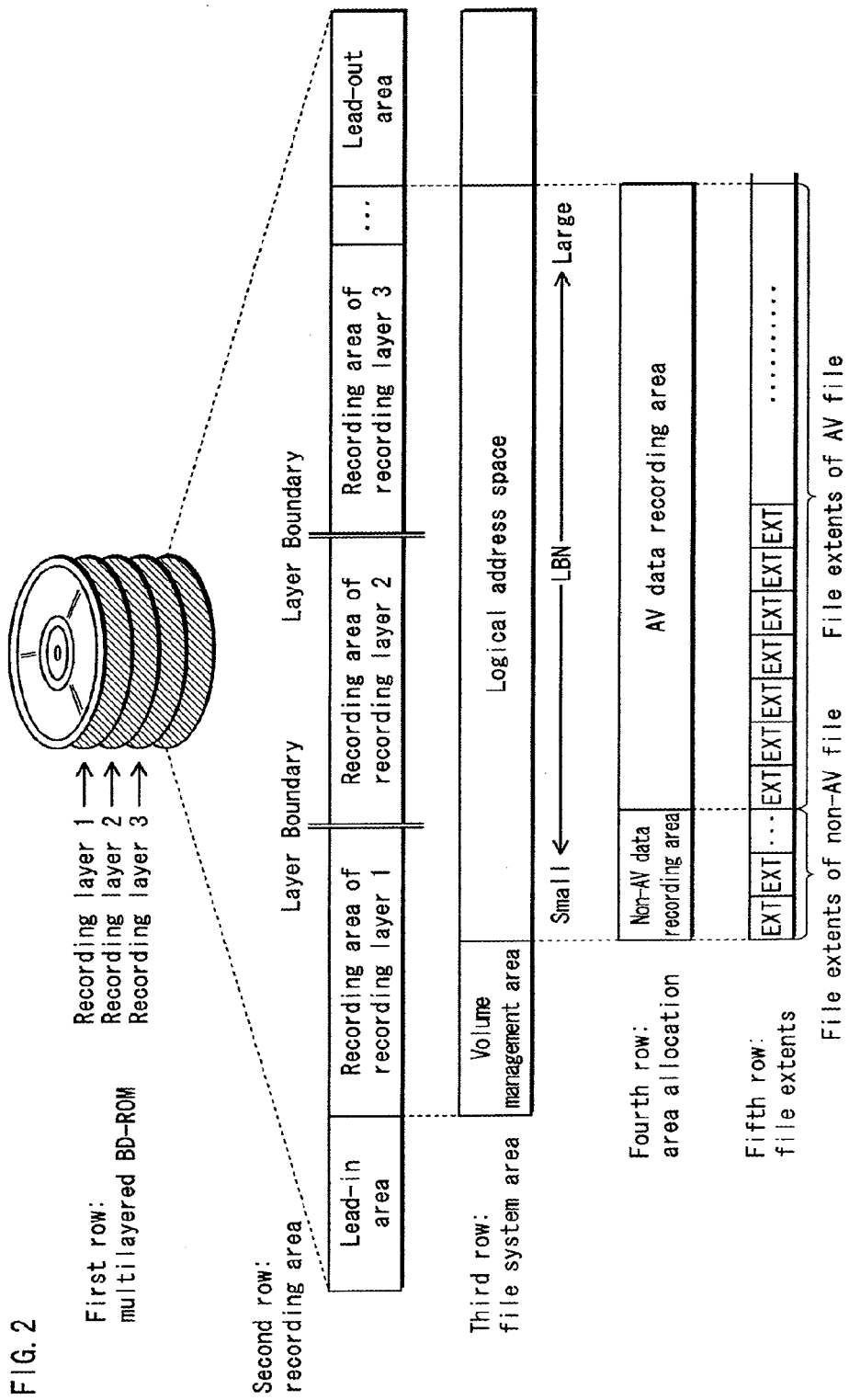
FIG. 2 depicts the internal structure of a BD-ROM.

The following describes embodiments of a recording medium and a playback apparatus having the above solutions, with reference to the accompanying drawings.

FIG. 1 depict a usage act of the recording medium and the playback apparatus. As shown in FIG. 1, a the BD-ROM 101, which is one example of the recording medium, and a playback apparatus 102 constitute a home theater system together with a television 103, a pair of liquid crystal (LC) shutter goggles 104, and a remote controller 100, and are provided for use by a user.

The BD-ROM 101 supplies, for example, a movie to the home theater system.

The playback apparatus 102 is connected to the television 103 and executes playback of the BD-ROM 101.

The television 103 displays the video playback of a movie and also displays a menu and the like to provide an interactive environment to the user.

The LC shutter goggles 104 are composed of a pair of liquid crystal shutters and a control unit and present stereoscopic view to the user with the use of the parallax between the user's eyes. The LC shutters of the LC shutter goggles 104 use lenses each having such a property that the light transmittance of the lens changes depending of the application voltage. The control unit of the LC shutter goggles 104 receives from the playback apparatus a synchronous signal indicating the switching between the output of a right view image and a left view image and switches between the first state and the second state in accordance with the synchronous signal.

FIG. 1B shows the first state of the LC shutter goggles 104. In the first state, the applied voltage is so adjusted to make the LC lens corresponding to the right view becomes non-transparent and the LC lens corresponding to the left view becomes transparent. In this state, an image for the left view is supplied for viewing.

FIG. 1C shows the second state of the LC shutter goggles 104. In the second state, the applied voltage is so adjusted to make the LC lens corresponding to the left view becomes non-transparent and the LC lens corresponding to the right view becomes transparent. In this state, an image for the right view is supplied for viewing.

Generally, the right view and the left view of the human eyes perceive slightly different images due to the positional difference. This positional difference makes it possible for the human visual system to perceive the right and left view images as a single stereoscopic image. The LC shutter goggles 104 switches between the first state and the second state in synchronism with the switching between output of an image for the right view and an image for the left view, the user perceives flat (i.e., two-dimensional) images as stereoscopic images. The following describes the time intervals at which the images of the right view and images for the left view are alternately displayed.

Specifically, right- and left-view images are a pair of flat (i.e., two-dimensional) images created to be slightly different from each other and the difference corresponds to the binocular parallax. By alternately displaying the images at short time intervals, the human visual system perceives a stereoscopic image.

The duration of each time interval should be short enough to create an optical illusion that a three-dimensional (i.e., stereoscopic) image is displayed.

The remote controller 100 is a device for receiving user operations on a hierarchical GUI. In order to be able to receive such user operations, the remote controller 100 is provided with a menu key for calling a menu constituting the GUI, arrow keys for moving the focus from one GUI component to another GUI component of the menu, an enter key for activating a currently focused GUI element of the menu, and a return key for retuning to a higher hierarchical page of the menu, and numeric keys.

This concludes the description of the home theater system. The following now describes the details of the BD-ROM.

FIG. 2 depicts the internal structure of an optical disc, which is one example of the recording medium consistent with the present embodiment, more specifically of the BD-ROM.

In the figure, the first row depicts the BD-ROM, which is a multi-layered optical disc. The second row depicts a spiral track on each recording layer in a manner of being extended in a horizontal direction. The spiral track is handled as one contiguous recording area. The recording area is composed of a lead-in area located at the inner most position, a lead-out located at the outermost position, and the recording areas on the first, second, and third recording layers located between the lead-in and lead-out areas.

The third row depicts the file system area of the BD-ROM. The file system area is composed of a "volume management area" and a "logical address space".

The "volume management area" is an area having file system management information stored therein. The file system management information is used to handle the respective recording areas on the first, second, and third recording layers as one contiguous file system space.

The "logical address space" is an address space in which sectors are addressable with consecutive logical block numbers (LBNs). That is, the respective recording areas on the first, second, and third recording layers depicted on the second row constitute one contiguous logical address space.

The fourth row depicts the allocation of the logical address space in the file system management area. The file system management area has a non-AV data recording area at the inner most position and also has an AV data recording area immediately following the non-AV data recording area.

The fifth row depicts extents recorded in the non-AV data recording area and the AV data recording area. In the AV data recording area, extents (EXT, EXT, EXT . . . in the figure) constituting an AV file are recorded. In the non-AV data recording area, extents (EXT, EXT, EXT . . . in the figure) constituting a file other than an AV file are recorded.

Figure 3:
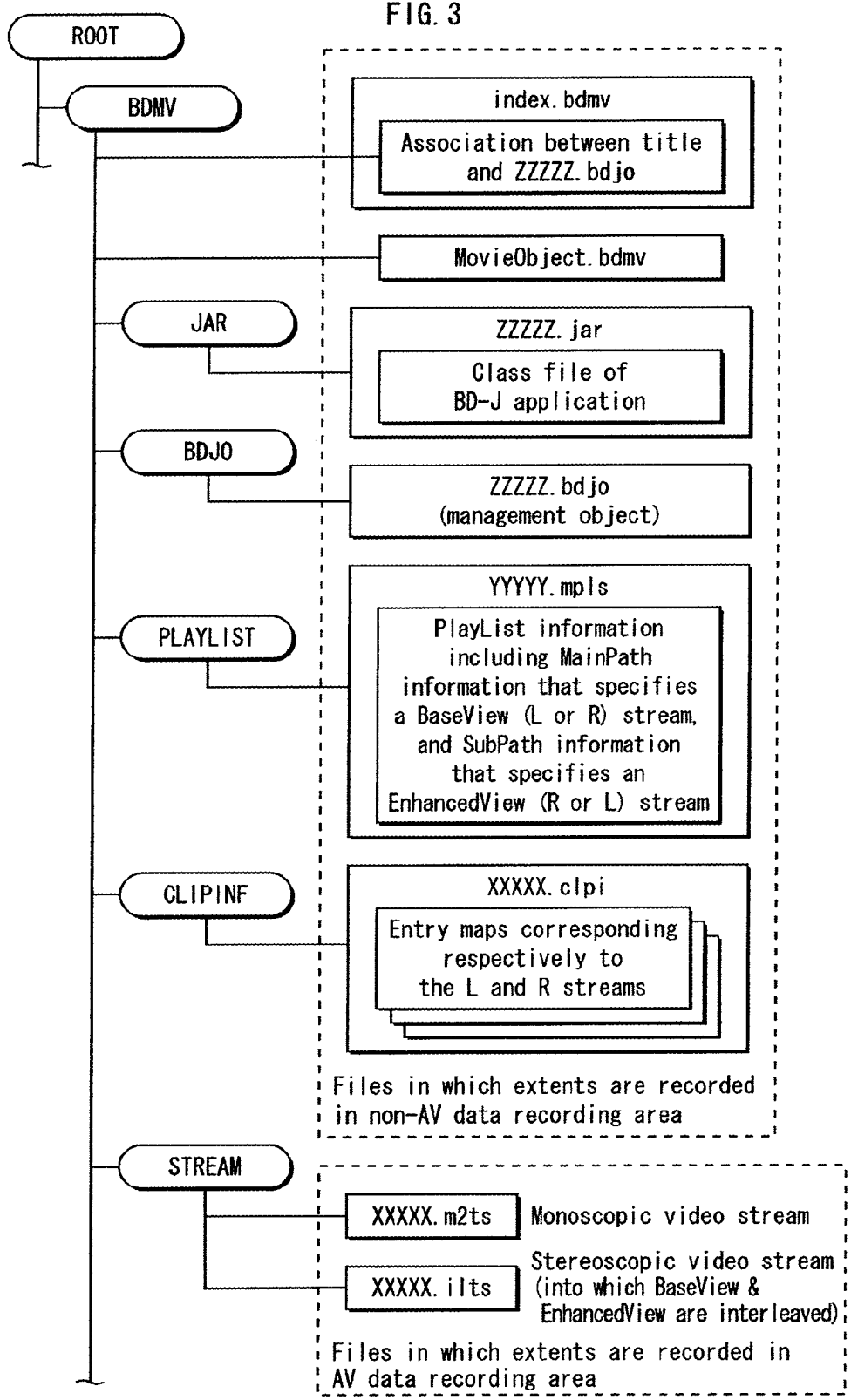
FIG. 3 depicts the application format of the BD-ROM.

FIG. 3 depicts an application format of the BD-ROM.

The "BDMV directory" is a directory for storing such data as AV contends and management information handled on the BD-ROM, The BDMV directory has five sub-directories called "JAR directory", "BDJO directory", "PLAYLIST directory", "CLIPINF directory", and "STREAM directory". The BDMV directory contains two types of files: "index.bdmv" and "MovieObject.bdmv".

The "index.bdmv" file contains management information relating to the entire BD-ROM. The index.bdmv file is read first after the disc is inserted to the playback apparatus, which enables the playback apparatus to uniquely identify the disc. In addition, the index.bdmv file indicates, for each of a plurality of titles available for playback on the BD-ROM, a title number and a BD-J object or movie object defining the title.

The "MovieObject.bdmv" contains one or more movie objects. Each movie object is a management object defining the control procedure to be executed by the playback apparatus in an operation mode (HDMV mode) in which a command interpreter is a control entity. The movie object includes one or more commands and a mask flag indicating whether or not to mask a menu call or a title call made by a user.

The "JAR directory" contains a JAR file corresponding to an archive file. The archive file is created by combining one or more class files and one or more data files into a single file. The one or more class files and one or more data files are combined into one file with the use of, for example, an archiver (not depicted).

The description below is directed to a Java (registered trademark) archive file as an example of the archive file.

For example, the Java (registered trademark) archive file defines the control procedure to be executed by the playback apparatus in an operation mode (BD-J mode). The control entity in the BD-J mode is a Java virtual machine, which is a bytecode interpreter, provided within the playback apparatus. A file containing a JAR file is identified by a 5-digit number "zzzzz" and the extension "jar".

The "BDJO directory" is a directory in which a file containing a management object (BDJ object) is placed. The BDJ object defines the control procedure to be executed by the playback apparatus in the operation mode (BD-J mode). The control entity in the BD-J mode is the Java virtual machine, which is a bytecode interpreter provided within the playback apparatus. A file containing a BDJ object is identified by a 5-digit number "zzzzz" and the extension "bdjo".

The "PLAYLIST directory" is a directory in which a file containing PlayList information is placed. The PlayList information includes main-path information specifying a playback section of a BaseView video stream and sub-path information specifying a playback section of an EnhancedView video stream. A file containing PlayList information is identified by a five-digit number "yyyyy" and the extension "mpls". The BaseView video stream is a video stream for presenting a monoscopic (two-dimensional) display for one of the left view and the right view. On the other hand, a video stream for presenting the right view or the left view and is not a BaseView video stream is referred to as an "EnhancedView video stream". Picture data constituting the EnhancedView video stream is compressed based on the frame correlation with picture data constituting a corresponding BaseView video stream.

One example of a video compression scheme employing the correlation between the right and left views is Multiview Video Coding (MVC), which is the video compression standard provided by amending MPEG-4 AVC/H.264. The Joint Video Team (JVT) is a joint project between ISO/IEC MPEG and ITU-T VCEG and completed the development of MVC, which is an amendment to H.264/MPEG-4 AVC video compression standard, in July 2008. MVC is intended for collectively encoding a plurality of video images for a plurality of different views. In the encoding, the correlation between past and future frames is used for encoding as well as the correlation between frames for different view points to achieve a higher compression efficiency as compared with compression performed separately for frames of different views.

Streams constituting a BaseView and an EnhancedView are not limited to video streams. Subtitle streams may also constitute BaseView and EnhancedView. In the following description, a "BaseView stream" may refer to either of a BaseView video stream and a BaseView subtitle stream, and an "EnhancedView stream" refers to an EnhancedView video stream and an EnhancedView subtitle stream.

The "CLIPINF directory" is a directory in which a file containing clip information (clip information file) is placed. A clip information file is identified by a five-digit identifier "xxxxx" and the extension "clpi" and includes entry maps. One of the entry maps is of a video stream for the left view and another is of a video stream for the right view.

The extents constituting files contained in the directories mentioned above are recorded in the non-AV data area.

The "STREAM directory" is a directory for storing an AV clip file containing a monoscopic video stream and an AV clip file containing a stereoscopic video stream. A file containing a monoscopic video stream is identified by a five-digit identifier "xxxxx" and the extension "m2ts". A file storing a stereoscopic video stream is identified by a five-digit identifier "xxxxx" and the extension "ilts".

The extents constituting a file containing a BaseView stream and placed in the STREAM directory and the extent constituting a file containing an EnhancedView stream and placed in the STREAM directory are recorded in the AV data recording area.

(How Streams are Recorded)

Figure 4:
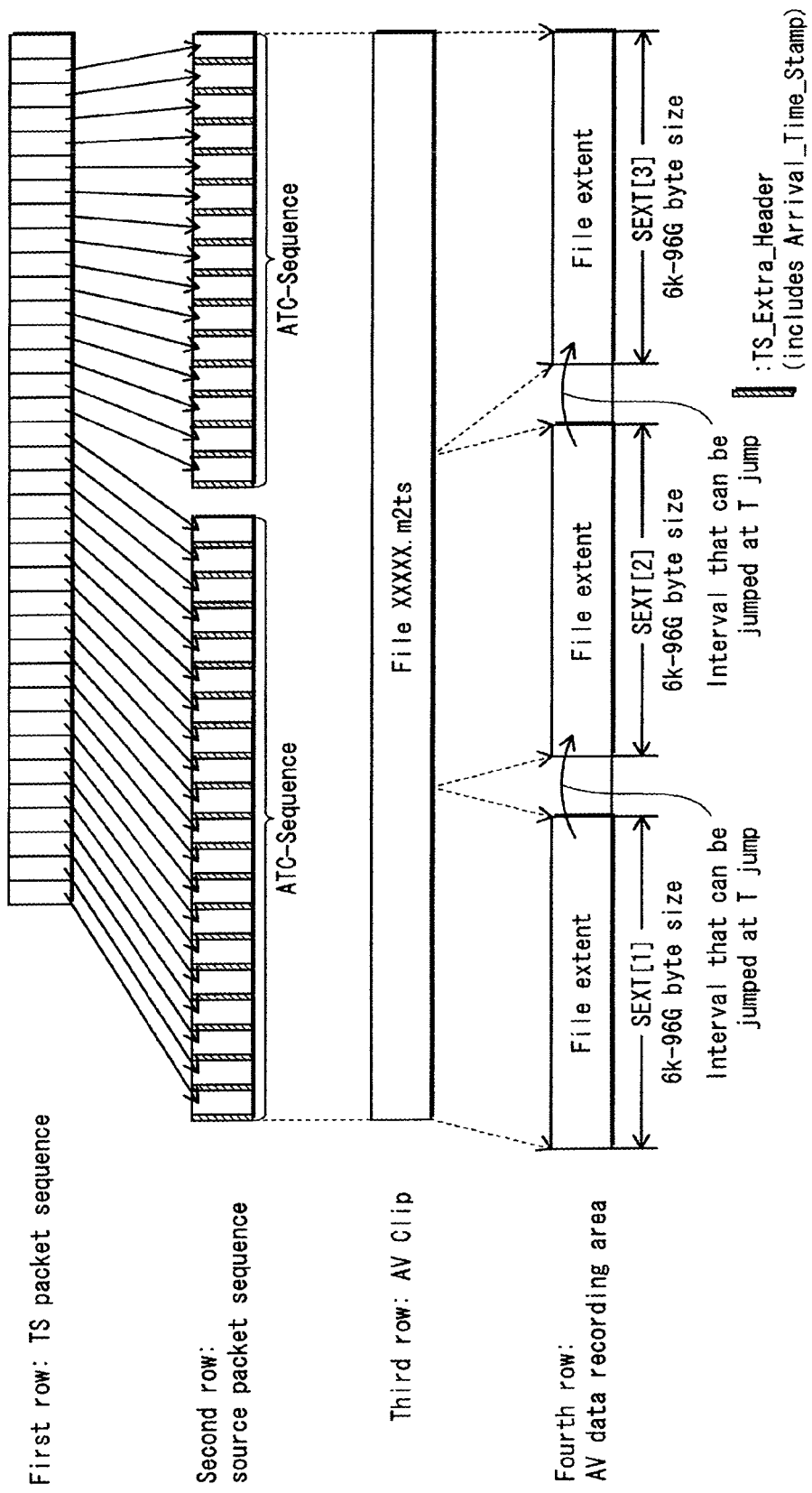
FIG. 4 depicts the processes through which source packets of BaseView and EnhancedView streams are recorded into an AV data area.

FIG. 4 depicts the processes through which the source packets of a BaseView stream and of an EnhancedView stream are recorded into the AV data area. In the figure, The first row depicts TS packets constituting the BaseView stream or EnhancedView stream.

TS packets of 188 bytes constitute the BaseView stream and the EnhancedView stream and each TS packet is attached with a 4 byte TS_extra_header (hatched box in the figure) as depicted on the second row of the figure, which results in a sequence of source packets of 192 bytes. The TS_extra_header includes Arrival_Time_Stamp indicating the time at which the TS packet is to be input to the decoder.

The source packets of the BaseView stream and EnhancedView stream constitute one or more "ATC sequences". An "ATC sequence" refers to an arrangement of source packets constituting the time axis for ATSs without any discontinuity (i.e., no arrival time-base discontinuity) in the values of Arrival_Time_Clock fields referred to by the Arrival_Time_Stamp fields. In other words, an "ATC sequence" refers to a sequence of source packets having an successive sequence of Arrival_Time_Clock fields referred to by the Arrival_Time_Stamp fields. As will be described below, an ATS is attached at the head of a TS packet and indicates the time at which the TS packet is to be transferred to the decoder.

Such an ATC sequence constitutes an AV clip and recorded on the recording layers with the file name "xxxxx.m2ts"

Similarly to any normal computer file, such an AV clip is divided into one or more file extents and recorded in the area on the recording layers. The third row of FIG. 4 depicts an AV clip and the fourth row schematically depicts how the AV clip is recorded. The file extents depicted on the fourth row as constituting a file has a data length equal to or greater than a predetermined size (the size is called S_EXT).

Figure 5:
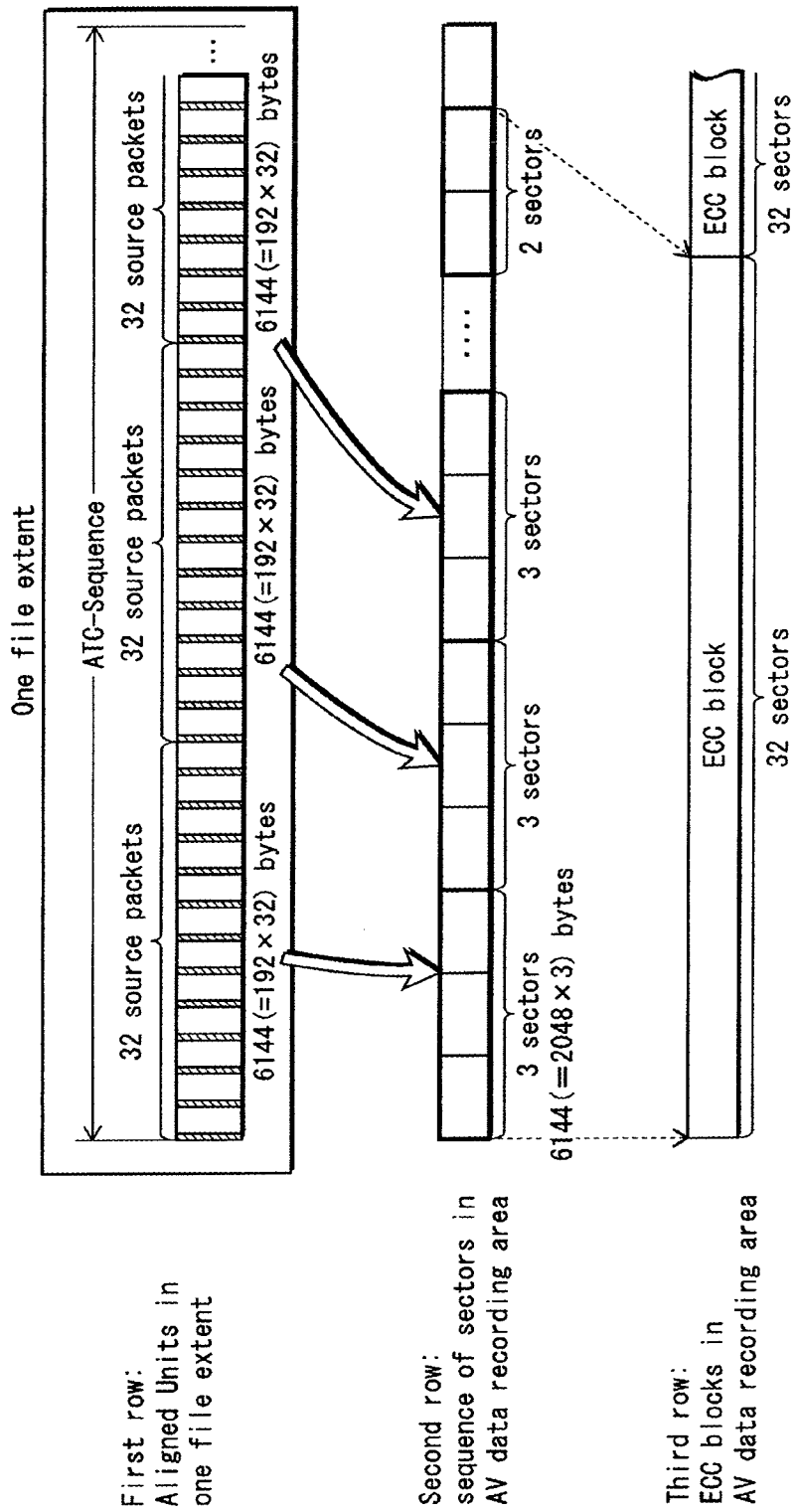
FIG. 5 depicts the relationship between physical units of the BD-ROM and source packets constituting one file extent.

FIG. 5 depicts the relation between the physical units of the BD-ROM and the source packets constituting one file extent. As depicted on the second row in the figure, a plurality of sectors are formed in the AV file recording area of the BD-ROM. The source packets of the file extent is divided into groups of 32 source packets and recorded into three contiguous sectors. One group of 32 source packets is equal to 6144 bytes (=32×192), which matches the size of three sectors (6144 bytes=2048×3). The 32 source packets included in a set of three sectors are collectively referred to as an "Aligned Unit" and writing to the BD-ROM is carried out in Aligned Units.

As depicted on the third row of the figure, an error-correcting code is attached to every 32 sectors to constitute an ECC block. A playback apparatus is ensured to acquire a complete set of 32 source packets as long as an access to the BD-ROM is made in Aligned Units. This concludes the description of the process of writing an AV clip to the BD-ROM.

FIG. 6A is a table showing possible numerical ranges of packet IDs of TS packets (PID) and the types of PES streams carried by TS packets having the respective packet IDs.

TS packets having the packet ID "0x0100" constitute a program map (Program_map), whereas TS packets having the packet ID "0x1001" constitute program clock reference (PCR).

TS packets having the packet ID "0x1011" constitute a BaseView video stream and TS packets having the packet ID "0x1012" constitutes an EnhancedView video stream.

TS packets having the packet IDs ranging from "0x1100" to "0x111F" constitute an audio stream.

TS packets having the packet IDs ranging from "0x1220" to "x123F" constitute a BaseView subtitle stream. TS packets having the packet IDs ranging from "0x1240" to "0x125F" constitutes an EnhancedView subtitle stream. Note that TS packets constituting a graphics subtitle stream for a two-dimensional view and not a BaseView subtitle stream are assigned with the packet IDs ranging from "0x1200" to "0x121F".

The TS packets constituting video streams and TS packets subtitle streams are grouped together depending on whether the TS packets constitute the BaseView or the EnhancedView. FIG. 6B shows one example.

As shown in the figure, the group of source packets constituting the BaseView include: source packets (each depicted as "Video" in the figure) having the PID "0x1011" and constituting the BaseView video stream; source packets (each depicted as "Audio") having the PID "0x1100" and constituting an audio stream; and source packets (each depicted as "PG") having the PIDs "0x1220", "0x1221", "0x1222", "0x1223" "0x1224", "0x1225", and "0x1226" and constituting a graphics subtitle stream.

On the other hand, the group of source packets constituting the EnhancedView include: source packets (each depicted as "Video") having the PID "0x1012" and constituting an EnhancedView video stream; source packets (each depicted as "Audio") having the PID "0x1101" constituting an audio stream; and source packets (each depicted as "PG") having the PIDs "0x1240", "0x1241", "0x1242", "0x1243", "0x1244", and "0x1245" and constitute a graphics subtitle stream.

The source packets belonging to the BaseView group and the EnhancedView group are interleaved. FIG. 7 shows one example of the interleaved arrangement of the source packets. In the example shown in the figure, extents constituting the BaseView and the EnhancedView are alternately recorded in the order of "BaseView", "EnhancedView", "BaseView" and "EnhancedView" . . . .

In FIG. 7, The first row depicts an AV file, the second row depicts the extents EXT_L[i], EXT_L[i+1], EXT_R[i], and EXT_R[i+1] constituting the AV file. The third row depicts a sequence of source packets belonging to the extents, and the fourth row depicts a sequence of sectors on a recording layer. Note that variables "i" and "i+1" in the brackets indicate the playback order of the respective extents. According to this notation, the two extents attached with the variable "i", namely EXT_L[i] and EXT_R[1] are to be played synchronously. Similarly, the two extents attached with the variable "i+1", namely EXT_L[i+1] and EXT_R[i+1] are to be played synchronously.

The extents EXT_L[i] and EXT_L[i+1] are constituted by the source packets having the PID "0x1011". Dashed arrows h1, h2, h3, and h4 indicate the membership, i.e., which of the BaseView stream and EnhancedView stream each of the extents EXT_L[i] and EXT_L[i+1] belongs to. According to the membership indicated by the arrows h1 and h2, the extents EXT_L[i] and EXT_L[i+1] belong to the BaseView stream and the extents EXT_R[i] and EXT_R[i+1] belong to the EnhancedView stream as indicated by the arrows h3 and h4.

The size of the extent EXT_L[i] is referred to as SEXT_L[i], whereas the size of the extent EXT_R[i] is referred to as SEXTR[i].

The following describes how to determine the size SEXT_L and SEXT_R. Note that in a playback apparatus, extents are read alternately to two read buffers, one for the right view and the other for the left view, before being supplied to a video decoder. In view of this, SEXT_L and SEXT_R need to be determined in view of the time taken before the respective read buffers for the right view and the left view become full. Let Rmax1 denote the transfer rate to the right-view read buffer, the capacity of the right-view read buffer needs to be determined to satisfy the following relation:

Right-View Read Buffer=$R$max1×"Time Taken to Fill Left-View Read Buffer during operation involving a jump"

The term "jump" is synonymous with a disc seek. The contiguous area in the BD-ROM that can be secured for recording is limited. Therefore, a BaseView stream and an EnhancedView stream are not necessarily located next to each other on the BD-ROM and may be recorded in discrete areas.

The following now considers the "Time Taken to Fill Left-View Read Buffer during operation involving a jump". TS packets are transferred to the left-view read buffer at the transfer rate Rud−Rmax2. This Rud−Rmax2 indicates the difference between the output rate Rmax2 of the left-view read buffer and the input rate Rud of the left-view read buffer. Then, the time taken to fill the left-view read buffer is expressed as RB2/(Rud−Rmax2).

Regarding the reading of data to the left-view read buffer, it is necessary to consider the jump time (Tjump) from a right-view video stream to a left-view video stream and the jump time (Tjump) form the left view video stream to the right view video stream. Thus, the time expressed as (2×Tjump+RB2/(Rud Rmax2)) is necessary to fill the left-view read buffer.

Let Rmax1 denote the transfer rate of the right-view read buffer. Then, all the source packets in the right-view read buffer need to be output at the transfer rate Rmax1 within the storage time of the left-view read buffer. Therefore, the size RB1 of the right-view read buffer is given by the following expression:

$RB1=R\text{max}1 \times \{2 \times T\text{jump}+RB2/(Rud-R\text{max}2)\}.$

In a similar manner, the size RB2 of left-view read buffer is given by the following expression:

$RB2=R\text{max}2 \times \{2 \times T\text{jump}+RB1/(Rud-R\text{max}1)\}.$

Specifically, the memory size of the right-view read buffer and of the left-view read buffer is equal to 1.5 MB or less. According to the present embodiment, the extent size SEXT_R and the extent size SEXT_L are determined to be equal or substantially equal to the right-view read buffer and the left-view read buffer, respectively. This concludes the description of how the BaseView stream and EnhancedView stream are recorded. The following now describes an internal structure of a BaseView stream and a EnhancedView stream.

FIG. 8 depicts an internal structure of a stereoscopic pair of a BaseView stream and an EnhancedView stream for stereoscopic viewing. Each of the BaseView stream and the EnhancedView stream contains picture data, for example. There are many types of picture data, including I-picture, P-picture, and B-picture.

An I-picture is picture data corresponding to one screen. A P-picture is picture data representing the difference with the I-picture to which the P-picture refers.

A B-picture is picture data generated with reference to both an I-picture and a P-picture.

The second row of this figure depicts an internal structure of the BaseView stream. This stream contains pieces of picture data I1, P2, Br3, Br4, P5, Br6, Br7, and P9.

These pieces of picture data are decoded with the timing indicated by the DTSs (decoding time stamp: indicating the time at which decoding of that piece of picture data by a decoder is to be started) attached to the respective pieces of picture data. The first row depicts left-view pictures and the decoded pictures I1, P2, Br3, Br4, P5, Br6, Br7, and P9. The left-view images are presented by executing playback of the pictures in the order of I1, Br3, Br4, P2, Br6, Br7, and P5 according to the values of PTSs attached to the respective pictures.

The fourth row depicts an internal structure of the EnhancedView stream. This secondary video stream contains pictures P1, P2, B3, B4, P5, B6, B7, and P8. Those pieces of picture data are decoded with the timing indicated by the DTSs attached to the respective pieces of picture data. The third row depicts the right-view images. The right-view images are presented by executing playback of the decoded pictures P1, P2, B3, B4, P5, B6, B7, and P8 in the order of P1, B3, B4, P2, B6, B7, and P5 according to the values of PTSs (Presentation Time Stamp: information indicating the presentation times of video and audio of that picture) attached to the respective pictures.

The fifth row depicts how the states of the LC shutter goggles 104 are switched. As depicted on the fifth row, one of the LC shutters corresponding to the right view is closed during the time that left-view images are presented, whereas the other of the LC shutters corresponding to the left view is closed during the time that right-view images are presented.

These primary and secondary video streams are compressed by the intra-picture prediction using the timewise redundancy between pictures as well the redundancy between pictures corresponding to different views. Pictures of the EnhancedView stream are compressed with reference to pictures of the BaseView stream having the same presentation time.

For example, the first P-picture in the EnhancedView stream refers to an I-picture in the BaseView stream, and a B-picture in the EnhancedView stream refers to a Br-picture in the BaseView stream. The second P-picture in the EnhancedView stream refers to a P-picture in the BaseView stream.

Figure 9:
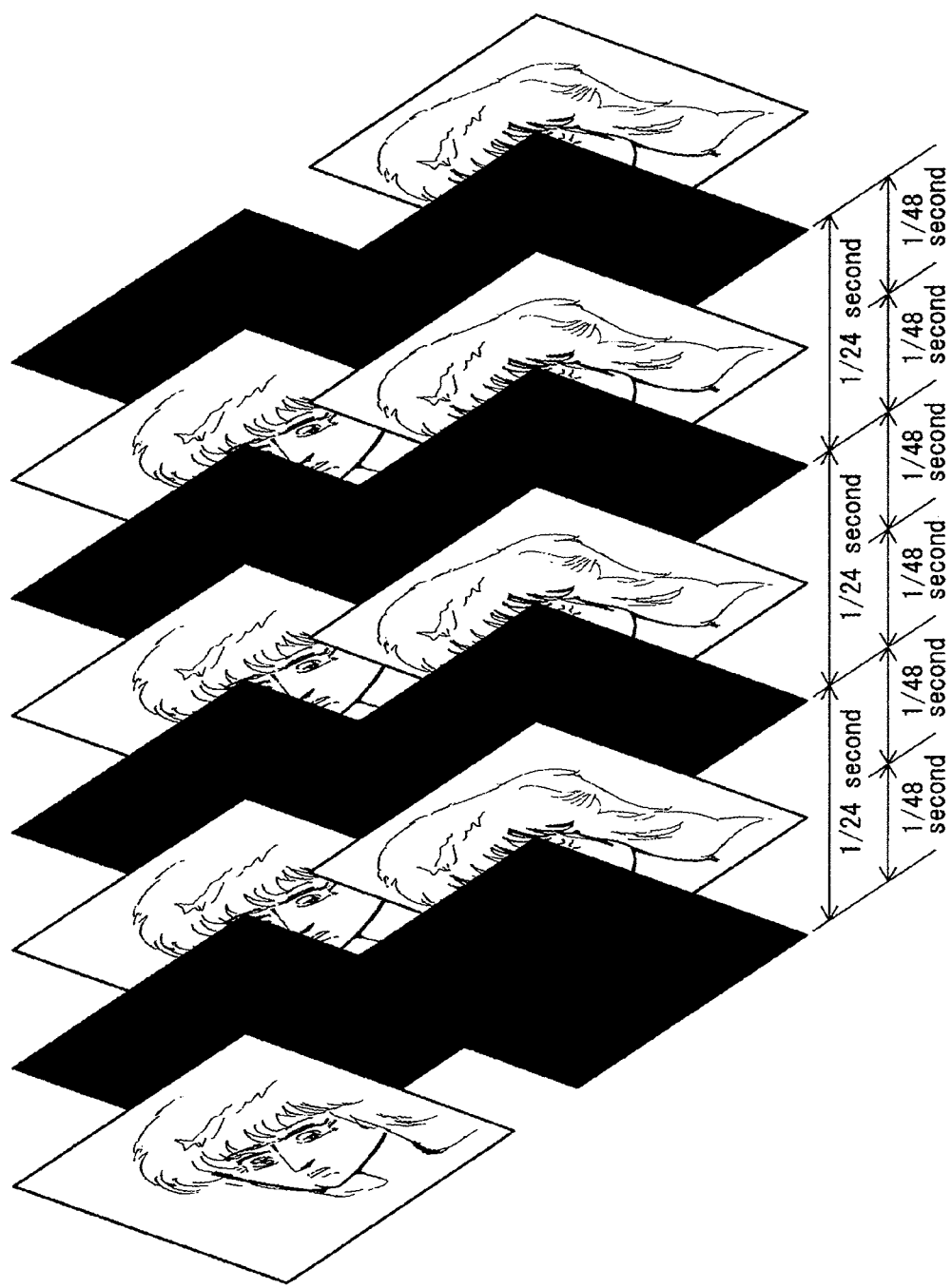
FIG. 9 depicts playback images presented to the user by switching the transparent/shielded states of goggles with the timings depicted in FIG. 8.

FIG. 9 illustrates playback images presented to the user by switching the transparent/shielded states of the goggles with the timings depicted in FIG. 8. Suppose that the frame display period is ¹⁄₂₄ sec and the transparent/shielded states of the individual goggles corresponding to the right view and left view are switched at every ¹⁄₄₈ sec. Consequently, pictures corresponding to the right view and the left view are alternately presented one by one. FIG. 9 schematically depicts that images presented for the left view are slightly different from images presented for the right view, with respect to the angle and/or position of the face of a person appearing in the images (Note that the difference in the face angle or position in FIGS. 9 and 10 are only schematic illustrations).

Figure 10:
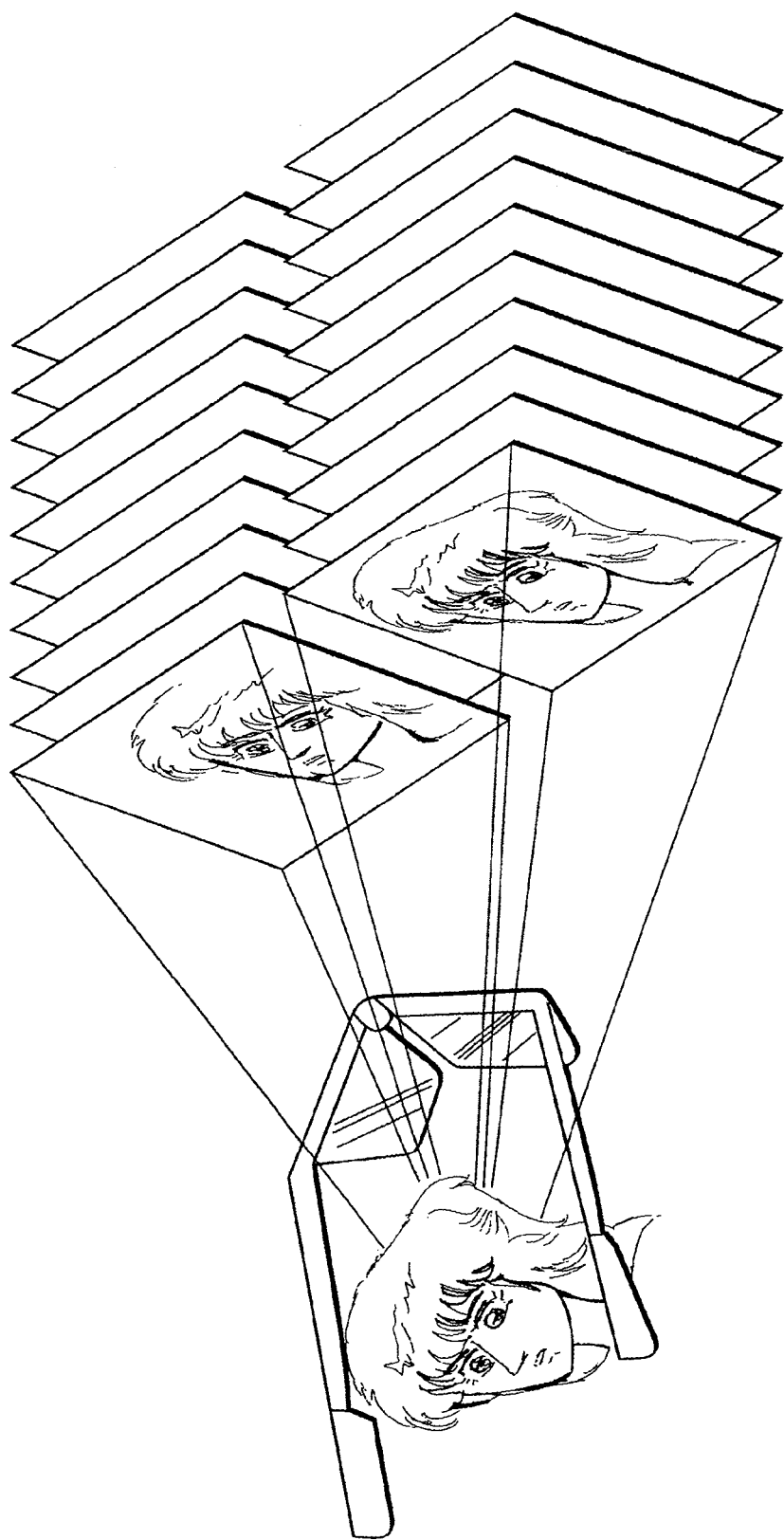
FIG. 10 depicts a stereoscopic image created by image persistence in human eyes.

FIG. 10 illustrates a stereoscopic image created by image persistence in human eyes.

This concludes the description of the internal structure of the EnhancedView video stream.

Figure 11A:
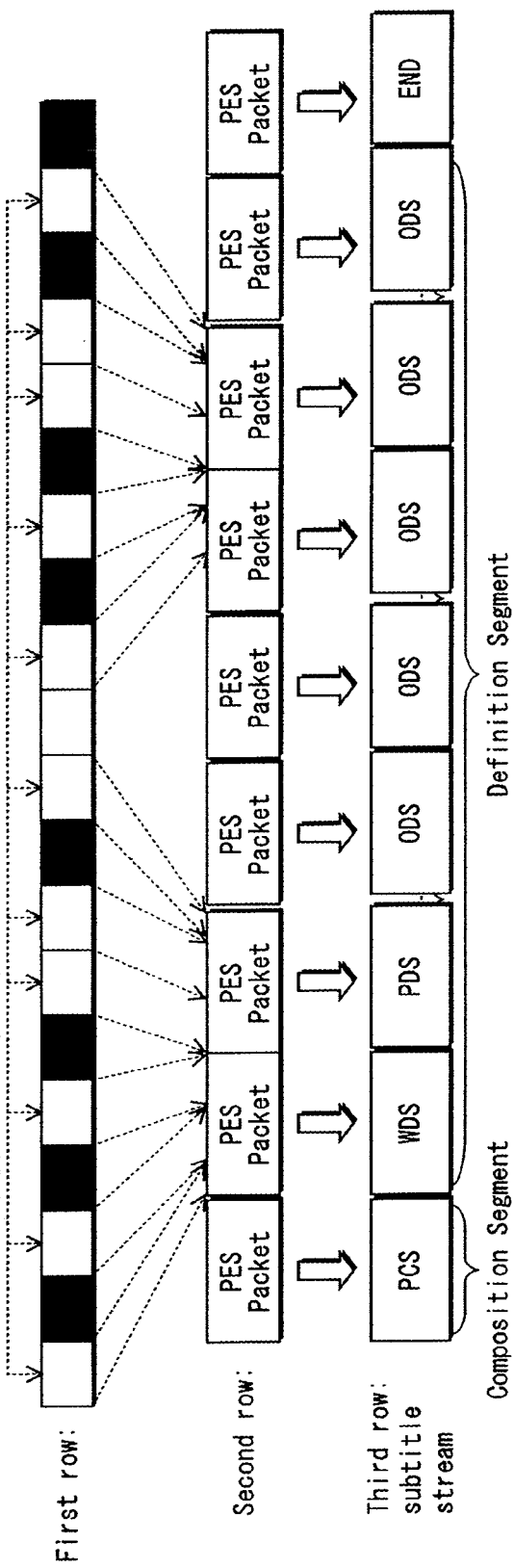
FIGS. 11A and 11B depict the structure of a graphics subtitle stream.

The following now describes graphics subtitle streams. FIG. 11 depict a structure of a graphics subtitle stream. In FIG. 11, the first row depicts a sequence of TS packets constituting an AV Clip and the second row depicts a sequence of PES packets constituting the graphics subtitle stream. The sequence of PES packets on the second row are acquired by extracting and concatenating payloads of TS packets having a predetermined PID from among the TS packets on The first row.

The third row depicts a structure of the graphics subtitle stream. The graphics subtitle stream is composed of functional segments including PCS (Presentation Composition Segment), WDS (Window Define Segment), PDS (Palette Definition Segment), ODS (Object_Definition_Segment), and END (END of Display Set Segment). Of theses functional segments, a PCS is called a display composition segment, and a WDS, a PDS, an ODS, and an END are called definition segments. PES packets and functional segments may be in one-to-one correspondence or in one-to-multiple correspondence. That is, one functional segment may be converted into one PES packet or fragmented into a plurality of PES packets and recorded on the BD-ROM.

Figure 11B:
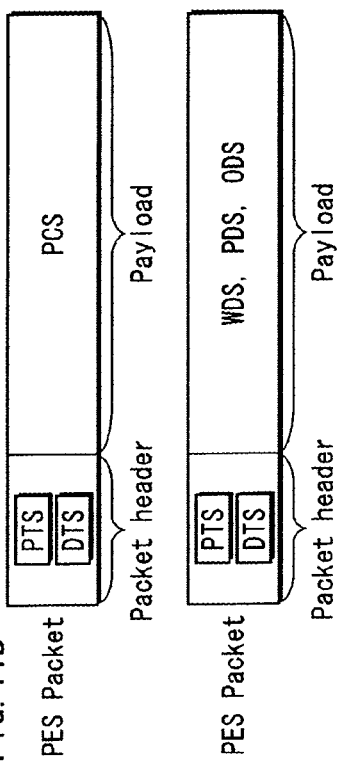
Figure 13:
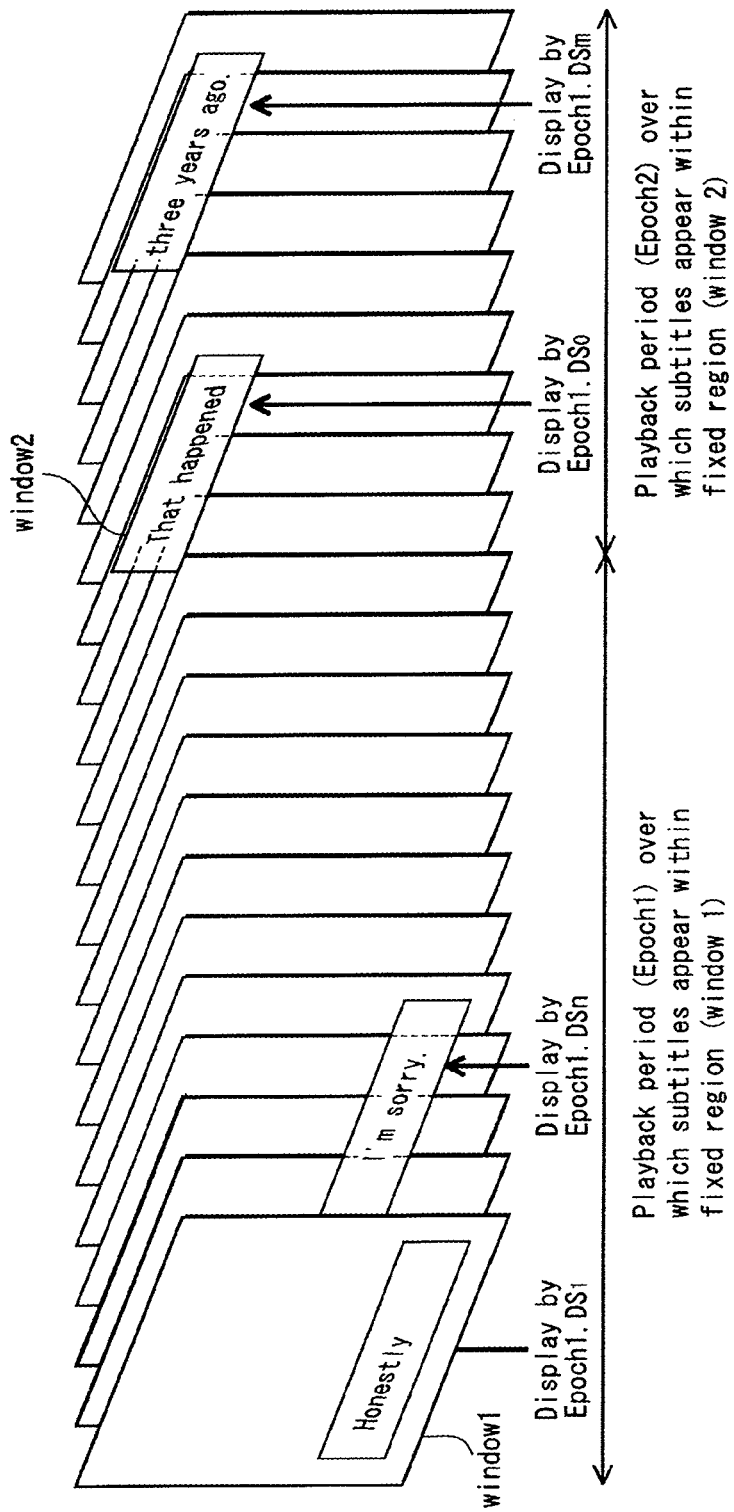
FIG. 13 depicts the relationship between the display position of subtitles and Epochs.

FIG. 11B depicts PES packets acquired by converting functional segments. As depicted in FIG. 11B, each PES packet is composed of a "packet header" and "payload", which is the data entity of the functional segment. The packet header contains a DTS and a PTS of the functional segment. In the following description, the DTS and PTS contained in the PES packet header of a functional segment is referred to as the DTS and PTS of the functional segment.

The functional segments of the various types mentioned above constitute a logical structure as shown in FIG. 12. FIG. 12 depicts the logical structure constituted by the various types of functional segments. In the figure, the third row depicts the functional segments, the second row depicts Display Sets, and the first row depicts Epochs.

Each Display Set (hereinafter, simply "DS") depicted on the second row is a set of functional segments constituting one screen of graphics data, out of graphics data contained in the graphics subtitle stream. A broken line kzl in the figure indicates the membership, i.e., which of the functional segments depicted on the third row belongs to which DS. It is shown that a series of functional segments PCS-WDS-PDS-ODS-END constitute one DS. By reading from the BD-ROM a plurality of functional segments constituting a DS, a playback apparatus is enabled to compose one screen of graphics data.

Each Epoch depicted on the first row refers to a period, on the playback time axis of the AV Clip, over which the memory management is continuous, and also refers to a group of data allocated to that period. The memory to be managed includes a graphics plane for storing one screen of graphics data and an object buffer for storing decompressed graphics data. The memory management is said to be continuous if no flash of the graphics plane and the object buffer occurs through the Epoch and erasing and rendering of graphics data occurs only during a limited rectangular area of the graphics plane. (*Note that to "flash" means to clear the entire graphics plane and the entire Object Buffer.) In other words the rectangular area is fixed in size and position over the Epoch. When deletion and rendering of graphics is performed within the fixed rectangular area, synchronization of graphics and video is ensured. In other words, the Epoch is a time unit on the playback time axis during which the synchronization between video and graphics is ensured. To change the predetermined area for which rendering/deletion is performed, it is necessary to define a change point on the playback time axis and set a new Epoch from that point forward. At the boundary between such two Epochs, the synchronization between video and graphics is not ensured.

Describing with reference to the position of subtitles on the display screen, an Epoch is said to be a period, on the playback time axis, during which subtitles are displayed only within a fixed rectangular area of the display screen. In this figure, the position of subtitles on the display screen is set to be changed during playback of a plurality of pictures, in consideration of the images presented by the respective pictures. Of the five lines of subtitles, which are "Honestly", "I'm sorry", "That happened", "three years ago", the first two lines of subtitles "Honestly" and "I'm sorry" are displayed at the bottom of the display screen, whereas the last two lines of subtitles "That happened" and "three years ago." are displayed at the top of the display screen. The display positions of subtitles are altered so as to correspond with empty regions of the screen in order not to interfere with the display of video images. In the case where the display position of subtitles is changed over time, the period during which the subtitles are displayed at the bottom of the display screen corresponds to Epoch 1 on the playback time axis of the AV Clip, and the period during which the subtitles are displayed on at the top of the display screen corresponds to Epoch 2. Thus, the two Epochs have different areas for rendering subtitles. During Epoch 1, the rendering area (Window 1) is in the bottom margin of the display screen. In Epoch 2 the rendering area (Window 2) is in the top margin of the display screen. During Epoch 1 as well as during Epoch 2, the memory management of the graphics plane and buffer is ensured to be continuous, so that subtitles are displayed seamlessly in the corresponding margin. This completes the description of Epochs. The following now describes Display Sets.

In FIG. 12, the broken lines hk1 and hk2 indicate to which Epoch each functional segment depicted on Line 2 belongs. Specifically, the series of DSs including Epoch Start, Acquisition Point, and Normal Case constitute an Epoch depicted on the first row. Note that "Epoch Start", "Acquisition Point", and "Normal Case" denote types of DSs. Though the Acquisition Point DS precedes the Normal Case DS in FIG. 12, this is merely an example and the order may be reversed.

An "Epoch Start" is a Display Set that indicates the start of a new Epoch. For this reason, an Epoch Start contains a complete set of functional segments necessary for constituting a display composition. An Epoch Start is provided at such a position that is likely to be chosen as a playback start point and the beginning of a chapter in a movie is one example.

An "Acquisition Point" is a Display Set that is not the start of an Epoch but contains a complete set of functional segments necessary for constituting a subsequent display composition. An Acquisition Point DS ensures that graphics is duly displayed as long as playback is started from the Acquisition Point DS. In other words, the Acquisition Point DS enables screen composition from a midpoint in the Epoch. Each Acquisition Point DS is provided at a position that may be chosen as a starting point, such as a position that is specifiable using a time search. The term "Time search" refers to an operation by which a user inputs a number of minutes/seconds to locate a corresponding playback point. The time is specified by a user input in units of, say, 10 seconds (or 10 minutes), so that playback points positioned at intervals of 10 seconds (or 10 minutes) will be specifiable using the time search. The Acquisition Point DSs are provided in positions that are specifiable using the time search, so that playback of the graphics subtitle stream is duly executed in response to a time search.

A "Normal Case" DS contains only difference data relative to the previous Display Set. For example, if a DSv has the same subtitles as an immediately preceding DSu but has a different display composition from the DSu, the DSv will be a Normal Case DS containing only a PCS and an END. With this arrangement, there is no need to provide ODSs that have already been provided. As a result, the amount of data stored on the BD-ROM can be reduced. On the other hand, it is not possible to display graphics using a Normal Case DS alone the DS contains difference data only.

The following now describes Definition Segments (ODS, WDS, and PDS).

The following describes the Definition Segments (ODS, WDS, and PDS).

An "Object_Definition_Segment" is a functional segment that defines a graphics object. The following describes graphics objects. AV Clips recorded on BD-ROMs feature an image quality equivalent to that of high-definition television pictures. The resolution for displaying graphics objects is set to an equivalently high 1920×1080. This high resolution permits reproduction of movie theater style subtitles (e.g. crisp handwriting style subtitles) on BD-ROMs. A graphics object is composed of a plurality of pieces of run-length data. Run-length data expresses a pixel string using a pixel code that indicates a pixel value and a continuous length of the pixel value. The pixel code is 8 bits in length, and takes a value of 1 to 255. The run-length data is able to select 256 colors of a possible 16,777,216 in accordance with the pixel code, and set the pixel color. Note that when a graphics object is for presenting subtitles, it is necessary to present the subtitles by disposing text strings on a transparent background.

Figure 14A:
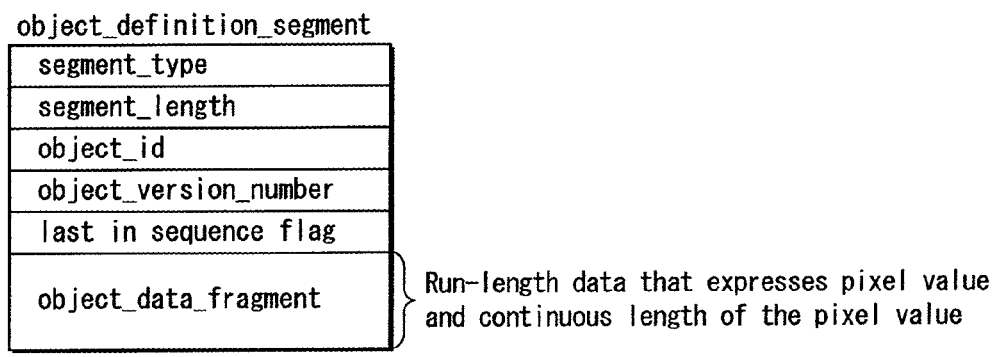
FIGS. 14A and 14B depict the data structure of ODS and PDS.

The ODS defines graphics subtitles according to a data structure shown in FIG. 14A. As shown in FIG. 14A, the ODS is composed of the following fields: "segment_type" indicating that the segment is of the ODS type; "segment_length" indicating the data length of the ODS; "object_id" uniquely identifying the graphics object corresponding to graphics subtitles in the Epoch; "object_version_number" indicating a version of the ODS in the Epoch; "last_in_sequence_flag"; and "object_data_fragment" containing a consecutive sequence of bytes corresponding to part or all of the graphics subtitles.

Figure 14B:
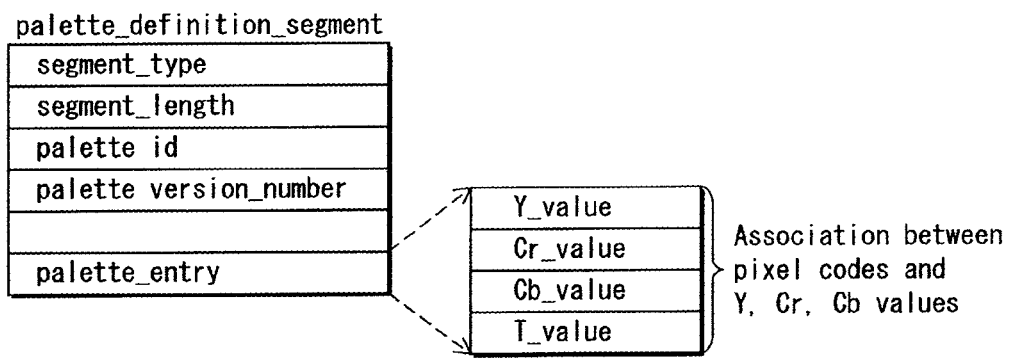

A "Palette Definition Segment (PDS)" is a functional segment storing pallet data. The palette data indicates combinations of pixel codes of 1 to 255 and pixel values. Each pixel value is composed of a red difference component (Cr value), a blue difference component (Cb value), a luminance component (Y value), and a transparency (T value). Each pixel code in the run-length data is converted into a pixel value indicated by the palette to generate a color. A data structure of PDS is shown in FIG. 14B. As shown in FIG. 14B, the PDS includes the following fields: "segment_type" indicating that the segment is of the PDS type; "segment_length" indicating the data length of the PDS; "palette_id" for uniquely identifying the palette included in the PDS, "palette_version_number" indicating a version of the PDS within the Epoch; and "palette_entry" carrying information for each entry. The "palette_entry" field indicates a red difference component (Cr_value), a blue difference color component (Cb_value), a luminance component (Y_value), and a transparency (T_value) for each entry.

The following describes a WDS.

A "window_definition_segment" is a functional segment that defines a rectangular area on the graphics plane. As described above, the memory management is continuous over an Epoch on condition that clearing and rendering takes place only within a fixed rectangular area on the graphics plane. The rectangular area on the graphics plane is called a "Window", and is defined by a WDS. FIG. 15A depicts a data structure of a WDS. As shown in the figure, a WDS includes the following fields: "window_id" uniquely identifying the Window on the graphics plane; "window_horizontal_position" indicating the horizontal position of a top left pixel on the graphics plane; and "window_vertical_position" indicating a vertical position of a top left pixel on the graphics plane; "window_width" indicating a width of the Window on the graphics plane; and "window_height" indicating a height of the Window on the graphics plane.

The following describes the values that window_horizontal_position field, the window vertical_position field, and the window_width field may take. These fields relate to the coordinate system defining the internal area of the graphics plane. This graphics plane has a two-dimensional area having a size defined by the values of video_height and video_width.

The window_horizontal_position field specifies a horizontal position of the top left pixel of the Window on the graphics plane, and thus takes a value in a range of 1 to the video_width. The window_vertical_position field specifies the vertical position of the top left pixel of the Window on the graphics plane, and thus takes a value in a range of 1 to the video_height.

The window_width field specifies the width of the Window on the graphics plane, and thus takes a value in a range of 1 to (video_width)−(window_horizontal_position). The window_height field specifies the height of the Window on the graphics plane, and thus takes a value in a range of 1 to (video_height)−(window_vertical_position).

The position and size of a Window can be defined for each Epoch using the window_horizontal_position, window_vertical_position, window_width, and window_height fields in the WDS. Thus, adjustments may be made at the time of authoring, such that the Window does not interfere with elements of the picture over the period of an Epoch. For instance, the Window may be made to appear in a desired margin to ensure subtitles displayed using graphics are clearly viewed. Since a WDS may be defined for each epoch, the graphics is displayed at a suitable position on the display screen, as elements of the picture change with time. This maintains that graphics are displayed at the suitable position for ensuring clear view of the graphics. As a result, the quality of the movie product can be raised to the level of a cinema film, in which subtitles are integrated into the picture.

The following describes an "END of Display Set Segment". The END of Display Set Segment is a functional segment indicating that transmission of a Display Set is complete, and is positioned immediately after the last ODS in the Display Set. The END of Display Set Segment includes the following fields: "segment_type" indicating that the segment is of the END of Display Set type; and "segment_length" indicating the data length of the END of Display Set Segment. The fields of the END of Display Set Segment do not specifically require description and thus not depicted in the figures.

This concludes the description of ODS, PDS, WDS and END. The following now describes a PCS.

The PCS is a functional segment for constituting an interactive screen. FIG. 15B depicts a data structure of the PCS. As shown in FIG. 15B, the PCS includes the following fields: "segment_type"; "segment_length"; "composition_number"; "composition_state"; "palette_update"; "palette_id_ref"; and "composition_object (1) to (m)".

The "composition_number" field identifies a graphics update in the Display Set, using a number from 0 to 15. Specifically, the composition_number field is incremented by one for each graphics update from the beginning of the Epoch to the PCS containing the composition_number field.

The "composition_state" field indicates whether the Display Set starting from the PCS is a Normal Case, an Acquisition Point, or an Epoch Start.

The "palette_update_flag" field indicates whether the PCS describes a Palette-only Display Update. The Palette-only Display Update is an update that is limited to replacing the palette with a new palette. To indicate a Palette-only Display Update, the palette_update_flag is set to 1.

The palette_id indicates whether the PCS describes a Palette-only Display Update. The Palette-only Display Update is an update that is limited to replacing the palette with a new palette. To indicate a Palette-only Display Update, the palette_id is set to 1.

The "composition_object" fields (1) to (n) each contain control information for realizing a display composition using the Display Set to which the PCS belongs. In FIG. 15B, a composition_object (i) is expanded, as indicated by broken lines wd1, to illustrate an internal structure of the composition_object fields. As illustrated, the composition object(i) includes the following fields: "object_id_ref"; "window_id_ref"; "object_cropped_flag"; "object_horizontal_position"; "object_vertical_position"; and "cropping_rectangle_information(1)(2) . . . (n)".

The "object_id_ref" field contains a reference value that is a graphics subtitle identifier (object_id). This reference value identifies the graphics subtitles to be used to present the display composition corresponding to the composition_object(i).

The window_id_ref field contains a reference value that is a window identifier (window_id). This reference value specifies the Window in which the graphics subtitles is to be displayed to present the display composition corresponding to the composition_object(i).

The "object_cropped_flag" field indicates whether or not graphics subtitles cropped in the object buffer is to be displayed. When the object_cropped_flag field is set to 1, the cropped graphics subtitles in the object buffer is displayed. When the object_cropped_flag field is set to 0, the cropped graphics subtitles in the object buffer is not displayed.

The object_horizontal_position field specifies a horizontal position of the top left pixel of the graphics subtitles on the graphics plane.

The object_vertical_position field specifies a vertical position of the top left pixel of the graphics subtitles on the graphics plane.

The "cropping_rectangle information (1), (2) . . . (n)" fields are valid when the "object_cropped_flag" field is set to 1. The cropping_rectangle information(i) is expanded, as indicated by broken lines wd2, to illustrate an internal structure of the composition_rectangle information. As indicated by the broken lines, the cropping_rectangle information(i) includes the following fields: "object_cropping_horizontal position"; "object_cropping_vertical position"; "object_cropping_width"; and "object_cropping_height".

The object_cropping_horizontal position field specifies a horizontal position of the top left corner pixel of a cropping rectangle for graphics subtitles on the graphics plane. The cropping rectangle is used to crop a portion of the graphics subtitles and corresponds to a "Region" in the ESTI EN 300 743 standard.

The "object_cropping_vertical_position" specifies a vertical position of a top left pixel of the graphics object on the graphics plane.

The "object_cropping_width" field specifies a width of the cropping rectangle in the graphics object.

The "object_cropping_height" field specifies a width of the cropping rectangle in the graphics object.

This concludes the description of the data structure of PCS. The following describes a specific example of the PCS. In the example, the subtitles "Honestly" and "I'm sorry" are displayed in sequence by writing to a plurality of graphics planes as the video playback proceeds. The Epoch in this example includes DS1 (Epoch Start) and DS2 (Normal Case). The DS1 includes a WDS defining a window in which the subtitles are to be displayed, an ODS representing the line "Honestly, I'm sorry", and a first PCS. The DS2 (Normal Case) includes a second PCS.

Figure 16B:
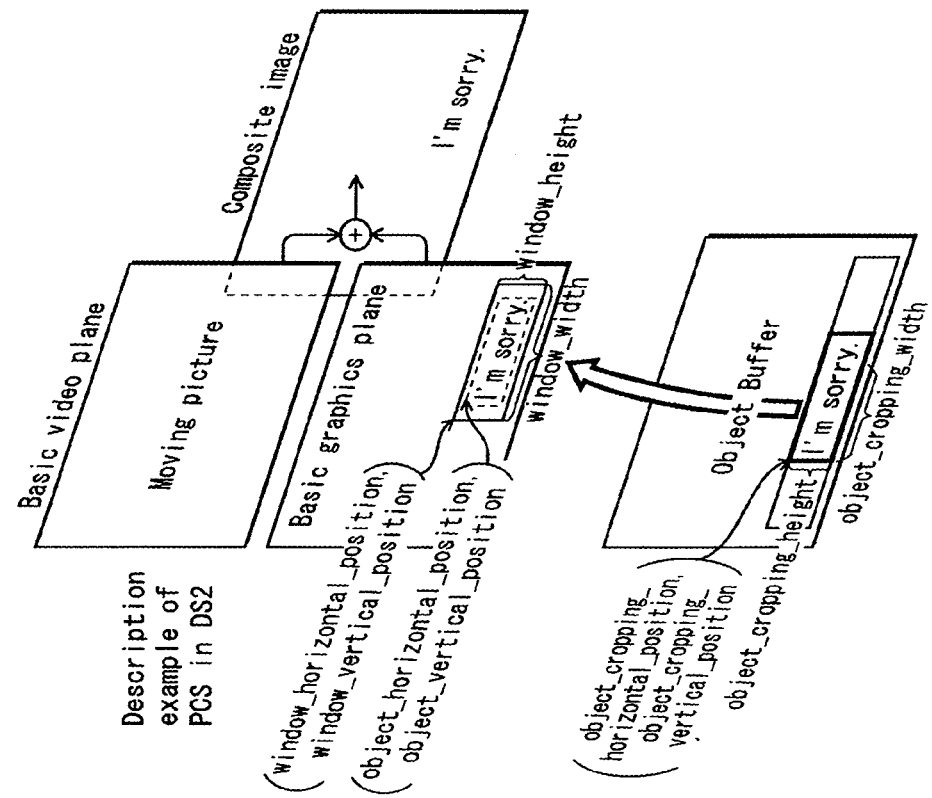
FIGS. 16A and 16B depict examples of the description of a PCS included in a Display Set.
Figure 16A:
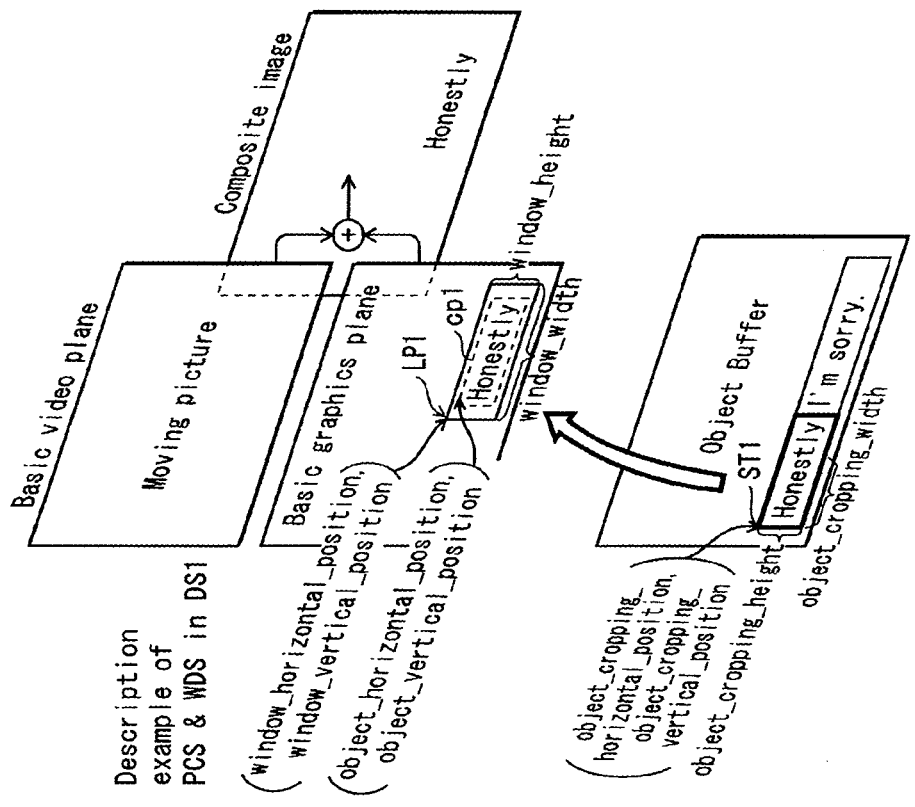

The following describes the data description of each PCS. FIG. 16A depicts examples of the WDS and PCS included in a Display Set. FIG. 16B depicts an example of the PCS in a Display Set.

In FIG. 16A, the window_horizontal_position field and the window_vertical field value in the WDS specify the top left coordinates LP1 of the Window on the graphics plane. The window_width field and the window_height field in the WDS specify the height and width of the Window.

In FIG. 16A the object_cropping_horizontal_position field and the window_vertical_position field that are included in the crop information specify a basepoint SDT of a cropping rectangle in a coordinate system whose origin is the top left of the of the graphics object in the object buffer. The cropping rectangle (enclosed by a thick line) is then defined using the values of the object_cropping_height field, the object_cropping_width field, and the basepoint STD. The cropped graphics object is then disposed in a region cp1 (enclosed by a broken line) so that a top left corner of the cropped Graphics Object lies at a pixel specified by an object_horizontal_position field value and an object_vertical position field value in the coordinate system of the graphics plane. This causes the subtitles "Honestly" to be written into the window of the graphics plane. Consequently, the next line of the subtitles "Honestly" is overlaid with the moving picture.

FIG. 16B depicts the PCS in DS2. Since the WDS in FIG. 16B is the same as that of FIG. 17, the description of the WDS is omitted. The crop information in FIG. 16B, however, differs from that of FIG. 16B. The object_cropping_horizontal_position and the object_cropping_vertical_position specify the top left coordinates of a cropping rectangle corresponding to "I'm sorry" from the line "Honestly I'm sorry", and the object_cropping_height and object_cropping_width specify the height and width of the cropping rectangle corresponding to "I'm sorry". This causes "I'm sorry" to be rendered into the Window on the graphics plane. Consequently, the subtitle "I'm sorry" is overlaid with the moving picture.

This concludes the description of the functional segments. The following describes how Display Sets including the PCSs and ODSs are allocated to the playback time axis of the AV Clip. An Epoch is a period on the playback time axis over which memory management is continuous, and each Epoch constitutes one or more Display Sets. At issue, therefore, is the manner in which the one or more Display Sets are allocated to the playback time axis. Note that the playback time axis is defined to prescribe decoding timings and playback timings for each frame of picture data making up the video stream that is multiplexed into the AV Clip. The decoding timing and playback timing are expressed in an accuracy of 90 KHz. The DTS and PTS attached to the PCS and ODS in the Display Set specify timings for establishing synchronous control on the playback time axis. In other words, the DSs are allocated to the playback time axis in order to carry out synchronous control using the DTSs and PTSs associated with the PCSs and ODSs.

Figure 17:
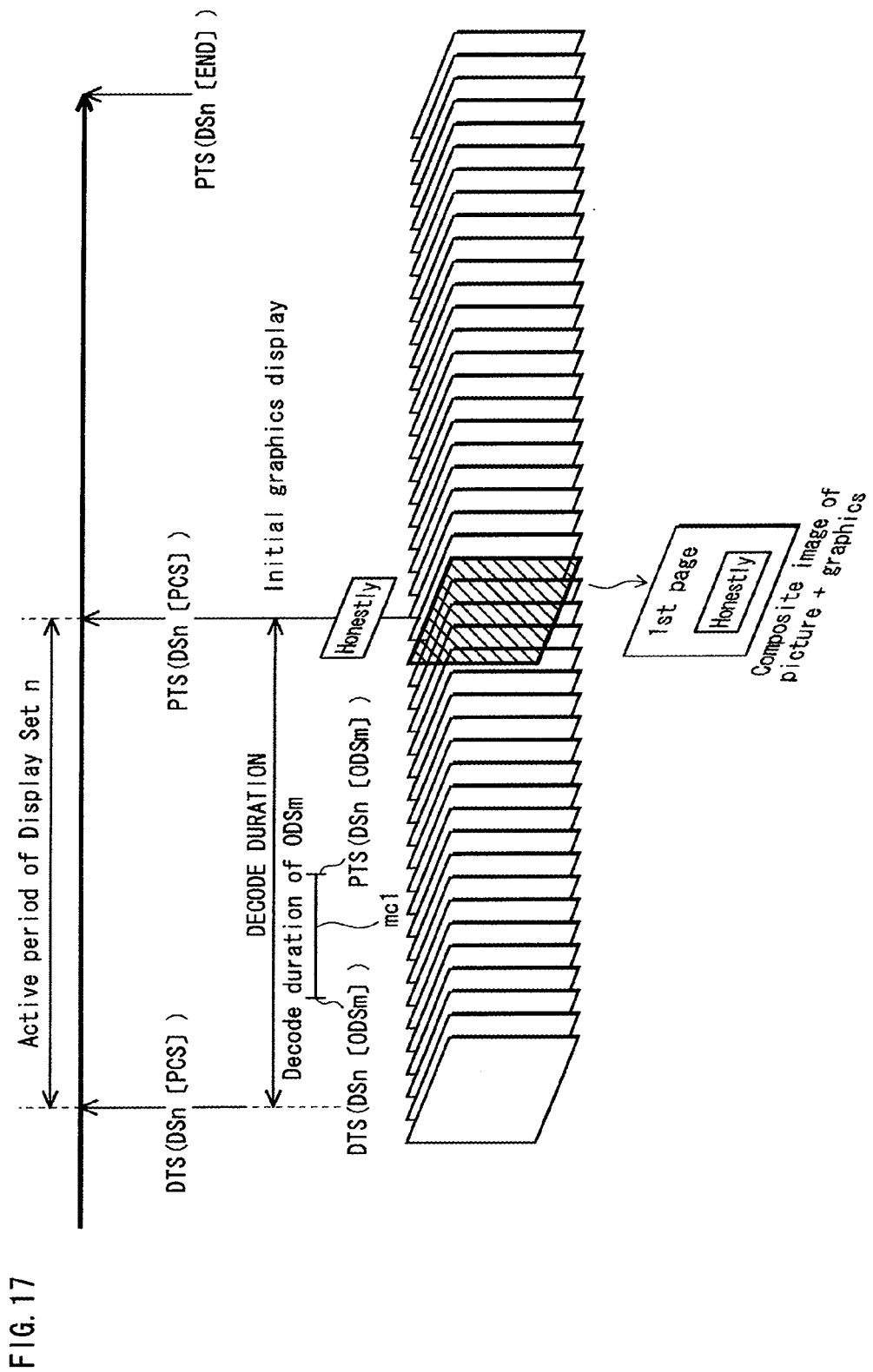
FIG. 17 depicts a playback time axis of an AV Clip to which a DSn is allocated.

Suppose that a DSn denotes an arbitrary one of Display Sets belonging to the Epoch. Then, the DSn is allocated to the playback time axis using a PTS and DTS which are set as shown in FIG. 17. FIG. 17 shows the AV Clip playback time axis to which the DSn has been allocated. In FIG. 17, the start of the DSn period is specified by a DTS value (DTS (DSn [PCS])) of a PCS belonging to the DSn, and the end of the period is specified by a PTS value (PTS (DSn [PCS])) of the same PCS. The timing for the first display is also specified by the PTS value (PTS (DSn [PCS])) of the PCS. If the timing of a desired picture in a video stream is matched with the PTS (DSn [PCS]), the first display of the DSn will synchronize with the video stream.

The PTS (DSn [PCS]) is a value obtained by adding a period for decoding ODS (DECODEDURATION) to the DTS (DSn [PCS]).

The ODS necessary for the first display is decoded within the DECODEDURATION. In FIG. 17, a period mci is a period during which an arbitrary ODS (ODSm) belonging to the DSn is decoded. The starting point of the decode period mci is specified by DTS (ODSn [ODSm]), and the end point of the decode period mc1 is specified by PTS (ODSn [ODSm]).

The Epoch is therefore prescribed by allocating each of the ODSs in the Epoch to the playback time axis. This concludes the description of the allocation to the playback time axis.

This concludes the description of the graphics stream.

FIG. 18 depict types of graphics subtitles defined by ODSs. FIG. 18A depicts graphics subtitles presented in the Hiragana alphabet, which is one of Japanese alphabets. FIG. 18B depicts graphics subtitles presented with a Kana reading. FIG. 18C depicts graphics subtitles in enlarged characters. FIGS. 18D and 18E depict graphics subtitles presented in stylized characters each of which appear as having a depth. Note that the characters in subtitles depicted in FIG. 18D are those viewed from a slightly different angle from the characters in subtitles depicted in FIG. 18D. Thus, the stylized characters of one of the viewing angles may be presented as the left-view subtitles and the other as the right view, in synchronization with the left-view video images and the right-view video images. As a consequence, the stereoscopic viewing of the subtitles are realized, in addition to the stereoscopic viewing of video images. These types of subtitles are selectively used depending on the display control of subtitles, provided that the display control of subtitles is valid.

The following describes an improvement on implementation of stereoscopic viewing using this graphics stream.

Figure 19:
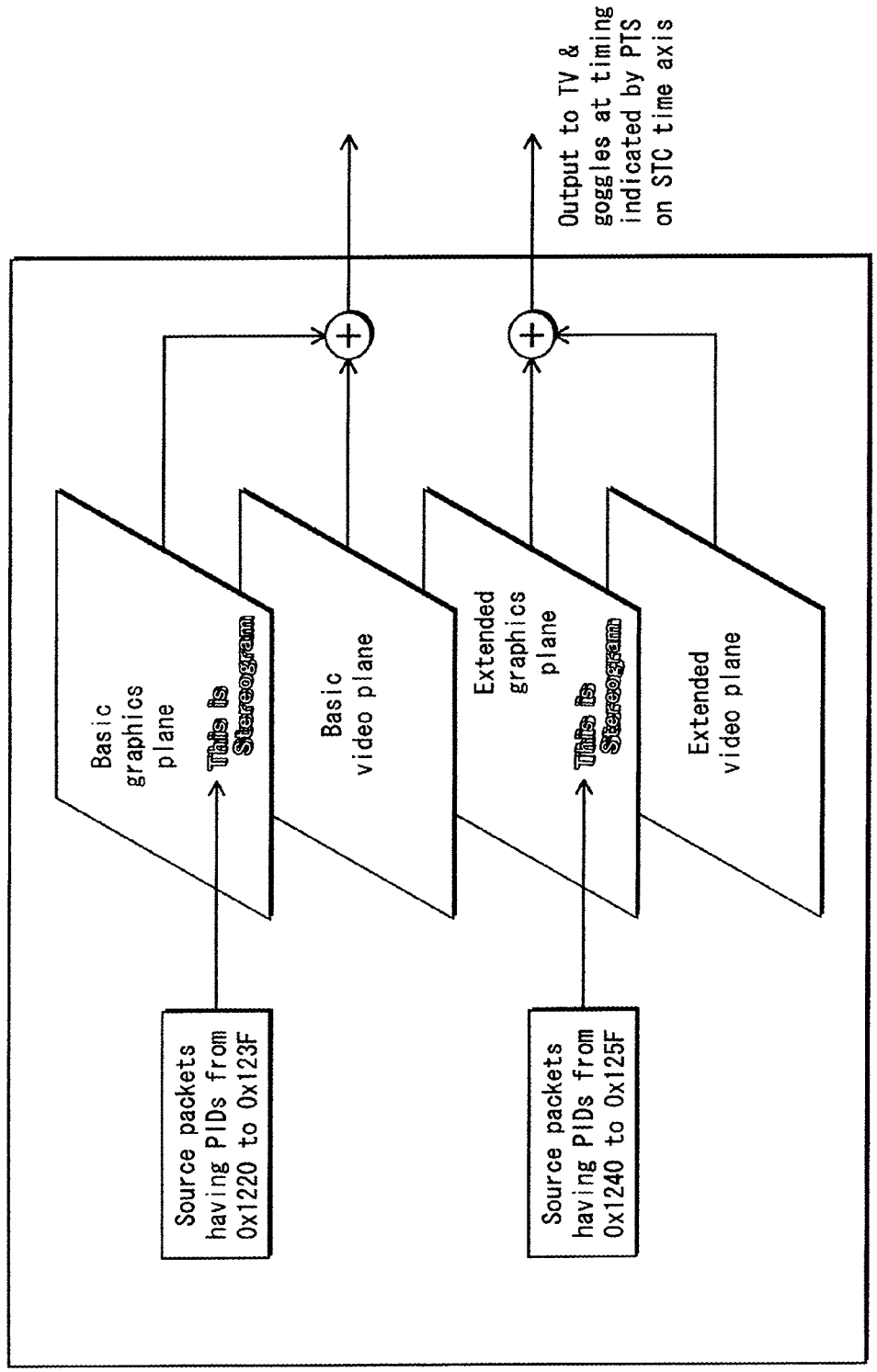
FIG. 19 depicts how a subtitle stream for presenting the BaseView and a subtitle stream for presenting an EnhancedView are decoded.

FIG. 19 depicts how a subtitle stream for presenting the BaseView and a subtitle stream for presenting an EnhancedView are decoded.

In order to realize the stereoscopic viewing, two systems of the graphics decoder, graphics plane, and video plane as described above need to be provided. One of the two systems is for presenting the BaseView and the graphics decoder, the graphics plane, and the video plane in the BaseView system are referred to as a basic graphics decoder, a basic graphics plane, and a basic video plane, respectively. Similarly, the graphics plane, and the video plane in the EnhancedView system are referred to as an enhanced graphics decoder, an enhanced graphics plane, and an enhanced video plane, respectively.

As described above, source packets having the PIDs falling within a range of 0x1220 to 0x123F are decoded by the basic graphics decoder, so that graphics subtitles obtained by decoding the source packets are stored to the object buffer included in the basic graphics decoder, rendered on the basic graphics plane to be overlaid with pictures stored on the basic graphics plane.

In parallel with the above, source packets having the PIDs falling within a range of 0x1240 to 0x125F are decoded, so that graphics subtitles obtained by decoding the source packets are stored to the object buffer included in the enhanced graphics decoder, rendered on the enhanced graphics plane to be overlaid with pictures stored on the enhanced graphics plane.

Here, the pair of graphics subtitles configured to present different side-by-side perspectives of characters with a depth shown in FIG. 18 are presented one on the basic graphics plane and the other on the enhanced graphics plane. As a result, the graphics appear closer than the video images toward the viewer.

FIG. 20 depicts one example of a stereoscopic image perceived by the viewer when playback of a pair of Baseview and EnhancedView video streams are executed in synchronism with playback of a pair of Baseview and EnhancedView subtitle streams. Since the graphics are rendered on each of the basic graphics plane and the enhanced graphics plane, the stereoscopic subtitles are presented on the stereoscopic video images.

Figure 21A:
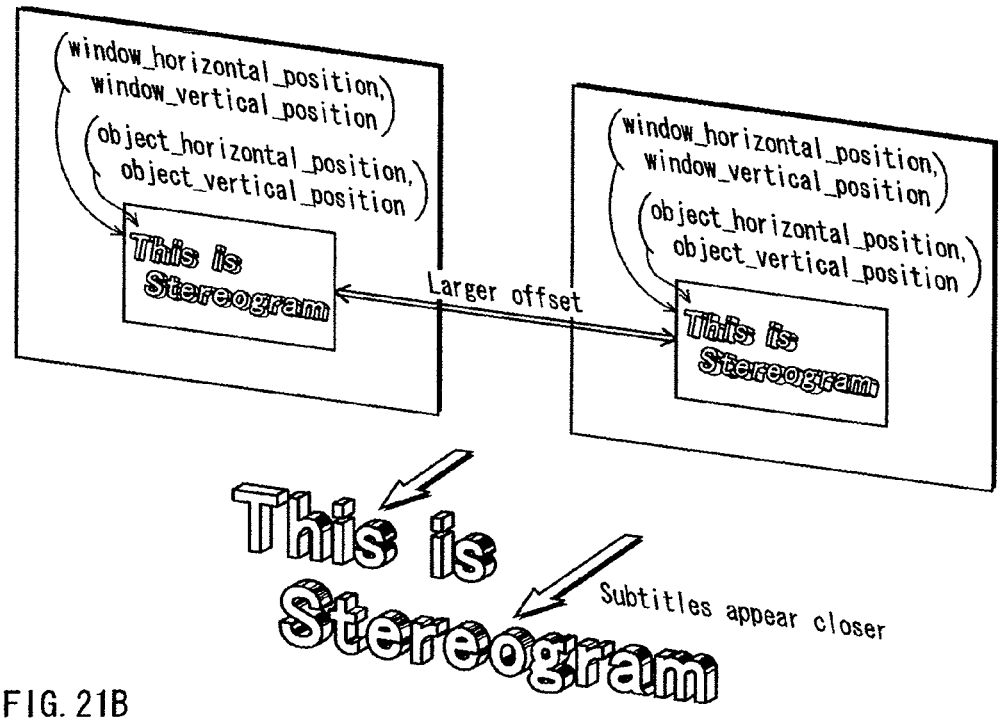
FIGS. 21A and 21B depict how the display of stereoscopic subtitles are affected by the coordinates of a window defined on a graphics plane by a window_horizontal_position field and a window_vertical_position field and the coordinates of graphics subtitles defined on the graphics plane by a object_horizontal_position field and object_vertical_position field.
Figure 21B:
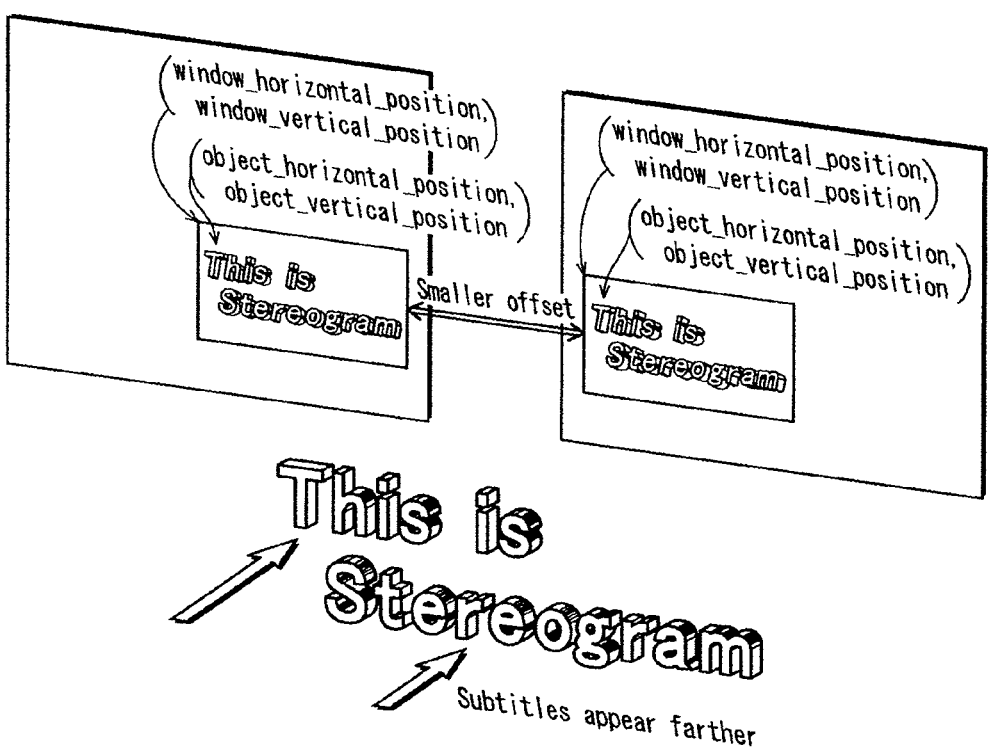

FIG. 21 depict how the display of stereoscopic subtitles are affected by the coordinates of the window on the graphics plane defined by the window_horizontal_position field and the window_vertical_position field and the coordinates of the graphics subtitles on the graphics plane defined by the object_horizontal_position field and the object_vertical_position field. In FIG. 21, the term "offset" refers to the distance between (i) the window and the graphics subtitles on the left-view graphics plane and (ii) the window and the graphics subtitles on the right-view graphics plane. FIG. 21A shows an example in which the offset is greater and thus the spacing between the left-view subtitles and the right-view subtitles is greater. On the other hand, FIG. 21B shows an example in which the offset is smaller and thus the spacing between the left-view subtitles and the right-view subtitles is smaller.

As shown in FIG. 21A, the stereoscopic subtitles are perceived to appear closer toward the viewer with an increase in the distance between (i) the position of the window (and thus the graphics subtitles) on the left-view graphics plane and (ii) the position of the window (and thus the graphics subtitles) on the right-view graphics plane. Conversely, the stereoscopic subtitles are perceived to appear farther away from the viewer with a decrease in the distance between (i) the position of the window (and thus the graphics subtitles) on the left-view graphics plane and (ii) the position of the window (and thus the graphics subtitles) on the right-view graphics plane.

In view of the above the principles, at the time of authoring, the PCS of the BaseView graphics stream and the PCS of the EnhancedView stream need to be appropriately set in a manner that the window_horizontal_position field, the window_vertical_position field, the object_horizontal_position field, the object_vertical_position field of the respective PCSs define the suitable coordinates to cause the stereoscopic subtitles to appear at an appropriate position relatively to the stereoscopic video images.

This concludes the description of the internal structure of Baseview and EnhancedView subtitle streams. The following now describes a clip information file.

The subtitles may be presented by the above-described graphics subtitle stream defined by run-length graphics data or by a text subtitle stream defined by text code and font. The respective types of subtitle streams differ in data structure but are both used to present subtitles in the same manner. As compared with a test subtitle stream, a graphics subtitle stream requires more trouble at the time of authoring but more advantageous in that the depth of stereoscopic viewing is suitably expressed and thus high-quality playback is realized.

<Clip Information File>

Figure 22:
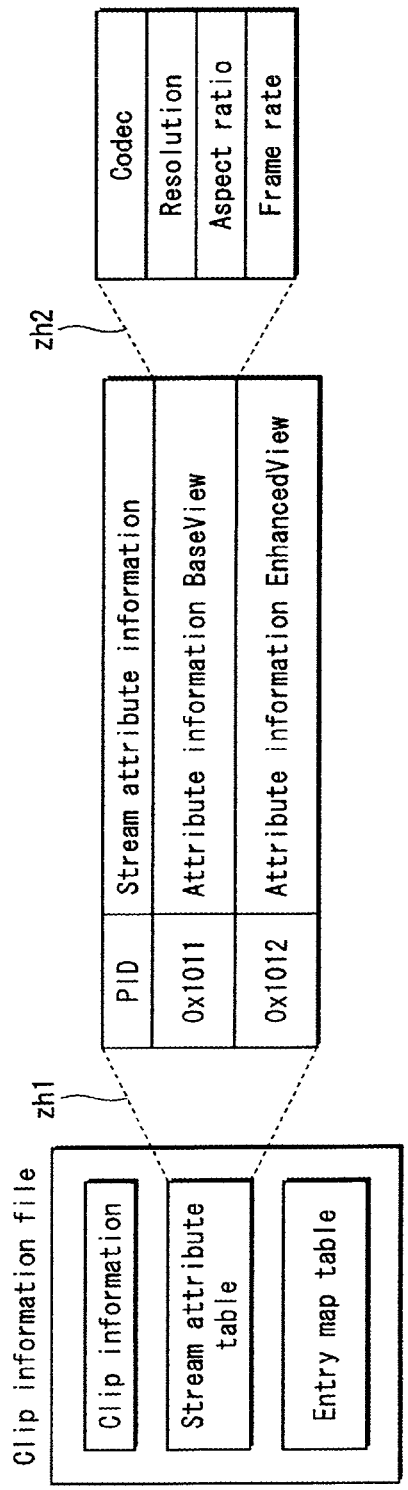
FIG. 22 depicts an example of Clip information file.

FIG. 22 depicts one example of the clip information file. As shown in the figure, each clip information file contains management information for an AV clip. The clip information files are provided in one to one correspondence with the AV clips, and are each composed of a stream attribute table and an entry map table.

A lead line zh1 shows a close-up of an internal structure of a stream attribute table. As shown by the lead line, the stream attribute table contains, for each PID, a piece of attribute information of a corresponding stream included in the AV clip. The attribute information includes different information for each BaseView stream and EnhancedView stream.

A lead line zh2 shows a close-up of an internal structure of the BaseView stream. As shown by the lead line, the stream attribute information of the BaseView stream composed of TS packets having the PID=0x1011 specify the codec, resolution, aspect ratio, and frame rate.

The following describes an internal structure of the entry map table.

The entry map table shows a relationship between a source packet number of an arbitrary source packet and a PTS on an STC time axis, from among STC time axes specified with use of a packet ID.

The STC time axis is a time axis of a MPEG2-TS defined to indicate a decode time and a display time. An "STC sequence" refers to a series of source packets that are without any discontinuity in STC (System Time Clock), which is the system time-base for the AV streams.

Figure 23A:
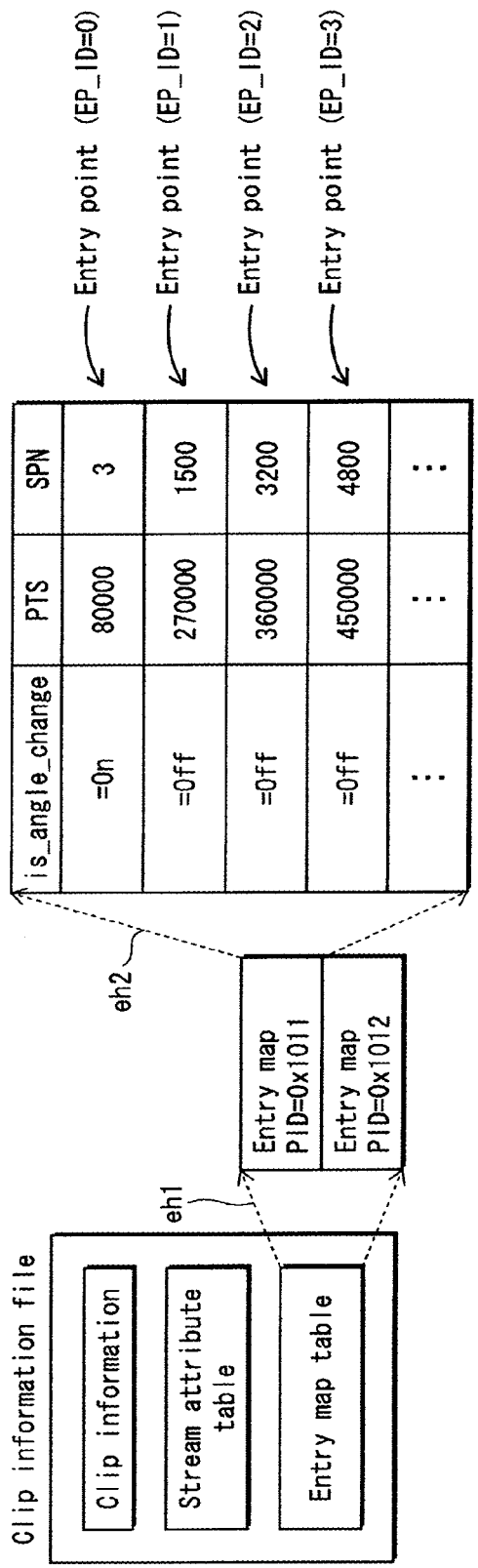
FIGS. 23A and 23B depict the internal structure of an entry map table.

FIG. 23A depicts an internal structure of the entry map table. A lead line eh1 shows a close-up of the internal structure of the entry map table.

As shown by the lead line eh1, entry maps are provided one for each packetized elementary stream composed of a plurality of types of TS packets. More specifically, one entry map is provided for a BaseView stream composed of TS packets having the PID=0x1011, and one entry map for an EnhancedView stream composed of TS packets having the PID=0x1012. The entry maps indicates a plurality of "entry points" each of which is information made up of a pair of a PTS and an SPN. Each entry point has, in addition to the PTS and SPN, a display method flag (an "is_angle_change" flag) indicating whether decoding from that SPN is possible. Also, a value that is incremented for each entry point from a start point of 0 is called an "entry point ID" (hereinafter referred to as "EP_ID").

With use of this entry map, the playback apparatus is enabled to specify the location of a source packet corresponding to an arbitrary point on the time axis of the video stream. For example, when performing a special playback operation such as fast forward or rewind, the playback apparatus is enabled to effectively execute the playback without analyzing an AV clip, by selecting an I picture registered in the entry map as the playback start point. Also, an entry map is provided for each video stream multiplexed into the AV clip, and are managed with use of PIDs.

The lead line eh2 shows a close-up of an internal structure of the entry map of an elementary stream composed of source packets having the PID=0x1011. The entry map indicates entry points corresponding to EP_ID=0, EP_ID=1, EP_ID=2, and EP_ID=3. The entry point corresponding to EP_ID=0 is composed of an is_angle_change flag set to ON, an SPN=3, and a PTS=80000. The entry point corresponding to EP_ID=1 is composed of an is_angle_change flag set to OFF, an SPN=1500, and a PTS=270000.

The entry point corresponding to EP_ID=2 is composed of an is_angle_change flag set to OFF, an SPN=3200, and a PTS=360000. The entry point corresponding to EP_ID=3 is composed of an is_angle_change flag set to OFF, an SPN=4800, and a PTS=450000.

Figure 23B:
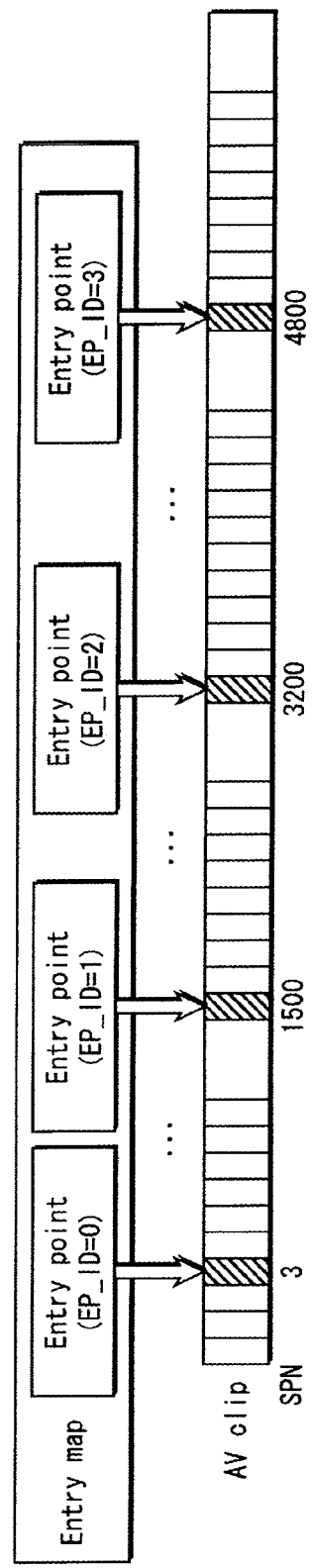

FIG. 23B shows source packets specified by the plurality of entry points in the entry map corresponding to the TS packets PID=0x1011 shown in FIG. 23A. The entry point corresponding to EP_ID=0 indicates SPN=3, and this source packet number is associated with PTS=80000. The entry point corresponding to EP_ID=1 indicates SPN=1500, and this source packet number is associated with PTS=270000.

The entry point corresponding to EP_ID=2 indicates the source packet having SPN=3200, and this source packet number is associated with PTS=360000. The entry point corresponding to EP_ID=3 indicates the source packet having SPN=4800, and this source packet number is associated with PTS=450000.

Figure 24:
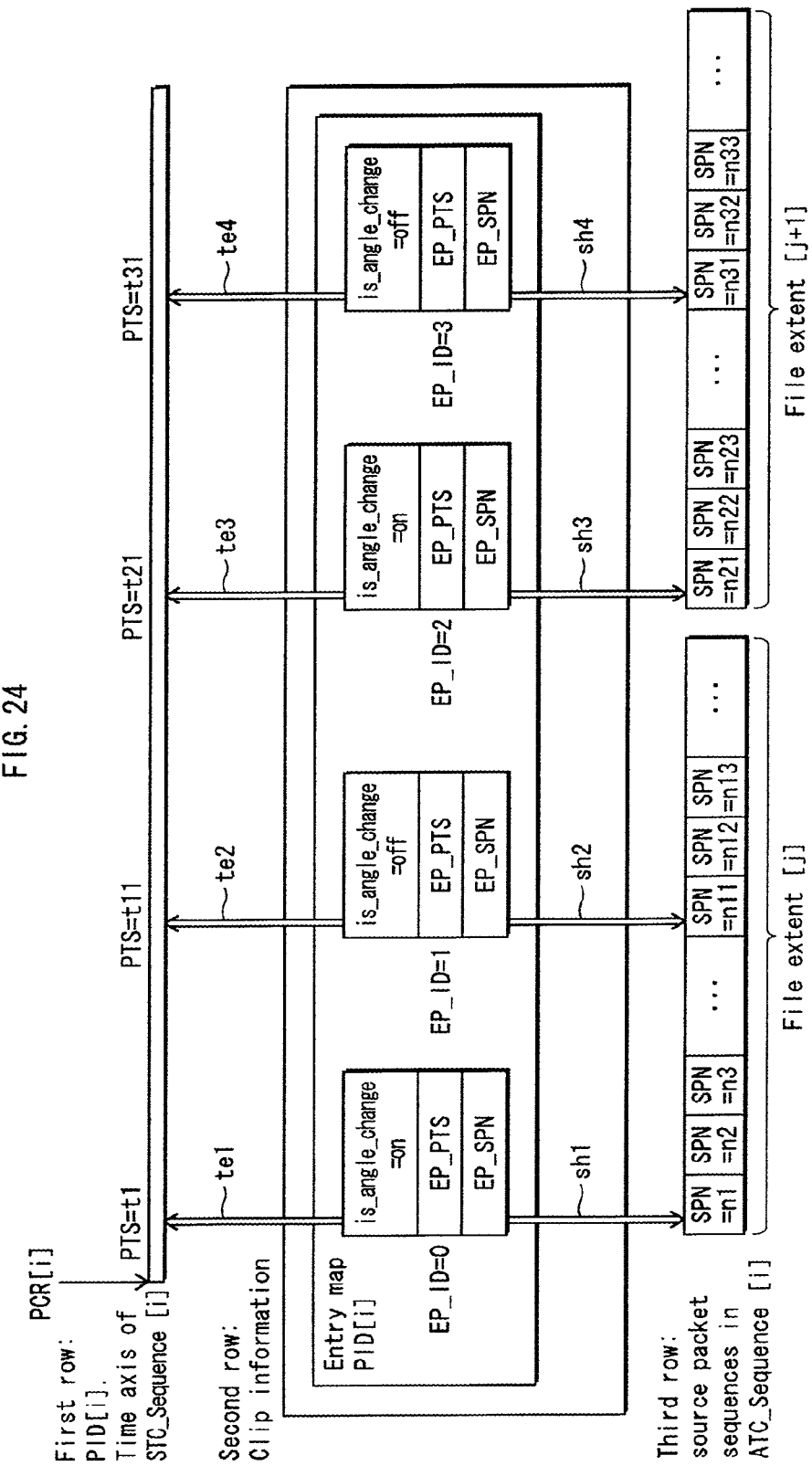
FIG. 24 depicts entry points registered in an entry map.

FIG. 24 depicts entry points registered in an entry map. The first row depicts a time axis stipulated by an STC sequence. The second row depicts an entry map in clip information. The third row depicts source packet sequences in the STC sequence.

The arrows te1, te2, te3, and te4 schematically show a correspondence relationship between the playback points t1, t11, t21, and t31 in the STC time axis and respective entry points. The arrows sh1, sh2, sh3, and sh4 schematically show a correspondence relationship between SPN=n1, n11, n21, and n31 and respective entry points.

Consider the entry map that specifies source packets having SPN=n1, from among the source packets in the ATC sequence. In the case of this entry map, the PTS is set to indicate t1 in the STC sequence. This entry map enables the playback apparatus to execute random access to SPN=n1 in the ATC sequence, with use of the time point PTS=t1 in the STC sequence. Also, if the source packet SPN=n21 is specified from among the source packets in ATC sequence, in the PTS of the entry map is set to indicate t21 in the STC sequence. This entry map enables the playback apparatus to execute random access to SPN=n21 in the ATC sequence, with use of the time point PTS=t21.

Figure 25:
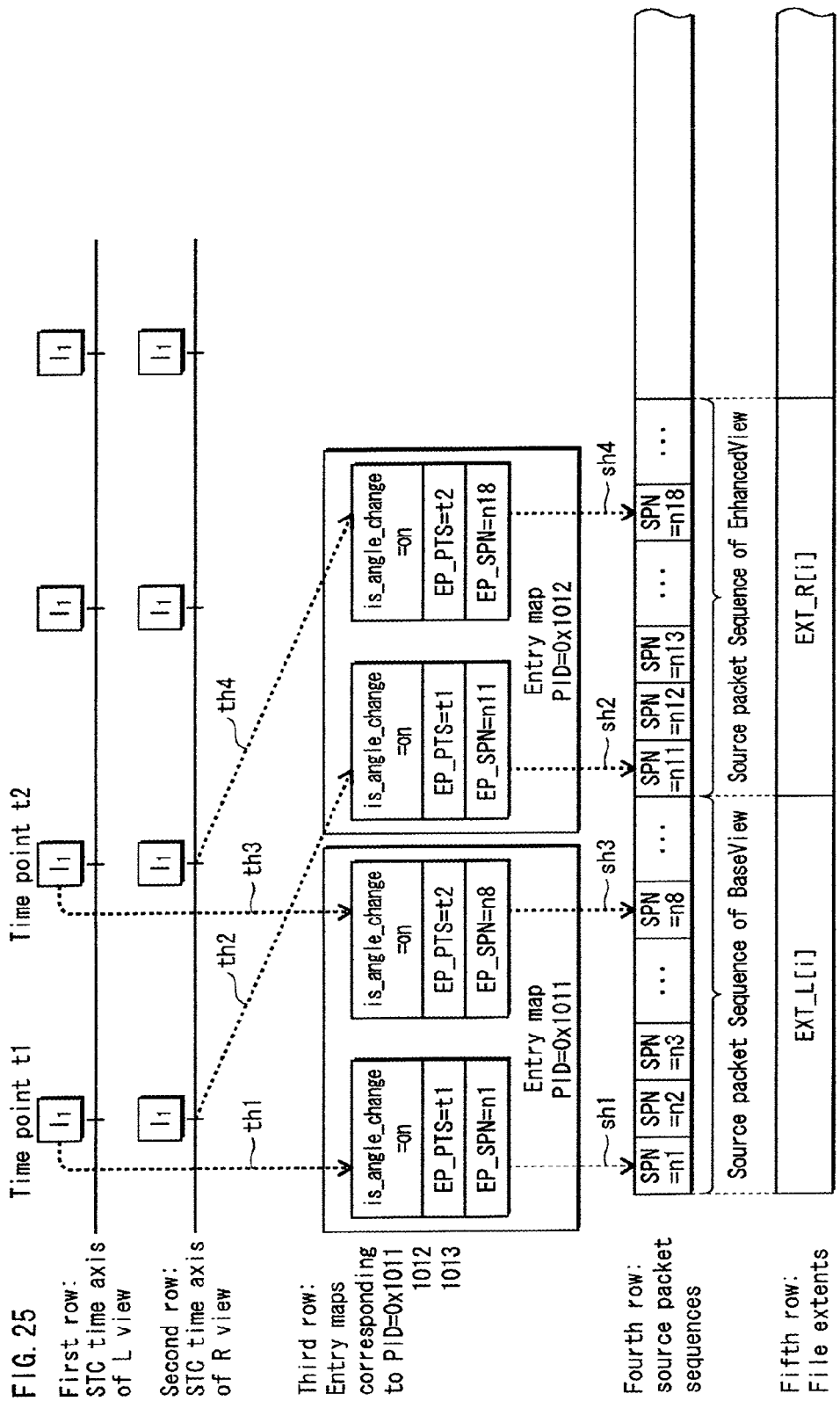
FIG. 25 depicts how entry maps corresponding to each of the left view and the right view are set.

FIG. 25 depicts how entry maps corresponding to each of the left view and the right view are set. According to the correspondences in FIG. 25, a source packet number in the STC sequence is recorded as the source packet number of each entry map, and a PTS in the STC sequence is recorded as the PTS of each entry map. The entry maps indicate how the source packets correspond to the time axis.

The arrows th1, th2, th3, and th4 schematically show the correspondence between playback time points t1 and t2 on the STC time axis and the entry points. The arrows sh1, sh2, sh3, and sh4 schematically show the correspondences between the SPN=n1, n11, n8, and n18 in the ATC sequence.

The fifth row depicts extents of a left view and a right view recorded by interleaving, and is the same as the figures described above. The fourth row shows entry maps corresponding respectively to PID=0x1011 and PID=0x1012. The entry map corresponding to PID=0x1011 includes an entry point indicating n1 and an entry point corresponding to n8. These entry points indicate correspondences between n1 and n8, and t1 and t2 on the STC time axis. The entry map corresponding to PID=0x1012 includes an entry point indicating nil and an entry point indicating n18. These entry points show correspondences between n11 and n18, and t1 and t2 on the STC time axis.

That is, left and right view extents that are to be played back at the same time point on the time axis may be recorded in widely separated positions in the AV data recording area. Yet, with the use of entry maps corresponding respectively to the extents, source packets at the start of the right view extent and the left view extent may be uniquely accessed based on the corresponding PTS.

This concludes the description of the clip information files. Next, the details of the PlayList information are described.

Figure 26:
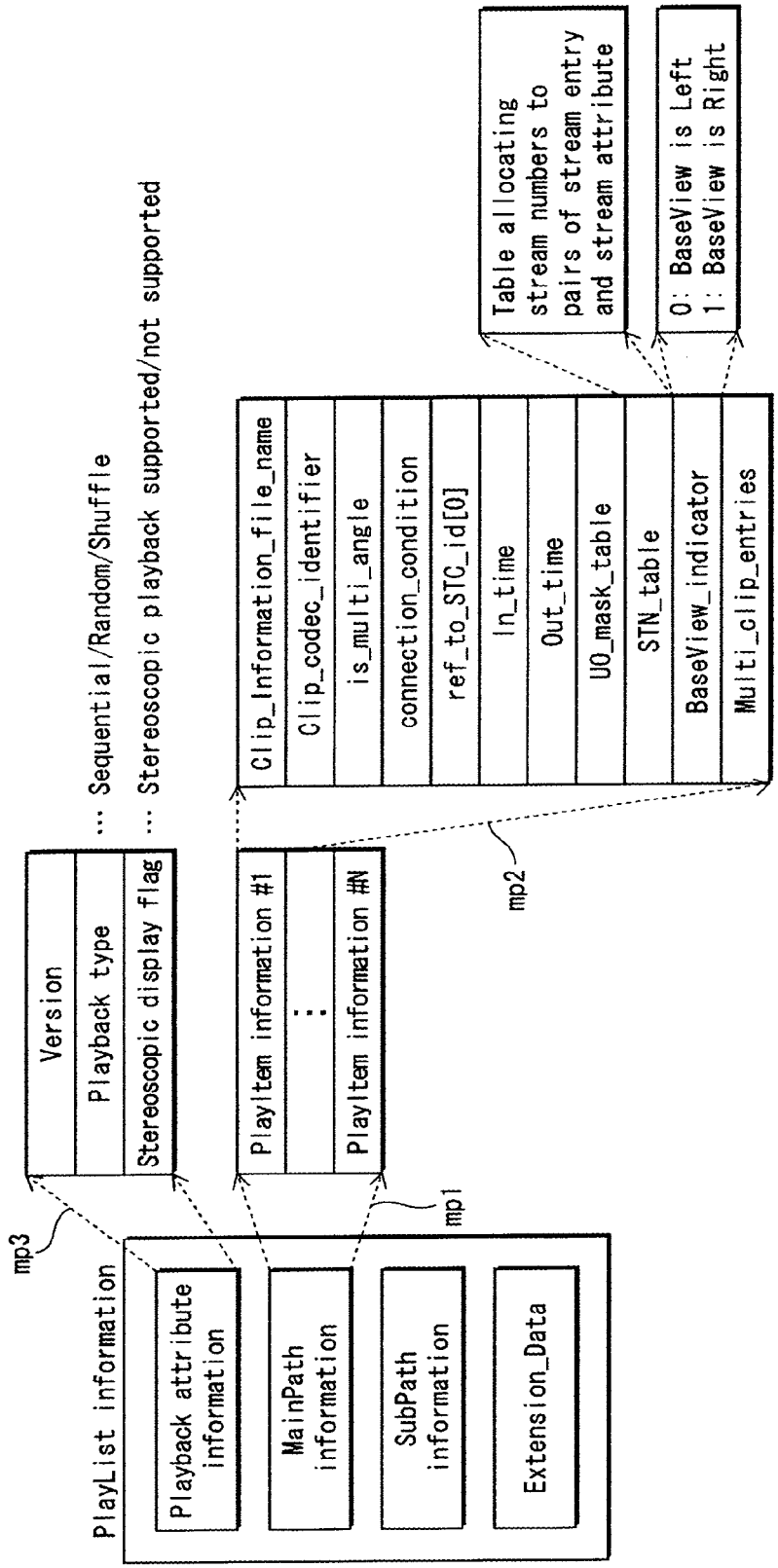
FIG. 26 depicts the data structure of PlayList information.

FIG. 26 depicts a data structure of PlayList information. In FIG. 26, the PlayList information shown by the lead line mp1 includes playback attribute information, MainPath information, a SubPath information table, and extension data.

First, playback attribute information is described. The lead line mp3 shows a close-up of an internal structure of playback attribute information. As shown with the lead line mp3, the playback attribute information includes "version number" indicating the version of the standards on which the content is based, "playback type", and "stereoscopic playback flag". The "version number" field may store a value such as "2.00" indicating the version of the BD-ROM application format. The "playback type" field causes a playback apparatus to execute "sequential" or "random/shuffle" playback. The sequential playback is to play back PlayItems included in a PlayList in order form the beginning.

Next, MainPath information is described. The lead line mp1 shows a close-up of the internal structure of the Main-Path information. As shown by the arrow mp1, a MainPath is defined by a plurality of PlayItem information pieces #1 . . . #m. The PlayItem information defines one logical playback section that makes up the MainPath. The structure of the PlayItem information is shown in close up by the lead line mp2. As shown by the lead line, the PlayItem information is constituted from sets of a "Clip_Information_file_name" that indicates a file name of playback section information of an AV clip belonging to the IN point and Out point of the playback section, a "Clip_codec_identifier" that indicates an encoding method of an AV clip, an "is_multi_angle" that indicates whether a PlayItem is a multi-angle, a "connection condition" that indicates a connection state between the PlayItem (the current PlayItem) and the PlayItem that is immediately previous to the current PlayItem (previous PlayItem), a "ref_to_STC_id[0]" uniquely indicating an STC_Sequence targeted by the PlayItem, an "In_time" that is time information indicating a start point of the playback section, an "Out_time" that is time information indicating an end point of the playback section, an "UO_mask_table" indicating which user operation is to be masked in the PlayItem, a "PlayItem_random_access_flag" indicating whether to permit random access during the PlayItem, a "still mode" indicating whether to continue static display of a last picture after playback of the PlayItem has ended, an "STN_table", a "BaseView_indicator", and a "multi_clip_entry". Among these, the items that are playback paths are the pair of the "In_time" that is time information indicating a start point of the playback section, and the "Out_time" that is time information indicating an end point of the playback section. Playback path information is composed of this pair of "In_time" and "Out_time".

The STN_table (Stream Number table) is a table in which pairs composed of a stream entry, including a packet ID, and a stream attribute are allocated to a logical stream number.

The order of the stream entry and stream attribute pairs in the STN_table indicates a priority ranking of the corresponding streams.

When a BaseView_indicator is 0, the BaseView is Left, and when the BaseView_indicator is 1, the BaseView is Right.

Figure 27:
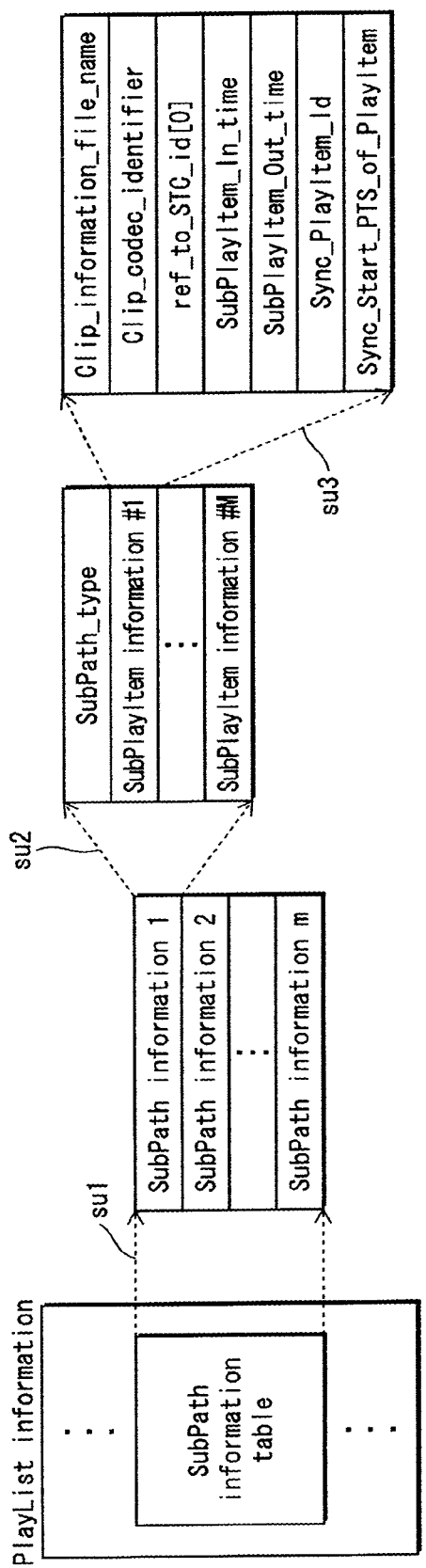
FIG. 27 depicts the internal structure of a SubPath information table.

FIG. 27 depicts an internal structure of a SubPath information table. The lead line su1 shows a close-up of the internal structure of the SubPath information. As shown by the lead line su1, the SubPath information table includes a plurality of pieces of SubPath information 1, 2, 3 . . . m. These pieces of SubPath information are a plurality of instances derived from one class structure and thus have a common internal structure. The lead line su2 shows a close-up of the shared internal structure of the SubPath information. As shown by the lead line, each piece of SubPath information includes a SubPath_type indicating a SubPath type, and one or more pieces of SubPlayItem information ( . . . SubPlayItem information #1 to VOB#m . . . ). The lead line su3 shows a close-up of the internal structure of the SubPlayItem. As shown by the lead line, each piece of SubPlayItem information is composed of a "Clip_information_file_name", a "Clip_codec_identifier", a "ref_to_STC_id[0]", a "SubPlayItem_In_Time", a "SubPlayItem_Out_time", a "sync_PlayItem_id", and a "sync_start_PTS_of_PlayItem". The following describes an internal structure of a SubPlayItem.

The "Clip_information_file_name" is information that uniquely specifies, by a file name of the clip information, a SubClip corresponding to a SubPlayItem.

The "Clip_codec_identifier" indicates an encoding method of the AV clip.

The "ref_to_STC_id[0]" uniquely indicates an STC_Sequence targeted by the SubPlayItem.

The "SubPlayItem_In_time" is information indicating a start point of the SubPlayItem on the playback time axis of a SubClip.

The "SubPlayItem_Out_time" is information indicating an end point of the SubPlayItem on the playback time axis of the SubClip.

The "sync_PlayItem_id" is information that uniquely identifies a PlayItem, from among the PlayItems in the MainPath, to be synchronized with the SubPlayItem. The SubPlayItem_In_time exists on the playback time axis of the PlayItem designated by the sync_PlayItem_id.

The "sync_start_PTS_of_PlayItem" indicates where, on a playback time axis of the PlayItem specified by the sync_PlayItem_id, a start point of the SubPlayItem specified by the "SubPlayItem" exists, with the time accuracy of 45 KHz.

Figure 28:
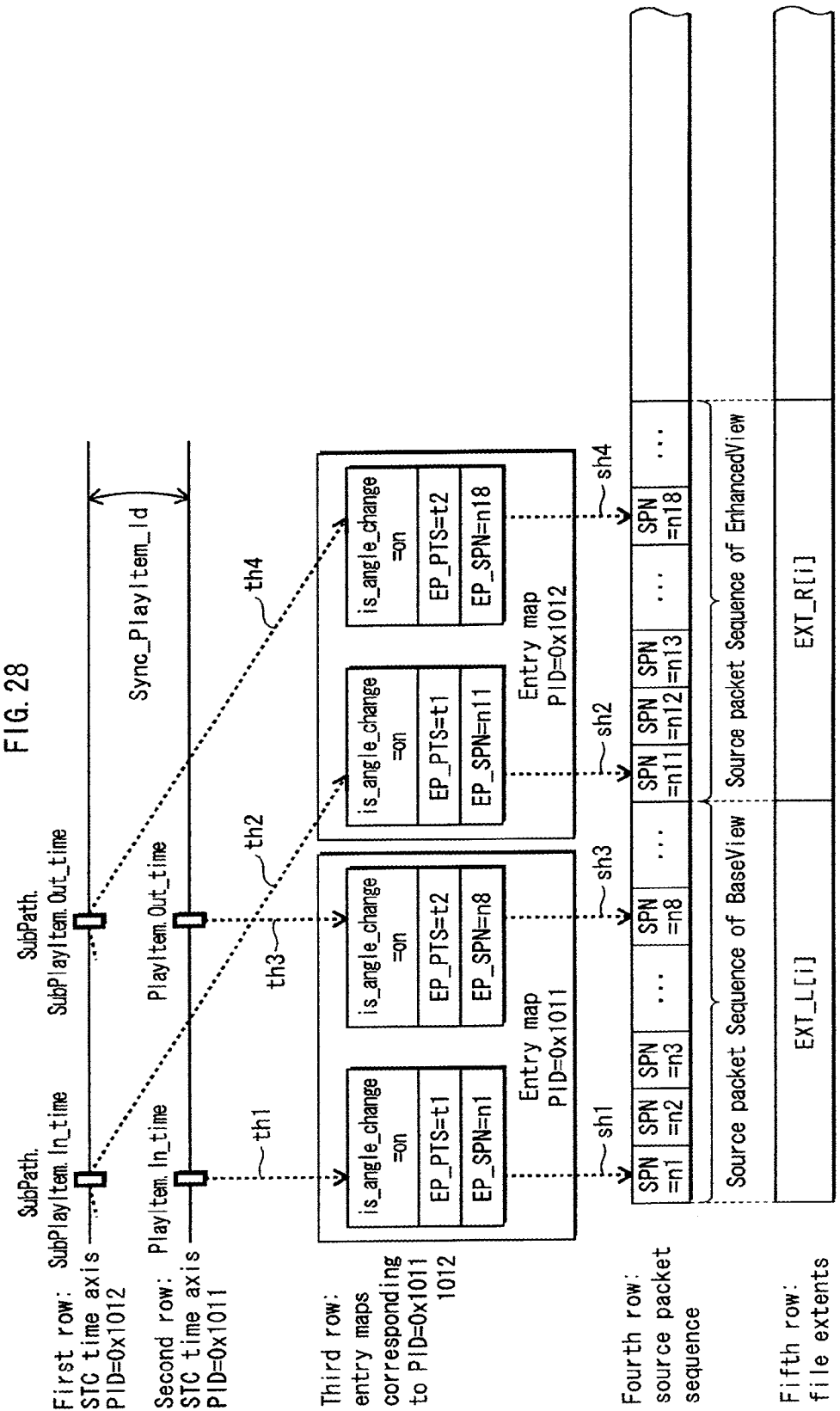
FIG. 28 depicts playback sections defined for each of the left view and the right view.

FIG. 28 depicts playback sections defined for each of the left view and the right view. FIG. 28 is drawn based on FIG. 14. More specifically, the In_Time and the Out_Time of a PlayItem is indicated in the time axis on the second row of FIG. 14 on which FIG. 28 is based. On the time axis of the first row, the In_Time and Out_Time of a SubPlayItem is drawn. The third to fifth rows are identical to corresponding portions of FIG. 14. The I pictures of the left view and the right view reside at the same point on the time axis.

The left view and the right view are associated with each other by the PlayItem information and the SubPlayItem information.

The following describes the extension data. FIG. 18 shows an internal structure of extension data in the PlayList information. A lead line eta shows a close-up of the internal structure of the extension data. As shown by this lead line, the extension data is composed of STN_table_extension fields corresponding respectively to the PlayItem information pieces #1 to #N. The lead line et2 shows a close-up of an internal structure of an STN_table_extension corresponding to the PlayItem information piece #1. As shown by this lead line, the STN_table_extension corresponding to the PlayItem information piece #1 includes the "video stream number table".

Figure 29:
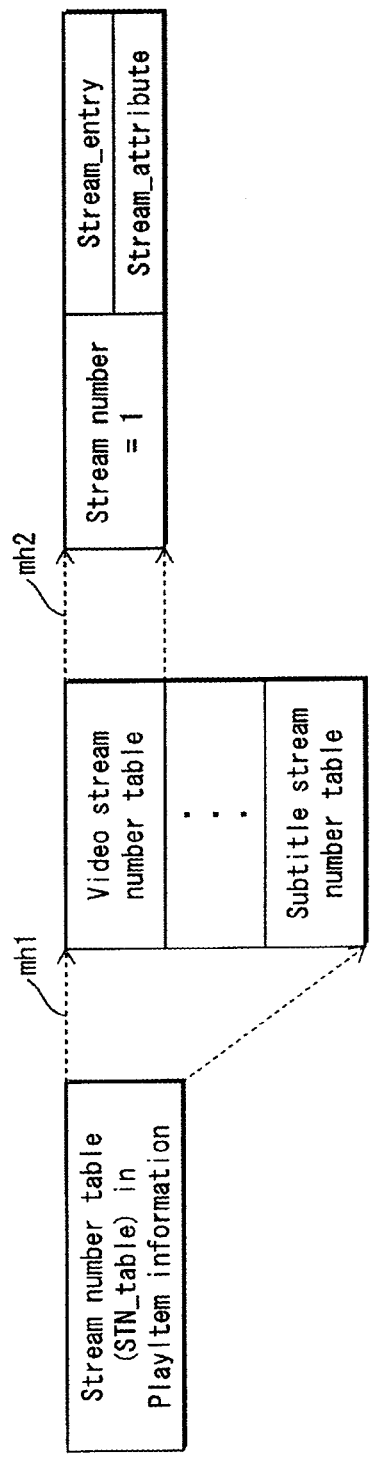
FIG. 29 depicts the internal structure of a video stream number table.

FIG. 29 depicts an internal structure of video stream number table. As indicated by the lead line mh1, the video stream number table is composed of a pair of fields, which are "stream_entry" and "stream_attribute".

The "stream_entry" is composed of the following fields: "ref_to_stream_PID_of_main_Clip" indicating the reference value for PID of PES packets constituting the primary video stream; "video_format" indicating a video display method such as NTSC and PAL; and "frame_rate" indicating ¹⁄₂₄ second or ¹⁄₂₉.₉₄ second.

FIG. 30 depicts an internal structure of a subtitle stream information table included in STN_table. The subtitle stream information table in the STN_table is composed of "display method information" and "N pieces of stream information". The n pieces of stream information are associated in one-to-one with stream numbers and each composed of "stream_entry" and "stream_attribute" fields. The lead line gh1 shows a close-up of an internal structure of stream_entry. Each stream_entry is composed of a "ref_to_stream_PID_of_main-Clip" field or alternatively of a set of "ref_to_Sub_Path_id", "ref_to_SubClip_entry_id", and "ref_to_stream_PID_of_subClip" fields. The "ref_to_stream_PID_of_SubClip" field indicates the PID of a subtitle stream, if the subtitle stream corresponding to the stream number is contained in the same AV Clip with a video stream.

As indicated by the lead line gh2, the "stream_attribute" field is composed of "language attribute" and "character attribute". The lead line gh3 indicates a close-up of an internal structure of the character attribute. As indicated by the lead line, the character attribute is composed of "alphabet type" and "character size". The lead line gh4 indicates a close-up of an internal structure of the alphabet type. As indicated by the lead line gh4, the alphabet type indicates whether the subtitle stream associated with the stream_attribute reprints subtitles in the Hiragana alphabet or characters with Kana reading. The character with Kana reading refers to subtitles represented with "normal display with Kana reading (or pronouncing)". As a variation of the character attribute, subtitles in "Katakana alphabet" may be selectable.

The lead line gh5 indicates a close-up of an internal structure of character size. As indicated by the lead line gh5m, the character size indicates whether the subtitle stream associated with the stream_attribute represents subtitles with large-size characters, normal-size characters, or small-size characters.

Figures 30A, 30B:
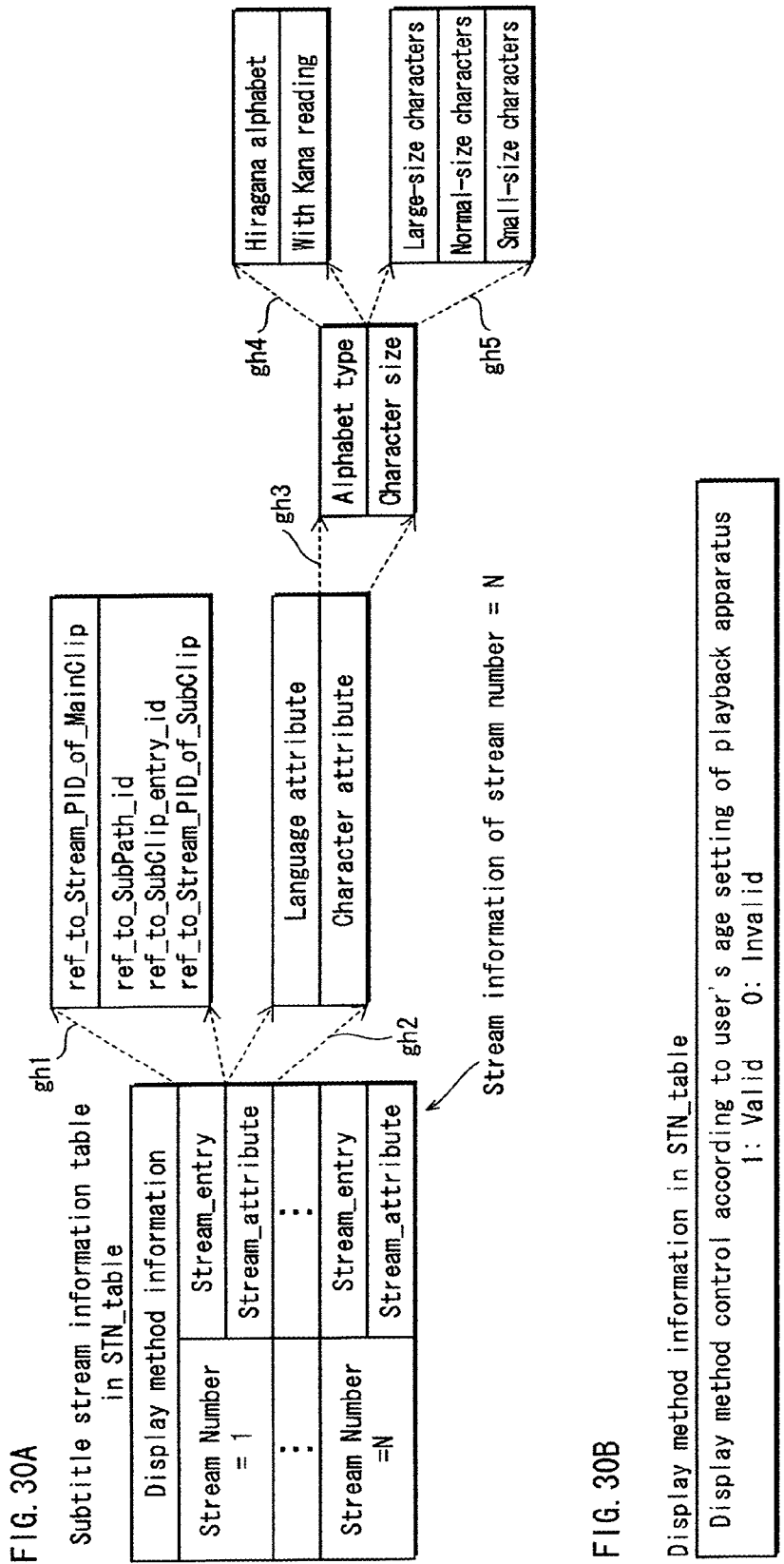
FIGS. 30A and 30B depicts the internal structure of a subtitle stream information table in included in STN_table.

FIG. 30B depicts an internal structure of display format information included in the subtitle stream information table. As depicted in the figure, the display format information may be set to "1" to indicate that control of the display format based on the user-age setting of a playback apparatus is valid, or to "0" to indicate that the display format control based on the user-age setting of a playback apparatus is invalid.

Figure 31:
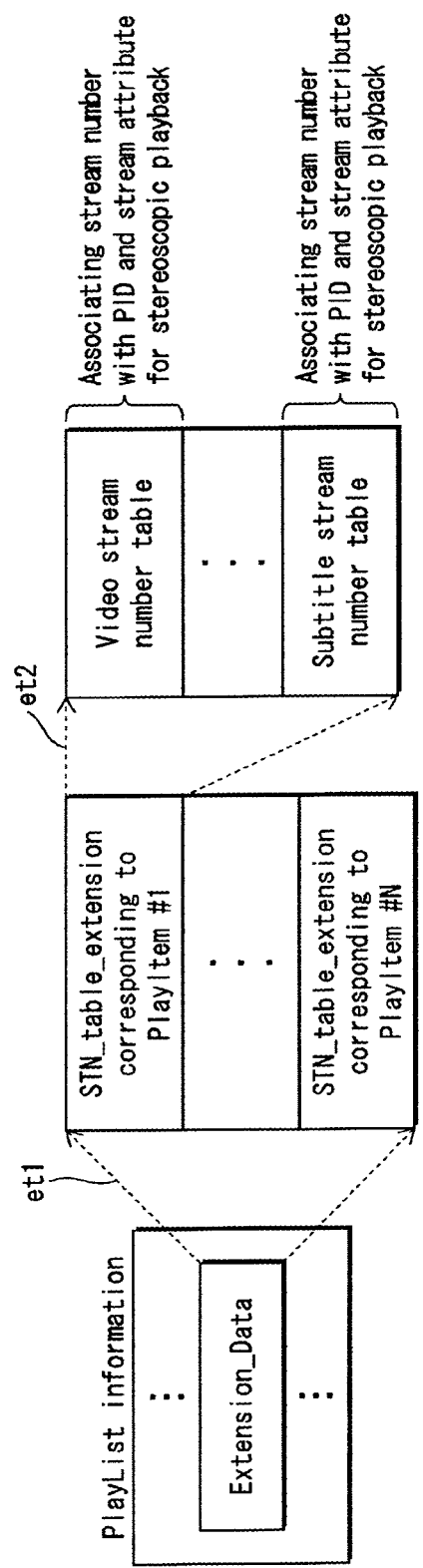
FIG. 31 depicts the internal structure of extension data included in PlayList information.

The concludes the description of the subtitle stream number table. The following describes extension data. FIG. 31 depicts an internal structure of extension data included in PlayList information. The lead line et1 shows a close-up of the internal structure of extension data. As indicated by the lead line, the extension data is composed of STN_table_extension fields correspond in one-to-one with the pieces of PlayItem information #1-#N. The lead line et2 shows a close-up of an internal structure of the STN_table_extension corresponding to the PlayItem information #1. As indicated by the lead line, the STN_table_extension corresponding to the PlayItem information #1 includes a "video stream number table".

Figure 32:
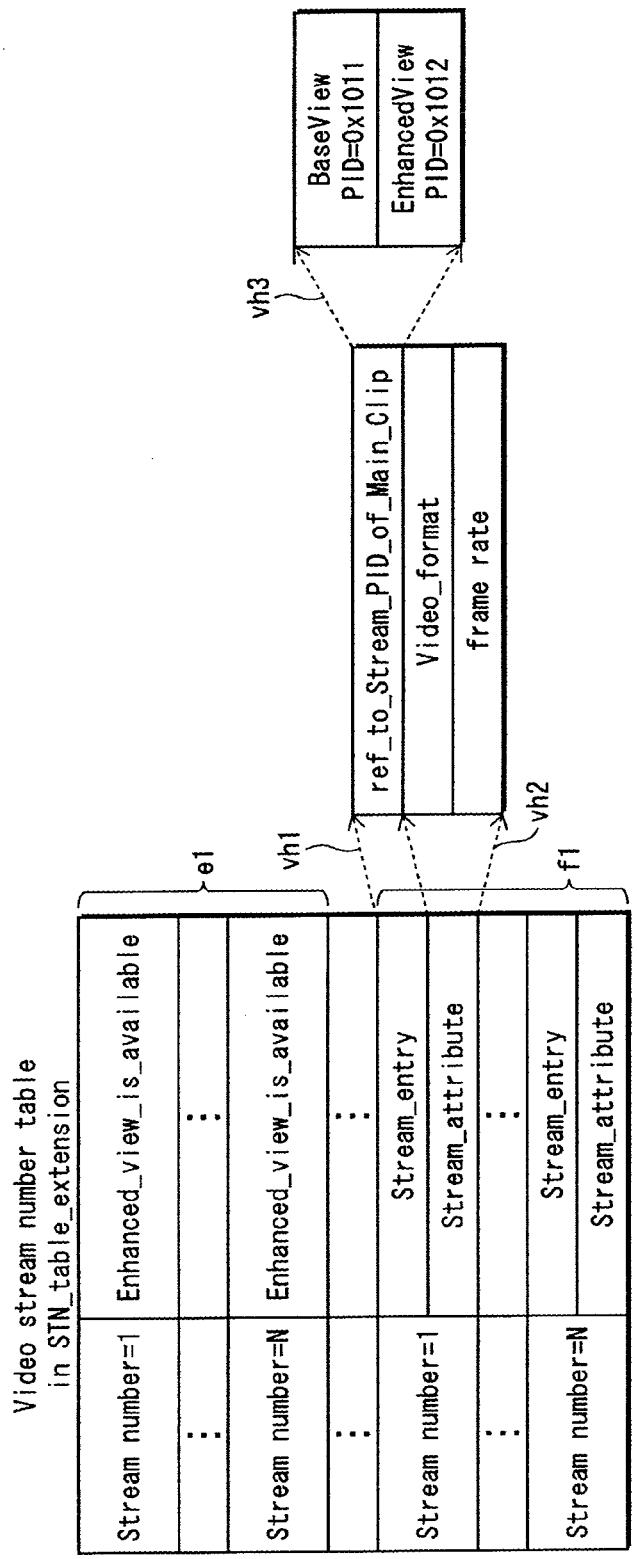
FIG. 32 depicts the internal structure of a video stream information table.

FIG. 32 depicts an internal structure of the video stream number table.

The video stream number table includes N pairs e1 of enhanced_view_is_available flags and depth_is_available flags, and N pairs f1 of stream_entries and stream_attributes. These pairs are associated with the stream numbers 1 to N, and an enhanced_view_is_available flag can uniquely specify one of the pairs with use of a stream number from 1 to N. The pairs of stream_entry and stream_attribute can also be uniquely specified with use of a stream number from 1 to N.

As indicated with the lead line vh1, the "stream_entry" includes a "ref_to_stream_PID_of_main_Clip" indicating the reference value for the PID assigned to the PES packets constituting the primary video stream. As indicated by the lead line vh2, the stream_attribute includes a "video_format" field and a "frame_rate" field.

The order of these stream_entries in these tables indicates the priority order of stream selection when the playback apparatus selects a stream. In other words, the playback apparatus preferentially selects the streams whose entries are highest in the table.

When the "enhanced_view_is_available" flag is set to ON to make EnhancedView valid, the "ref_to_stream_of_Main_Clip" is described to indicate the packet IDs 0x1011 and 0x1012.

FIG. 33 depict an internal structure of the subtitle stream information table included in the STN_table_extension. FIG. 33A depicts the overall structure of the subtitle stream information table. As depicted in the figure, the subtitle stream information table is composed of display format information depicted with a curly bracket f3, and N pieces of stream information depicted with a curly bracket f4. The N pieces of stream information are associated in one-to-one with the stream numbers and each piece of stream information is composed of a "stream_entry" field, a "stream_attribute" field, and "stereoscopic-display information" field. The lead line gh3 shows a close-up of an internal structure of a stream_entry field. Each stream_entry is composed of a "ref_to_stream_PID_of_mainClip" field or alternatively of a set of "ref_to_Sub_Path_id", "ref_to_SubClip_entry_id", and "ref_to_stream_PID_of_SubClip" fields. The "ref_to_stream_PID_of_MainClip" indicates the PID of a subtitle stream if the subtitle stream corresponding to the stream number is contained in the same AV Clip with a video stream.

The "ref_to_Sub_Path_id" field indicates the ID of a Sub-Path having a reference to a subtitle stream, if the subtitle stream is contained in a different AV Clip from an AV clip in which the video stream corresponding to the stream number is contained.

The "ref_to_SubClip_entry_id" field indicates the ID of the different AV Clip in which the subtitle stream corresponding to the stream number is contained.

The "ref_to_stream_PID_of_SubClip" field indicates the PID of a subtitle stream, provided that such a subtitle stream corresponding to the stream number is contained in an AV Clip other than the AV Clip in which the video stream is contained.

The lead line gh4 shows a close-up of an internal structure of stereoscopic-display information. As indicated by the lead line, the stereoscopic-display information indicates whether a corresponding subtitle stream is for left view or right view and also indicates the stream number specifying a subtitle stream that needs to be selected concurrently with the subtitle stream.

FIG. 33B depicts an internal structure of display format information included in the subtitle stream information table. As depicted in the figure, the display format information may be set to "1" to indicate that control of the display format based on the stereoscopic display settings of the playback apparatus is valid, or to "0" to indicate that the display format control based on the stereoscopic display settings of the playback apparatus of a playback apparatus is invalid.

The STN_table_extension is provided for a preliminary purpose. If the stereoscopic display is not supported, one of right- and left-view video streams and one of right- and left-view subtitle streams are specified out of streams specified by the stream information in the STN_table.

It is not necessary that both video and subtitles are stereoscopically displayed.

The term "content" used in the present specification is also called a "title", and refers to a unit containing PlayList information managed with use of a certain title number, a video stream multiplexed in an AV clip referred to by the PlayList information.

An essential point of the data structure of a subtitle stream information table according to the present application lies in that which one of subtitle streams is to be selected if stereoscopic playback of a playback section is set valid. The subtitle stream information table needs to indicate a pair of subtitle streams that are to be simultaneously selected when stereoscopic playback of a playback section is made valid. Thus, any data structure may be adopted as long as the subtitle stream information table associates a stream number with and the packet ID of corresponding TS packets.

For example, the subtitle stream information table may associate a stream number with the packet ID of TS packets constituting a left-view subtitle stream and the packet ID of TS packets constituting a right-view subtitle stream. More specifically, the subtitle stream information table may associate a stream number with the packet ID "0x1220" of a left*view subtitle stream and the packet ID "0x1240" of a right-view subtitle stream.

This concludes the description of PlayList information. The following describes the details of the playback apparatus.

Figure 34:
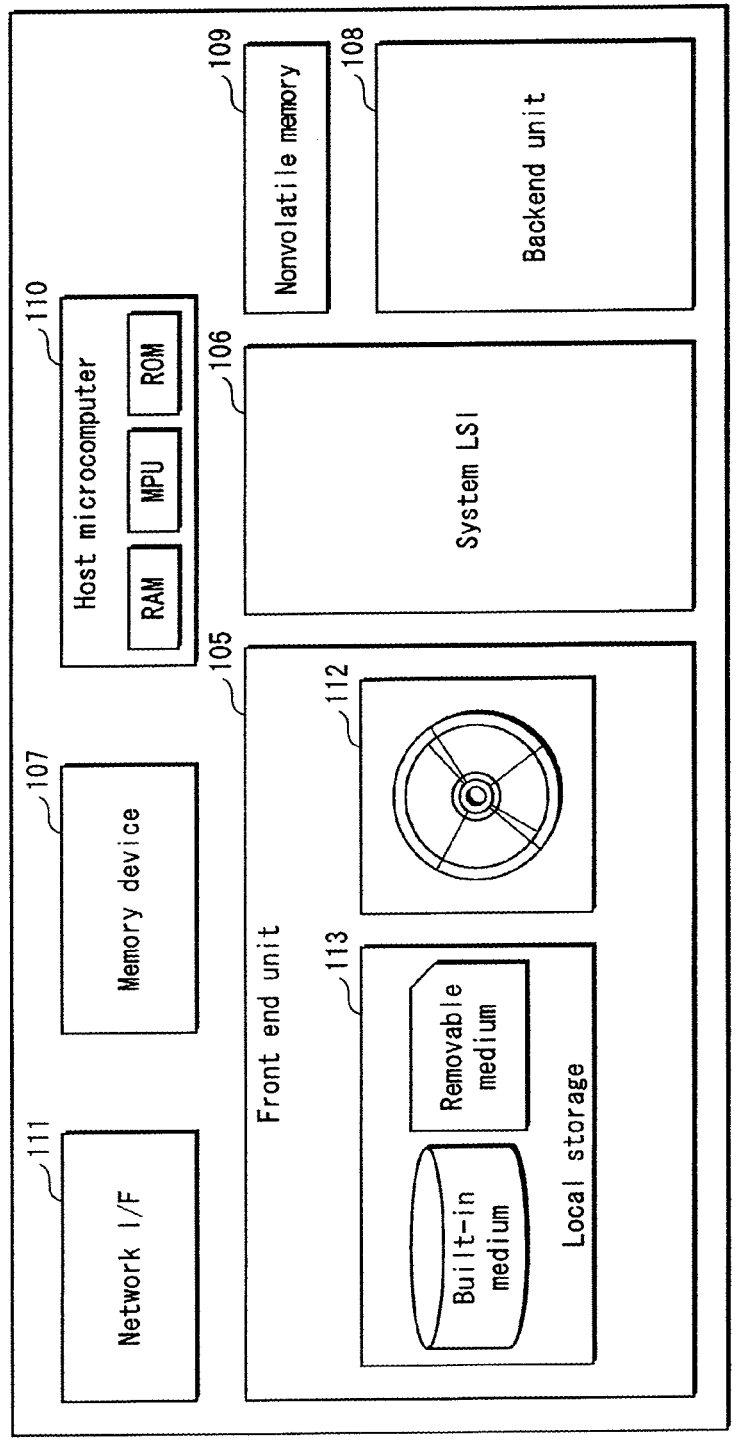
FIG. 34 depicts the internal structure of a playback apparatus.

FIG. 34 depicts an internal structure of the playback apparatus. The major components of the playback apparatus depicted in the figure are a front end unit 105, a system LSI 106, a memory device 107, and a back end unit 108, a non-volatile memory 109, a host microcomputer 110, and a network I/F 111.

The front end unit 105 is a data input source. In FIG. 35, which will be described later, the front end unit 105 may be configured to include a BD-ROM drive 112 and a local storage 113.

The system LSI 106 is composed of logic elements and forms the core of the playback apparatus.

Of the components depicted in FIG. 35, which will be described later, the system LSI may be configured to include a demultiplexer 4, video decoders 5a and 5b, graphics decoders 7a and 7b, an audio decoder 9, a PSR set 12, a playback control engine 14, color conversion units 15a and 15b, and composite units 17a and 17b. The system LSI may be formed on a single chip or of a plurality of chips.

The memory device 107 is constituted from an array of memory elements, such as SDRAM, etc.

Of the components depicted in FIG. 35, which will be described later, the memory device 107 may be configured to include read buffers 1 and 2, a basic graphics plane 6a, an extended video plane 6a, a basic graphics plane 8a, an extended graphics plane 8b, a static scenario memory 13, a heap memory 21, and a dynamic scenario memory 23.

The back end unit 108 is an interface for connecting internal units of the playback apparatus to another apparatus. Of the components depicted in FIG. 35, which will be described later, the back end unit 108 may be configured to include an HDMI transmission/reception unit 10.

The non-volatile memory 109 is a readable and writable recording medium and can retain the stored information even when not powered. The non-volatile memory 109 is used for storing a backup copy of configuration information, which is information for displaying subtitles. The non-volatile memory 109 may be flash memory or FeRAM.

The host microcomputer 110 includes MPU, ROM, and RAM and constitutes the core of the playback apparatus. Of the components depicted in FIG. 35, which will be described later, the host microcomputer 110 may be configured to include a BD-J platform 22 and a command interpreter 25.

The network I/F 111 is used for establishing communications between the playback apparatus and an external source and is capable of accessing a server over the internet or a server connected on a local network. For example, the network I/F 111 is used to download a BD-ROM additional content publicly available on the Internet or to conduct data communications with a server on the Internet specified by a content to enable playback of the content with the use of network functions. Note that the term "BD-ROM additional content" refers to a content that is not contained in the original content recorded on a BD-ROM. Specific examples of additional contents include additional sub-audio, subtitles, bonus video, and application. The network I/F 111 may be controlled from a BD-J platform, so that an additional content publicly available on the Internet can be downloaded to the local storage 113.

As described above, the front end unit 105 includes, for example, the BD-ROM drive 112 and the local storage 113.

The BD-ROM drive 112 includes, for example, a semiconductor laser (not depicted), a collimating lens (not depicted), a beam splitter (not depicted), an objective lens (not depicted), a condenser lens (not depicted), and an optical head (not depicted) including an optical detector (not depicted). An optical beam emitted from the semiconductor laser is focused onto an information side of an optical disk through the collimating lens, the beam splitter, and the field lens. The focused optical beam is reflected/refracted on the optical disk and is focused onto the light detector through the objective lens, the beam splitter, and the condenser lens. A signal generated according to the amount of light received by the light detector represents data read from the BD-ROM.

The local storage 113 includes a built-in medium and a removable medium and is used for storing data, such as downloaded additional content and data that is used by applications. The storage area for additional contents is divided specifically for individual BD-ROMs, and the storage area for storing data used by applications is divided specifically for individual applications. The built-in medium and the removeable medium also store merge management information specifying rules for merging a downloaded additional content with data on a BD-ROM.

The built-in medium is, for example, a writable recording medium such as a hard disk drive or a memory built into the playback apparatus.

The removable medium is, for example, a portable recording medium, and preferably is a portable semiconductor memory card such as an SD card.

The following description is given by way of an example in which the removable medium a semiconductor memory card. The playback apparatus includes a slot (not depicted) for inserting the removable medium in the playback apparatus, and an interface (for example a memory card I/F) for reading the removable medium inserted in the slot. When the semiconductor memory card is inserted in the slot, the removable medium is electrically connected to the playback apparatus, and with use of an interface (for example, the memory card I/F), the data recorded on the semiconductor memory card can be converted to electrical signals and read.

<Detailed Structure of Playback Apparatus>

The following describes the constituent elements in the units from the front end unit 105 to the host microcomputer 110 in further detail. FIG. 35 depicts the detailed structure of the units from the front end unit 105 to the host microcomputer 110. As shown in FIG. 35, the units from the front end unit 105 to the host microcomputer 110 include the read buffers 1 and 2, a virtual file system 3, the demultiplexer 4, the video decoders 5a and 5b, the video planes 6a and 6b, the graphics decoders 7a and 7b, the graphics planes 8a and 8b, the audio decoder 9, the HDMI interface 10, the playback state/setting register set 12, the static scenario memory 13, the playback control engine 14, the color conversion units 15a and 15b, scaler units 16a and 16b, the composite units 17a and 17b, a text subtitle decoder 18, the heap memory 21, the BD-J platform 22, the dynamic scenario memory 23, a mode management module 24, the command interpreter 25, and a UO detection module 26.

The read buffer 1 is a buffer used by the BD-ROM drive 112 for temporarily storing source packets constituting extents of a read BaseView stream. The stored source packets are transferred to the demultiplexer 4 after the transfer speed has been adjusted. The read buffer 1 has the scale of "RB1" described above.

The read buffer 2 is a buffer used by the BD-ROM drive 112 for temporarily storing source packets constituting extents of a read EnhancedView stream. The stored source packets are transferred to the demultiplexer 4 after the transfer speed has been adjusted. The read buffer 2 has the scale of "RB2" described above.

The virtual file system 3 creates a virtual BD-ROM (virtual package) by merging an additional content stored on the local storage 113 with a content residing on the BD-ROM, based on merge management information downloaded with the additional content to the local storage 113 together. The command interpreter, which is an executing entity in the HDMV mode and the BD-J plat form, which is an executing entity in the BD-J mode can make reference to the virtual package in the same manner as the original BD-ROM. During playback of the virtual package, the playback apparatus is enabled to execute playback control, by using data on the BD-ROM and data on the local storage.

The demultiplexer 4 includes a source packet demultiplexer and a PID filter. In response to a specification of a packet ID corresponding to a stream to be played, the demultiplexer 4 executes packet filtering of the packets having the specified packet IDs. More specifically, upon receipt of source packets of a BaseView stream and of an EnhancedView stream transferred from the read buffers 1 and 2, the demultiplexer 4 extracts TS packets of the BaseView stream and of the EnhancedView stream from the received extents and output the extracted TS packets to the respective video decoders 5a and 5b.

The basic video decoder 5a decodes TS packets output from the demultiplexer 4 and writes resultant uncompressed picture data to the basic graphics plane 6a.

The extended video decoder 5b decodes TS packets of the EnhancedView video stream output from the demultiplexer 4 and writes resultant uncompressed picture data to the basic video plane 8a.

The basic video plane 6a is a memory for storing uncompressed picture data included in the BaseView stream.

The extended video plane 6b is a memory for storing uncompressed picture data included in the EnhancedView stream.

The basic graphics decoder 7a decompresses TS packets of the BaseView subtitle stream output from the demultiplexer 4 and writes resultant uncompressed graphics subtitles to the basic graphics plane 8a.

The enhanced graphics decoder 7b decompresses TS packets of the EnhancedView subtitle stream output from the demultiplexer 4 and writes resultant uncompressed graphics subtitles to the enhanced graphics plane 8b.

The basic graphics plane 8a is a memory for storing uncompressed graphics subtitles acquired by decoding the BaseView subtitle stream.

The enhanced graphics plane 8b is a memory for storing uncompressed graphics subtitles acquired by decoding the EnhancedView subtitle stream.

The audio decoder 9 decodes the audio frames output from the demultiplexer 4, and outputs uncompressed at audio data.

The HDMI transmission/reception unit 10 includes an interface that is compliant, for example, with HDMI standards (HDMI: High Definition Multimedia Interface), and performs transmission and reception in a manner compliant with HDMI standards between the playback apparatus and an apparatus (in the present example, the television 103), that is connected by HDMI. Picture data stored in the basic video plane 6a and the extended video plane 6b, and uncompressed audio data that decoded by the audio decoder 13, are transmitted to the television 103 via the HDMI transmission/reception unit 10. The television 103 stores information indicating whether, for example, the television 103 supports stereoscopic display, information pertaining to possible resolution for planar (i.e., two-dimensional or monoscopic) display, and information pertaining to possible resolution for stereoscopic display. In response to a request from the playback apparatus via the HDMI interface, the television 103 transmits to the playback apparatus requested necessary information (for example, information pertaining to whether the television 103 supports stereoscopic display, information pertaining to possible resolution for planar (i.e., two-dimensional) display, and information pertaining to possible resolution for stereoscopic display). In this way, the playback apparatus is enabled to acquire information indicating whether the television 103 supports stereoscopic display, from the television 103 via the HDMI transmission/reception unit 103.

The player status/setting register (PSR) set 12 is a set of registers including a player status register indicating the playback status of a PlayList, a playback setting register storing configuration information indicating the configuration of the playback apparatus, a general purpose register available for storing arbitrary information used by the contents. The playback status of a PlayList represents information such as a type of AV data that is being used from among various types of AV data information indicated in the PlayList, or a current position (time) of the PlayList is being played back. When the player status of the PlayList changes, the playback control engine 14 stores the changed player status in the PSR set 12. Further, in response to a request from an application being executed by the command interpreter, which is the executing entity in the HDMV mode, or by the Java platform, which is the executing entity in the BD-J mode, the PSR set 12 stores the value specified by the application and passes the stored value to the application.

The static scenario memory 13 is a memory for storing current PlayList information and current clip information. The current PlayList information refers to a specific piece of PlayList information targeted for current processing from among the plurality of PlayList information pieces that can be accessed from the BD-ROM or built-in media drive, or the removable media drive. The current clip information refers to information targeted for current processing from among the plurality of PlayList information pieces that can be accessed from the BD-ROM or built-in media drive, or the removable media drive.

The playback control engine 14 executes AV playback functions and PlayList playback functions in accordance with function calls from the command interpreter, which is an execution entity in the HDMV mode, and from the Java platform, which is the execution entity in the BD-J mode. The AV playback functions are functional operations that follow DVD player and CD player operations, and include the following types of processing: Playback Start, Playback Stop, Pause, Stop Pause, Pause Release, Fast Forward at a speed specified with an immediate value, Rewind at a speed specified with an immediate value, Audio Change, SubTitle Change, and Angle Change. The PlayList playback functions are the functions Playback Start and Playback Stop in the current PlayList, among the AV playback functions listed above that are performed according to current PlayList information and current clip information.

The color conversion unit 15a converts pixel codes stored in the basic graphics plane 8a to pixel values such as Y, Cr, and Cb, with use of a color look-up table.

The color conversion unit 15b converts pixel codes stored in the enhanced graphics plane 8b to pixel values such as Y, Cr, and Cb, with use of a color look-up table.

The scaler 16a enlarges and reduces graphics stored on the basic graphics plane 8a.

The scaler 16b enlarges and reduces graphics stored on the enhanced graphics plane 8b.

The composite unit 17a composites pixels of uncompressed picture data stored on the basic video plane Ga with pixels of graphics expanded on the basic graphics plane 8a.

The composite unit 17b composites pixels of uncompressed picture data stored on the basic graphics plane 6b and pixels of graphics expanded on the enhanced graphics plane 8b.

In the case where the current stream is a text subtitle stream rather than a graphics subtitle stream, the text subtitle decoder 18 expands the text codes constituting the text subtitle stream into fonts to acquire text subtitles and writes the thus acquired text subtitles onto the graphics planes 8a and 8b.

The heap memory 21 is a stack area for storing bytecodes of system applications, bytecodes of BD-J applications, system parameters used by system applications, and application parameters used by BD-J applications.

The BD-J platform 22 is a Java platform that is the execution entity in the BD-J mode, and fully implements Java2 Micro_Edition (J2ME) Personal Basis Profile (PBP 1.0) and Globally Executable MHP specification (GEM1.0.2) for package media targets. The BD-J platform 22 includes a class loader and a bytecode interpreter. The class loader is one of system applications and reading the bytecode of a BD-R application from a class file contained in a JAR archive file into the heap memory, so that the BD-J application is loaded. The bytecode interpreter converts the bytecode of the BD-J application stored in the heap memory 21 into native code and enables the MPU 21 to execute the BD-J application.

The dynamic scenario memory 23 is a memory for storing a current dynamic scenario and used for the processing by the command interpreter, which is the execution entity in the HDMV mode, and by the Java platform, which is the execution entity in the BD-J mode. The current dynamic scenario refers to a scenario that is targeted for current execution from among an Index.bdmv, a BD-J object, and a movie object recorded on the BD-ROM, the built-in medium or the removable medium.

The module manager 24 that is an exemplary mode management module holds the index.bdmv read out from any of the BD-ROM, the built-in medium, and the removable medium, and performs mode management and branch control. The mode management by the module manager 24 is an assignment of a module, namely, specifying which of the command interpreter 40 and the BD-J module executes the dynamic scenario.

The command interpreter 25 is an exemplary HDMV module and is a DVD virtual player, which is the execution entity in the HDMV mode. The command interpreter, which is the execution entity in the HDMV mode, decodes and executes a navigation command included in a scenario program. Since the navigation commands are written in a syntax that is similar to DVD-Video, playback control similar to DVD-Video can be executed by executing the navigation command.

The UO detection module 26 detects a user operation made on the remote controller 100 or on the front panel of the playback apparatus 102 and outputs information indicative of the detected user operation (hereinafter, simply "UO: User Operation) to the mode management module 25. From among the received UOs, UOs compliant with the current mode of the playback apparatus are selectably passed to one of the modules that executes the current mode. For example, if user operations for moving a cursor in one of up, down, right, and left directions and for activating the current selection is received in the HDMV mode, the UO detection module 26 passes the UOs to the HDMV mode module. This concludes the description of the internal structure of the playback apparatus. The following are detailed description of the PSR set 12 and the playback control engine 14.

Figure 36A:
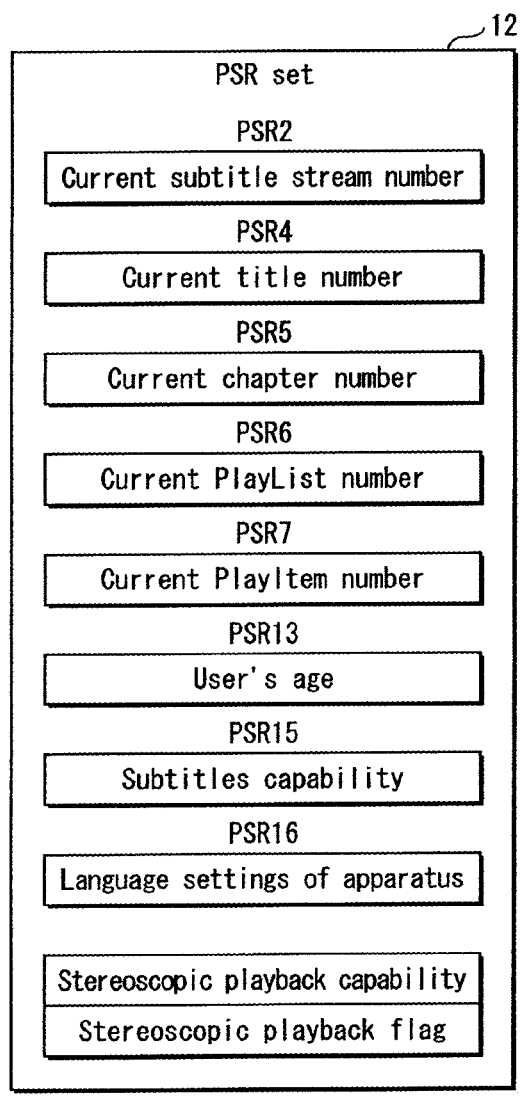
FIGS. 36A and 36B depict the internal structure of a PSR set 12 and a playback control engine 14.

FIG. 36 depict an internal structure of the playback control engine 14 and an internal structure of the PSR set 12.

First, the representative PSRs.

The PSR 2 is set to a value ranging from 1-32 to indicate the stream number of the current subtitle stream.

The PSR 4 is set to a value ranging from 1-100 to indicate the title number of the current title.

The PSR 5 is set to a value ranging from 1-999 to indicate the chapter number of the current chapter. When set to 0xFFFF, the PSR 5 indicates that the chapter number is invalid in the playback apparatus.

The PSR 6 is set to a value ranging from 1-999 to indicate the PlayList number of the current PlayList.

The PSR 7 is set to a value ranging from 0-255 to indicate the PlayItem number of the current PlayItem.

The PSR 8 is set to a value ranging from 0-0xFFFFFFFF to indicate the current playback point (current PTM) with the time accuracy of 45 KHz.

The value of PSR 13 indicates the user's age. The value of PSR 15 indicates the subtitle display capability of the playback apparatus.

The value of PSR 16 indicates the language setting of the playback apparatus.

Beside the PSRs described above, the PSR set 12 includes PSRs indicating the stereoscopic playback capability and the stereoscopic playback flag.

The stereoscopic playback capability indicates whether the playback apparatus has the capability of stereoscopic playback. The stereoscopic display flag indicates that the user has selected execution of stereoscopic playback.

Figure 36B:
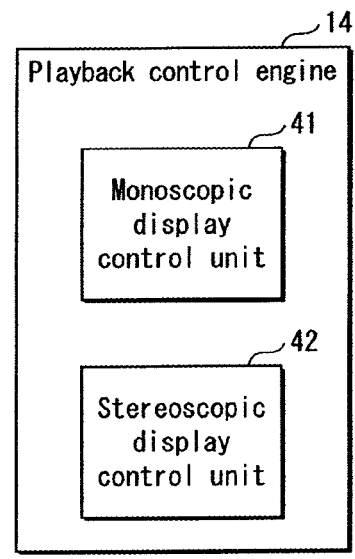

FIG. 36B depicts an internal structure of the playback control engine 14. As depicted in the figure, the playback control engine 14 includes a flat-viewing control unit 41 and a stereoscopic-viewing control unit 42. The flat-viewing control unit 41 controls PlayList playback for presenting flat (two-dimensional) viewing. The stereoscopic-viewing control unit 42 controls PlayList playback for stereoscopic (three-dimensional) viewing.

Figure 37:
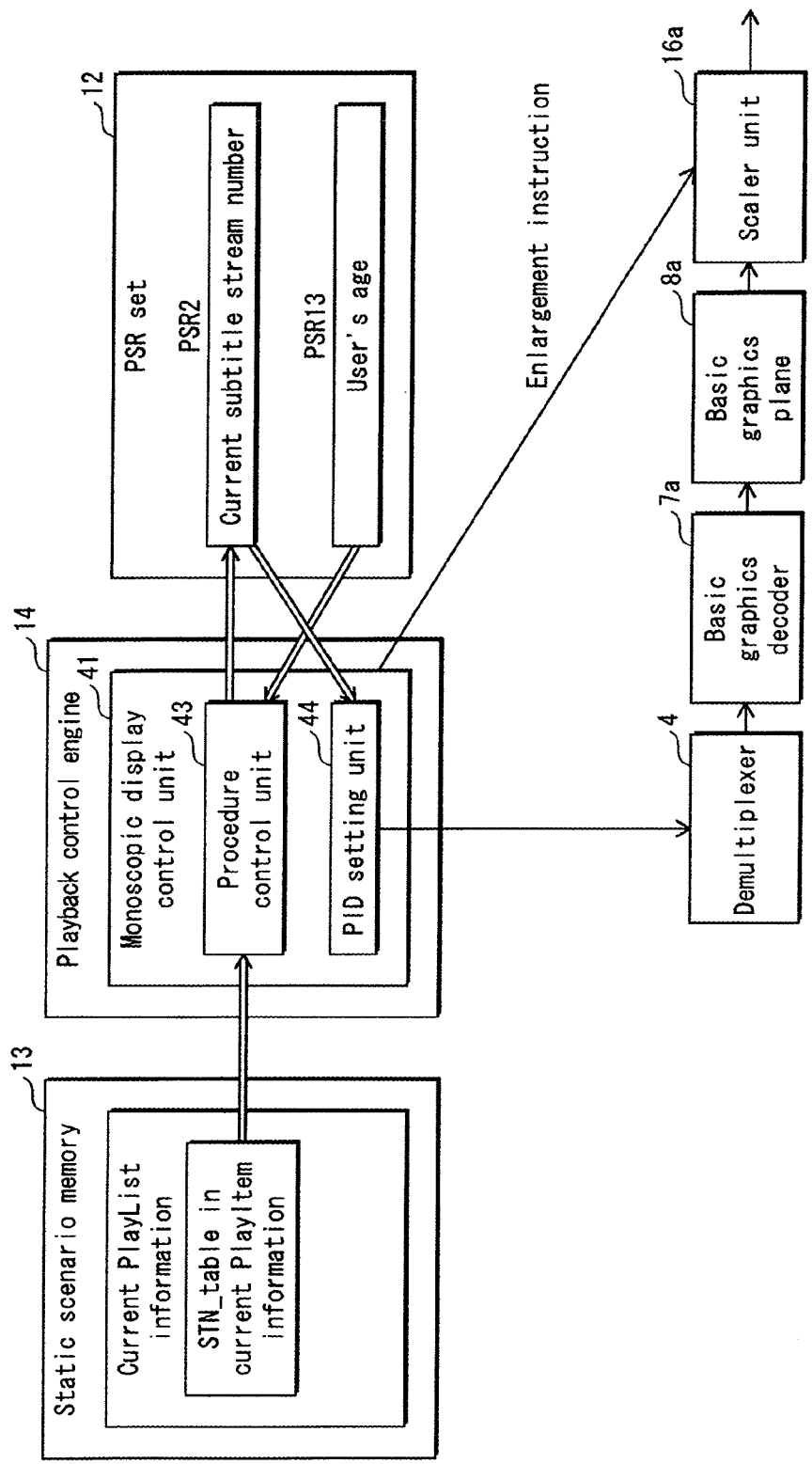
FIG. 37 depicts the internal structure of a monoscopic control unit 41.

FIG. 37 includes depicts an internal structure of the flat-viewing control unit 41. As depicted in the figure, the flat-viewing control unit 41 includes a procedure control unit 43 and a PID setting unit 44.

<Procedure Control Unit 43>

The procedure control unit 43 executes a predetermined stream selection procedure when the PlayItem information is switched to another piece of PlayItem information or when a user operation requesting to switch the stream number to another stream number is received. As a result of the stream selection procedure, the procedure control unit 43 sets the PSR 2 to the stream number of a newly selected secondary video stream. The playback apparatus is configured to execute playback of the secondary video stream identified by the stream number held in the PSR 2. Thus, the setting of the PSR 2 value effects the selection of a secondary video stream.

The stream selection procedure is performed a the time of switching PlayItem information for the following reason. That is, since a different STN_Table is provided for a different piece of PlayItem information, it is possible that a secondary video stream playable in a specific piece of PlayItem information may not be playable in another piece of PlayItem information.

As characterizing operation, the procedure control unit 43 performs the following. That is, the procedure control unit 43 retrieves a stream number from the STN_table included in the current PlayItem information, according to the user's age indicated by the value of the PSR 13, and sets the current stream number held in the PSR 2 to the thus retrieved stream number.

The following describes the timing for switching. On judging that the user of the playback apparatus 102 is a young child, the procedure control unit 43 sets the demultiplexer with the packet ID corresponding to a subtitle stream of a "Hiragana" alphabet type, so that the demultiplexer is caused to demultiplex the transport stream referred to by the current PlayList. Consequently, the basic graphics decoder 7a outputs graphics subtitles in the "Hiragana" alphabet.

The following describes error handling. There may be a case where a subtitle stream not supported by the BD-J application is specified (for example, a Hiragana subtitle stream is specified although no such a subtitle stream is provided). In such a case, it is altered to specify a normal subtitle stream. For executing the switching between monoscopic and stereoscopic display, the playback apparatus 102 pauses the PlayList playback and resumes the playback from the paused point or from the beginning of the PlayList.

<PID Setting Unit 44>

The PID setting unit 44 retrieves the PID corresponding to the stream number held in the PSR 2, from the stream entry included in the STN_table and sets the retrieved stream number in the demultiplexer 4 to cause the demultiplexer 4 to perform packet filtering based on the PID.

Figure 38:
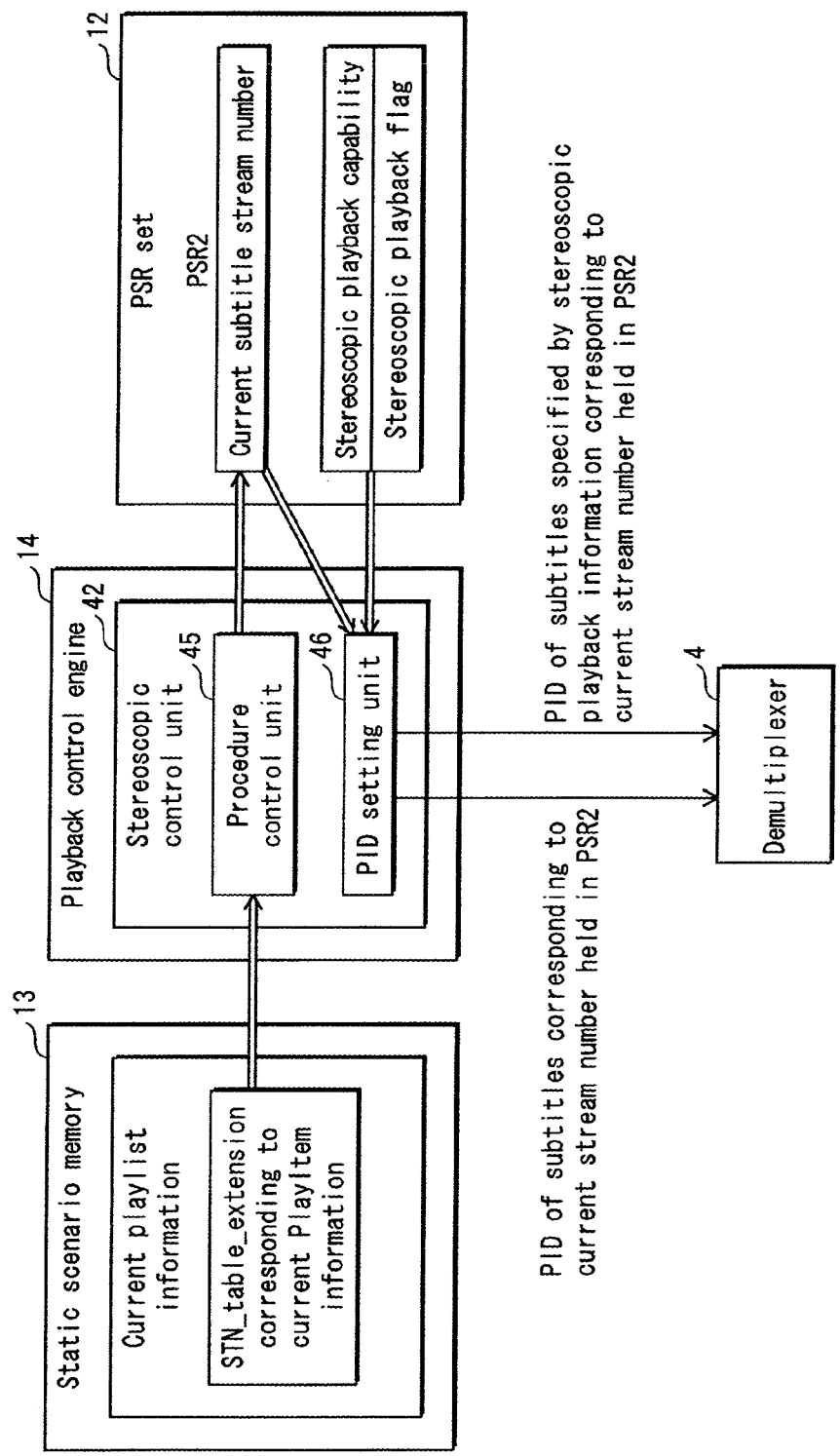
FIG. 38 depicts the internal structure of stereoscopic control unit 42.

FIG. 38 depicts an internal structure of the stereoscopic-viewing control unit 42. As depicted in the figure, the stereoscopic-viewing control unit 42 includes a procedure control unit 45 and a PID setting unit 46.

<Procedure Control Unit 45>

In the case where the capability 2 and the display method flag indicates the capability for stereoscopic display, the procedure control unit 45 retrieves two stream numbers from the STN_table_extension included in the Extension_Data and stores the two stream numbers as the current stream number to the PSR 2.

The following describes the priority ranking of the subtitle streams. When one of right- and left-view subtitle streams is selected, the stream having a smaller stream number is selected in priority. The judgment as to whether stereoscopic display is presented may be made with reference to the general purpose register or to data held in the playback apparatus 102 other than in the PSR set 12.

The settings regarding the monoscopic or stereoscopic display may be made in response to a user operation on the remote controller 100 or to an instruction given by the BD-J application.

In the case whether the stereoscopic display flag indicates non-stereoscopic display, one video stream and one subtitle stream are selected according to the stereoscopic-display information included in the stream information for video and subtitle streams, from among a pair of right- and left-view video streams and a pair of right- and left-view video streams. It is not necessary that both the video and subtitles are presented in stereoscopic display. In addition, when one of the right- and left-view streams is selected, the stream having a smaller stream number is selected in priority.

The above arrangement ensures that at least monoscopic display is realized with the use of one of a pair of video streams for stereoscopic display (either of right- and left-view video streams, in this example) and one of a pair of subtitle streams (either of right- and left-view subtitle streams, in this example), if a playback apparatus is not capable of stereoscopic display or if the playback apparatus is connected to a display device not capable of a stereoscopic display.

A user operation requesting to which the display of subtitles from monoscopic to stereoscopic display, and vice versa may be made on the remote controller 100 or an instruction to the similar effect may be given from the BD-J application during the playback of a PlayList. The playback apparatus may be configured to effect the switching or to process such a request or instruction as an error.

<PID Setting Unit 46>

The PID setting unit 46 retrieves two PIDs corresponding to the two stream numbers held in the PSR 2, from the stream_entry included in the STN_table_extension, and sets the retrieved PIDs into the demultiplexer 4. As a result, the demultiplexer 4 performs the packet filtering based on the PIDs.

This concludes the description of the playback control engine 14. The following describes the graphics decoders in detail.

Figure 39:
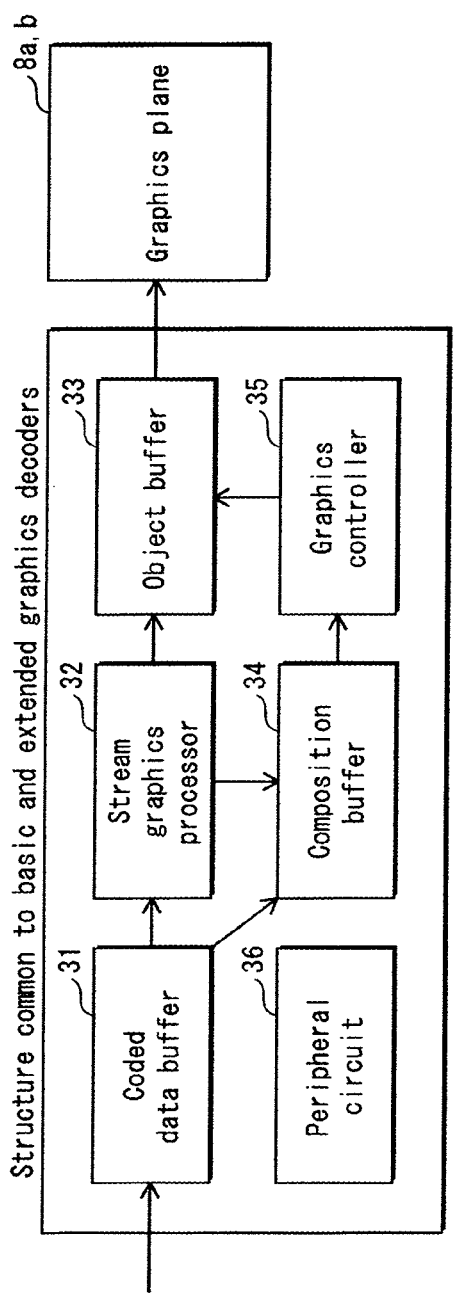
FIG. 39 depicts the internal structure of graphics decoders.

FIG. 39 depicts an internal structure of the graphics decoders. As depicted in the figure, the graphics decoder 12 includes a coded data buffer 31, a peripheral circuit 36, a stream graphics processor 32, an object buffer 33, a composition buffer 34, and a graphics controller 35.

The coded data buffer 31 is a buffer for storing functional segments together with the DTSs and PTSs. The functional segments are acquired by removing the TS packet header and PES packet header from each TS packet in the transport streams and sequentially arranging the resulting payloads. The PTSs/DTSs from the removed TS packet headers and PES packet headers are stored in correspondence with the PES packets.

The stream graphics processor 32 decodes ODSs into uncompressed graphics composed of the indexed colors, and writes the uncompressed graphics as graphics subtitles to the object buffer 33. Decoding by the stream graphics processor 32 completes instantaneously, and the stream graphics processor temporality stores the resulting graphics subtitles. Although the decoding by the stream graphics processor 32 completes instantaneously, the writing from the stream graphics processor 32 to the object buffer 33 cannot be completed instantaneously. It is because, in a player model that complies with the BD-ROM standard, the writing to the object buffer 33 is performed at the transfer rate of 128 Mbps. Since the PTS in the END segment indicates a time at which the writing to the object buffer 33 completes, the processing of a subsequent DS is waited until the time indicated by the PTS in the END segment is reached. The stream graphics processor 32 starts writing the graphics subtitles acquired by decoding each ODS at a time point indicated by the DTS associated with the ODS and completes writing by the decode end time indicated in the PTS associated with the ODS.

The object buffer 33 is for storing graphics subtitles acquired as a result of the decoding by the stream graphics processor 32. The object buffer 33 must be twice or four times as large as the graphics plane for the following reason. In order to execute the scrolling effect, the object buffer 33 needs to store graphics subtitles that are twice or four times as large as the graphics plane 8.

The composition buffer 34 is memory for storing PCS and PDS. In the case where there are two Display Sets to be processed, and the active periods of the respective PCSs overlap, the composition buffer 34 stores the plurality of PCSs to be proceed.

The graphics controller 35 interprets a PCS and executes, in accordance with the result of the interpretation, writing of graphics subtitles to the object buffer 33, reading of the graphics subtitles from the object buffer 33, and the display of graphics subtitles. The display by the graphics controller 35 is executed at the time indicated by the PTS attached to a PES packet containing the PCS. The interval between display, by the graphics controller 15, of graphics subtitles belonging to DSn and of graphics subtitles belonging to DSn+1 is the interval described above.

The peripheral circuit 36 is wire logic for realizing the data transfer between the coded data buffer 13 and the stream graphics processor 32 as well as between the coded data buffer 31 and the composition buffer 34. During the process of data transfer, when the current playback time reaches the time indicated by the DTS an ODS, the peripheral circuit 36 transfers the ODS from the coded data buffer 31 to the stream graphics processor 32. Also, when the current playback time reaches the time indicated by the DTS of the PDS or PCS, the peripheral circuit 36 transfers the PCS or PDS to the composition buffer 34. This concludes the description of the graphics decoder. The following describes the details of the processing for PlayList playback.

Figure 40:
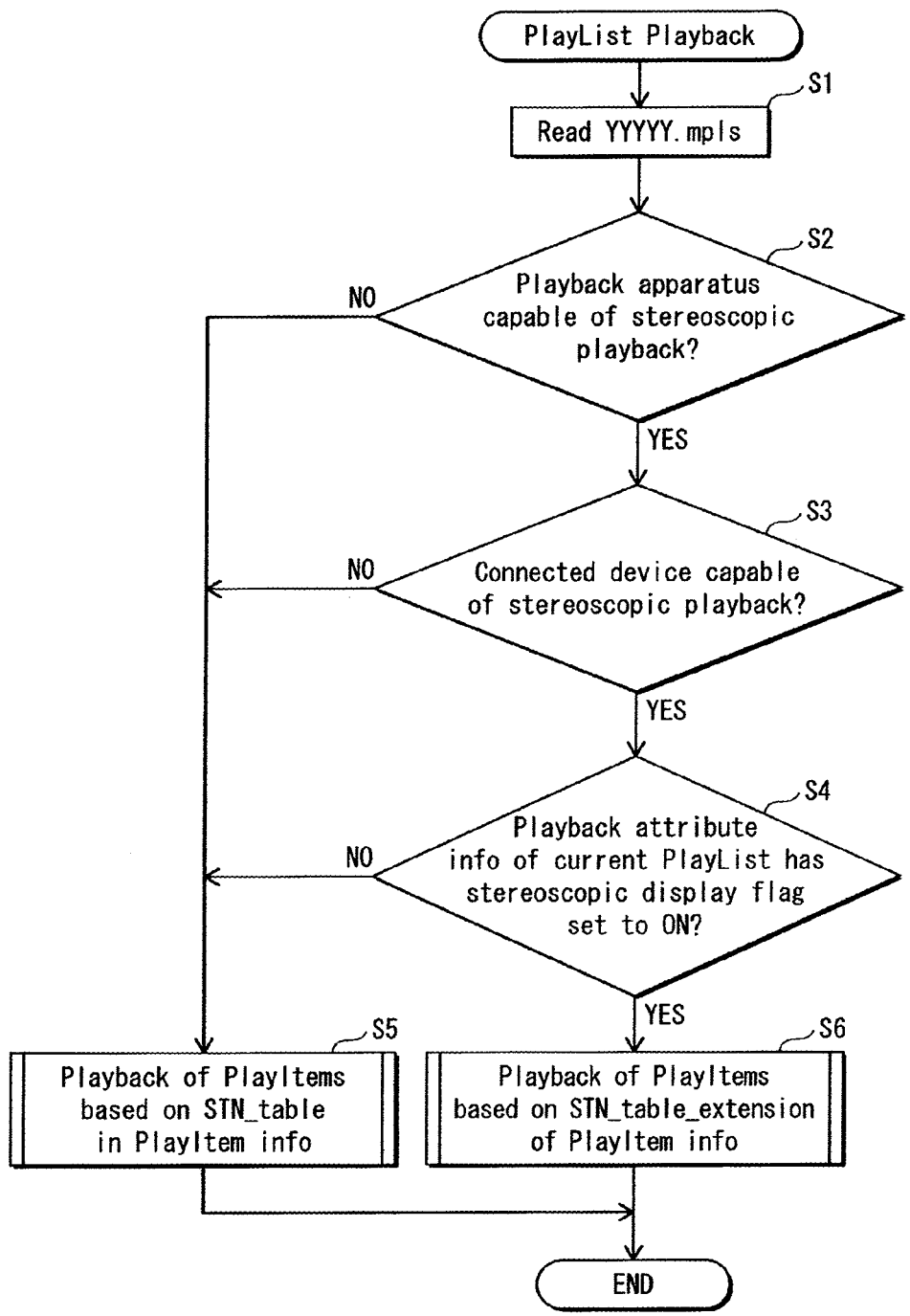
FIG. 40 is a flowchart showing the procedure for executing PlayList playback.

FIG. 40 is a flowchart showing a procedure for executing PlayList playback.

In Step S1, a PlayList information is read. Subsequently Steps S2-S5 are performed. In Step S2, it is judged whether the playback apparatus has the capability. In Step S3, it is judged whether a television connected to the playback apparatus has the capability of stereoscopic playback. In Step c4, it is judged whether the display method flag included in the playback attribute information of the current PlayList is valid. If any of the judgments in Steps S2-S4 results in "No", Step S5 is performed next to execute playback of each PlayItem based on the STN_table included in the respective pieces of PlayItem information.

If all the judgments in Steps S2-S4 results in "YES", Step S5 is performed to execute each PlayItem based on the STN_table_extension included in the respective pieces of PlayItem information.

Figure 41:
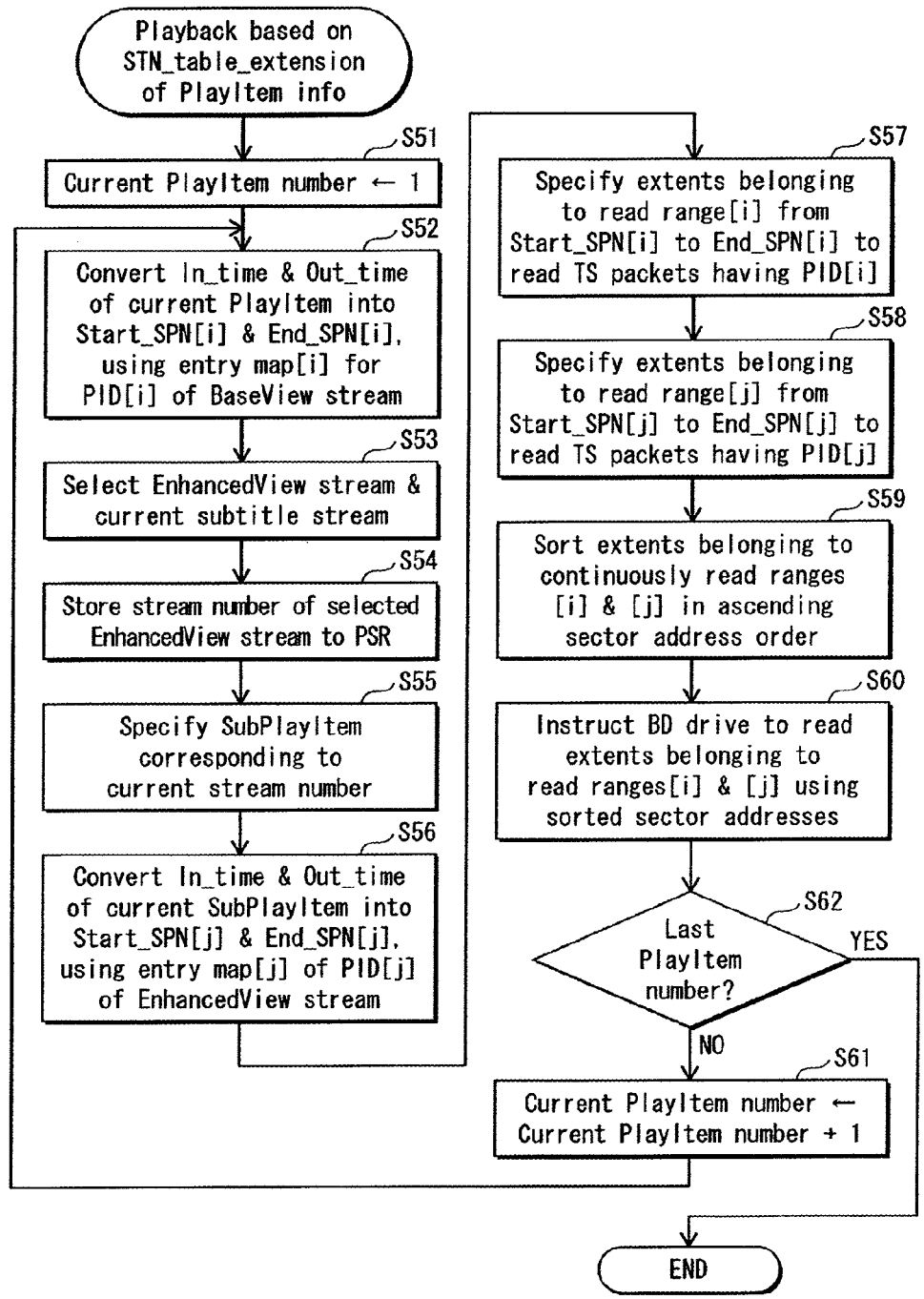
FIG. 41 is a flowchart showing a playback procedure based on STN_table_extension.

FIG. 41 is a flowchart showing a procedure for executing playback of PlayList information.

In Step S51, the current PlayItem number is initialed to "1" and the processing goes onto the loop composed of Steps S52-S62. In the loop, Steps S52-S60 are executed on the current PlayItem number and then the current PlayItem number is incremented (Step S61) to repeat the Steps S52-S60 on the new current PlayItem number. The loop is repeated until the current PlayItem number reaches the last one of the PlayItem numbers (Step S62: Yes). The details of Steps S52-S60 are described below.

In Step S52, the PlayItem.In_Time and PlayItem.Out_Time of the current PlayItem are converted into Start_SPN[i] and End_SPN[i], with the use of the entry map corresponding to the packet ID of the BaseView stream.

Next, a suitable EnhancedView stream is selected and a suitable current subtitle stream (Step S53). The current stream numbers of the selected streams are stored to the PSRs (Step S54). A SubPlayItem associated with the current stream number is specified (Step S55). The SubPlayItemIn_Time and SubPlayItemOut_Time are converted to Start_SPN[j] and End_SPN[j], with the use of the entry map [j] corresponding to the packet ID [j] of the EnhancedView stream (Step S56).

In order to read the TS packet[i] having the packet ID [i], the extents belonging to the read range [i] from the Start_SPN [i] to End_SPN[i] are specified (Step S57). In addition, in order to read TS packet [j] having the packet ID [j], the extents belonging to the read range from Start_SPN[j] and End_SPN [j] are specified (Step S58). Next, in Step S59, the extents belonging to the respective read ranges [i] and [j] are sorted in ascending order of the addresses. In Step S60, an instruction is given to the drive to sequentially read the extents belonging to the respective read ranges [i] and [j] based on the sorted addresses. This concludes the description of the playback procedure executed based on the STN_table and STN_table_extension.

The following describes the procedure for selecting a subtitle stream.

There are two types of procedure for selecting a subtitle stream based on the STN_table or STN_table_extension. One is "Procedure when playback condition is changed" and the other is "Procedure when Stream change is requested".

The "Procedure when playback condition is changed" is executed when the status of the playback apparatus changes in response to an event occurred to the playback apparatus.

The "Procedure when Stream Change is requested" is executed when the user requests the switching between streams.

Figure 42A:
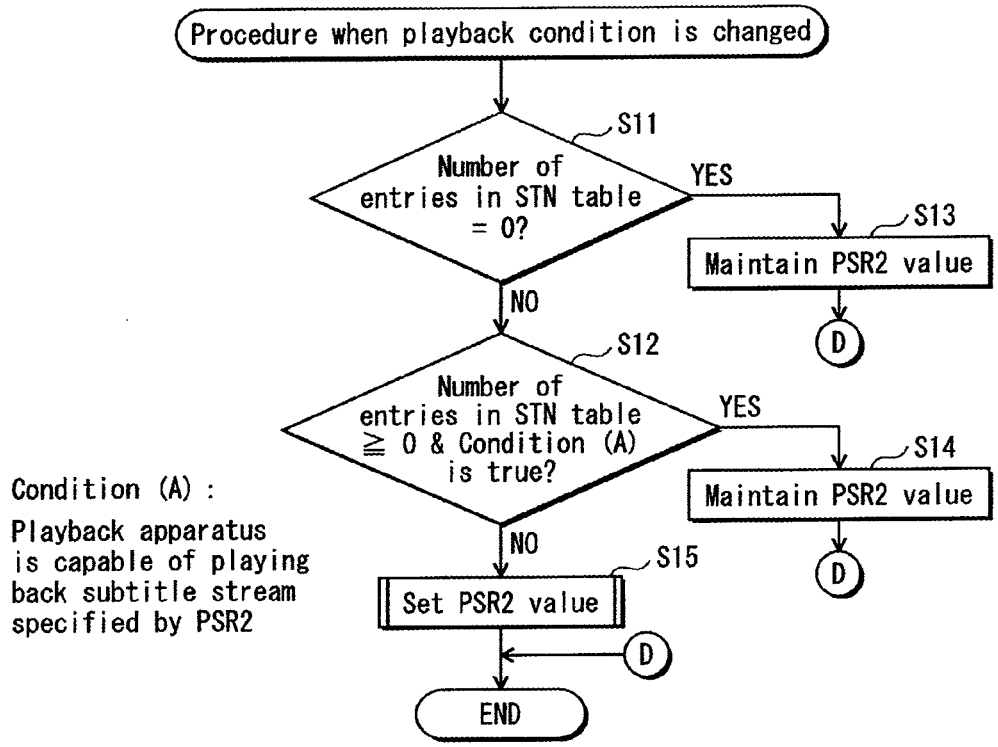
FIGS. 42A and 42B are flowcharts showing the procedures for setting a PSR 2 at the time of a status change and of a stream change take place.

FIG. 42A is a flowchart showing the procedure for setting the PSR 2 at the time when a status change takes place.

In Step S11, it is judged that whether the number of entries included in the STN_table is equal to "0". If the number of entries is equal to "0", the value held in the PSR 2 is maintained (Step S13).

Step S12 is performed if the number of entries included in the STN_table is not equal to "0". In Step S12, it is judged if the number of entries included in the STN_table is larger than the value held in the PSR 2 and if the condition (A) is satisfied. The condition (A) is satisfied if the playback apparatus is capable of executing playback of the audio stream specified by the vale held in the PSR 2. If the judgment in Step S12 results in "Yes", the value held in the PSR 2 is maintained (Step S14). On the other hand, if the value held in the PSR 2 is larger than the number of entries included in the STN_table or the condition (A) is not satisfied, the value of PSR 2 is reset (Step S15).

Figure 42B:
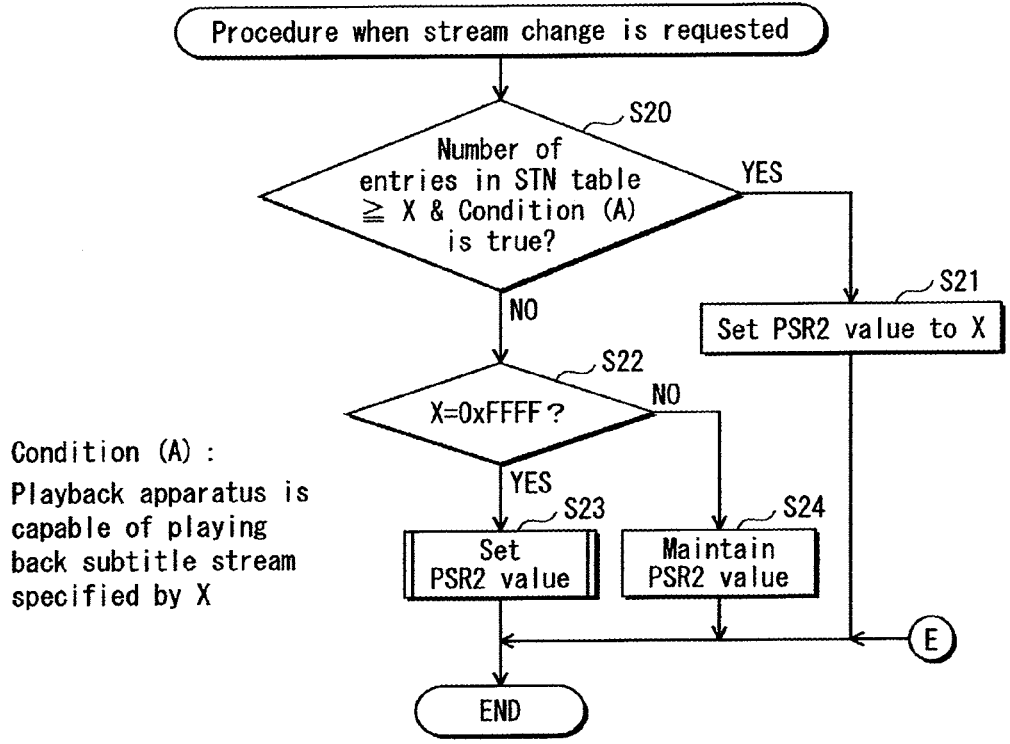

FIG. 42B is a flowchart showing the procedure for setting the PSR 2 at the time when a stream change takes place. The flowchart shown in FIG. 42B is identical to the flowchart shown in FIG. 42A, except that the denotation of "PSR 2" is replaced with X. The "X" denotes a value based on a user operation.

In Step S20 shown in this flowchart, it is judged whether the number of entries included in the STN_table is larger than X and if the condition (A) is true. The condition (A) is true if the playback apparatus is capable of executing playback of the audio stream specified by the vale held in the PSR 2. This judgment is made by comparing the value of PSR 15 with the Stream_coding_type of the audio stream. If X satisfies this condition, the value of the PSR 2 is set to the value of X (Step S21).

On the other hand, if the value of X is larger than the number of entries or the condition (A) is not satisfied, it is then judged if the value of X is equal to "0xFFFF" (Step S22). If the value of X is not equal to "0xFFFF", the number of audio stream specified by the user is assumed to be invalid. Thus, the value of X specified by the user operation is discarded and the value held in the PSR 2 is maintained (Step S24). If the value held in the PSR 2 is equal to "0xFFFF", the PSR 2 is set accordingly (Step S23).

Figure 43:
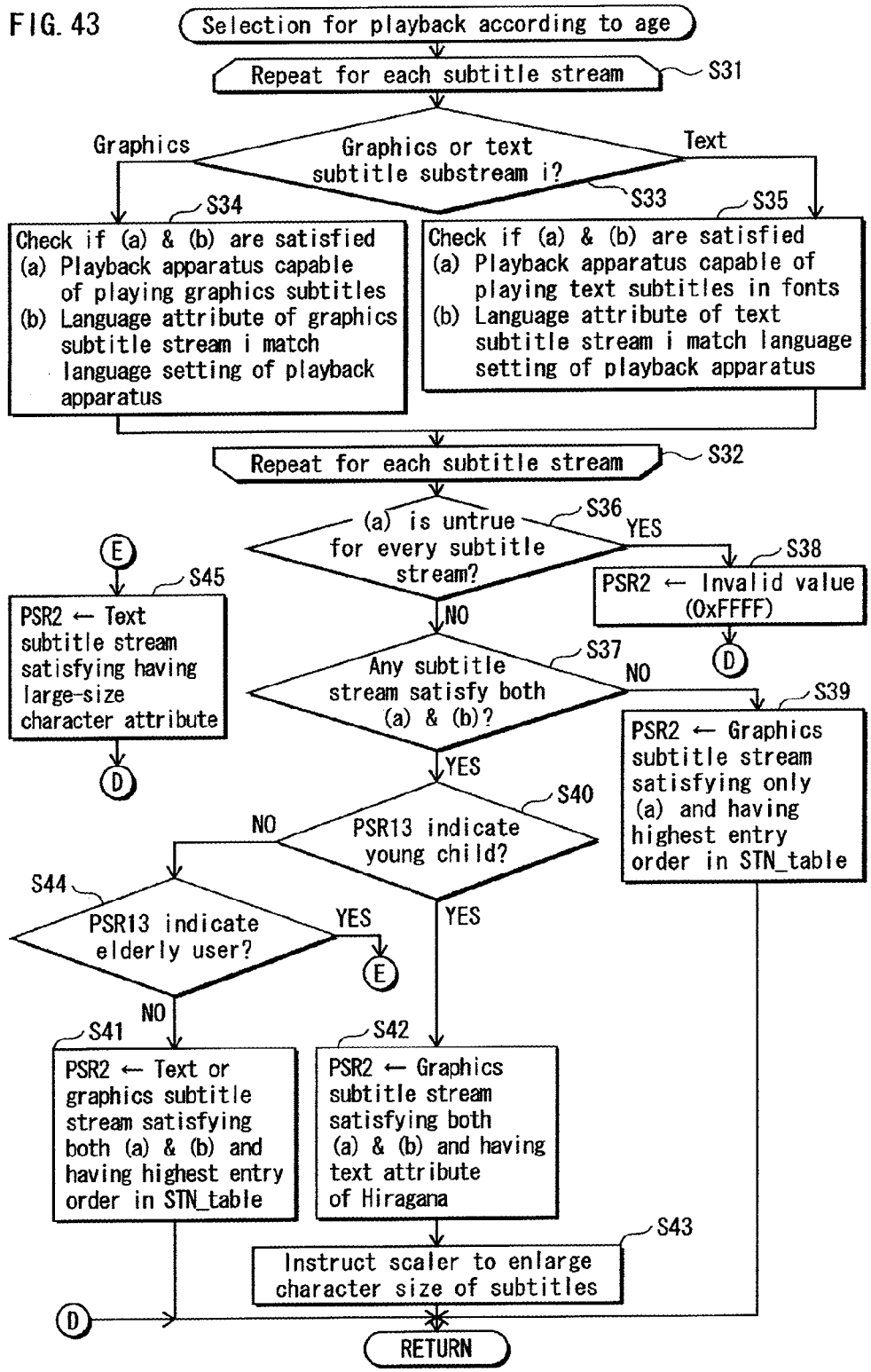
FIG. 43 is a flowchart showing the procedure for making selections for executing playback based on the user's age.

FIG. 43 is a flowchart showing the procedure for making selections for executing playback based on the user's age.

In the flowchart, Steps S31 and S32 forms a loop in which Steps S33-S35 are repeated for each subtitle stream described in the STN_table. In the loop, the subtitle stream currently being processed is referred so a the subtitle stream i. In Step S33, it is judged whether the subtitle stream i is a graphics subtitle stream or a text subtitle stream. If the subtitle stream is a graphics subtitle stream, the processing goes onto Step S34.

In Step S34, it is judged whether the graphics subtitle stream i satisfies the following conditions (a) and (b).

The condition (a) is satisfied if the playback apparatus is capable of executing playback of the graphics subtitle stream i.

The condition (b) is satisfied if the language attribute of the graphics subtitle stream I matches the language settings of the playback apparatus.

The judgment regarding the condition (b) is made by checking if the value held in the PSR 17 matches the PG_language_code included in the STN_table.

In Step S35, on the other hand, it is judged whether the text subtitle stream satisfies the following conditions (a) and (b).

The condition (a) is satisfied if the playback apparatus is capable of expanding the text subtitle stream i into fonts.

The condition (b) is satisfied if the language attribute of the graphics subtitle stream i matches the language settings of the playback apparatus.

The judgment regarding the condition (a) is made by checking whether the PSR 30 of the playback apparatus indicates that the "payback capable". The judgment regarding the condition (b) is made by checking if the value held in the PSR 17 matches the PG_language_code included in the STN_t-able.

If the processes of Steps S33-S35 are repeated on each subtitle stream, the processes of Steps S36-S41 are performed.

In Step S36, it is judged if any subtitle stream satisfies the condition (a). If no subtitle stream satisfies the condition (a), the PSR 2 is set to an invalid value (0xFFFF) in Step S39 (Step S38).

In Step S37, it is judged if any subtitle stream satisfies both the conditions (a) and (b). If one or more subtitle streams satisfy both the conditions (a) and (b), the PSR 2 is set to a value equal to the stream number of one of the subtitle streams having a higher entry order in the STN_table (Step S39).

In Step S41, the PSR 2 is set to a value equal to the stream number of one of the streams having the highest entry order in the STN_table, from among graphics subtitle streams and text subtitle streams each satisfying the condition (a) only. The following describes the processes in the flowchart, with reference to specific examples.

In Step S40, it is judged whether the user's age indicated by the value held by the PSR 13 is of a young child. Note that in this embodiment, users at the age of five or younger are classified as young children. If the judgment results in "Yes", the PSR 2 is set to a value equal to the stream number of one of the subtitle streams having the highest entry order in the STN_table, from among the subtitle streams satisfying both the conditions (a) and (b). In Step S43, the scaler is caused to present the subtitles with enlarged characters.

In Step S44, it is judged whether the user's age indicated by the value held by the PSR 13 is of an elderly person. Note that in this embodiment, users at the age of sixty five or older are classified as elderly people. If the judgment results in "Yes", the PSR 2 is set in Step S45 to a value equal to the stream number of a subtitle stream having the character attribute of large-size characters indicated in the stream_entry.

(Selection Procedure for Settings of Stereoscopic Viewing)

Figure 44:
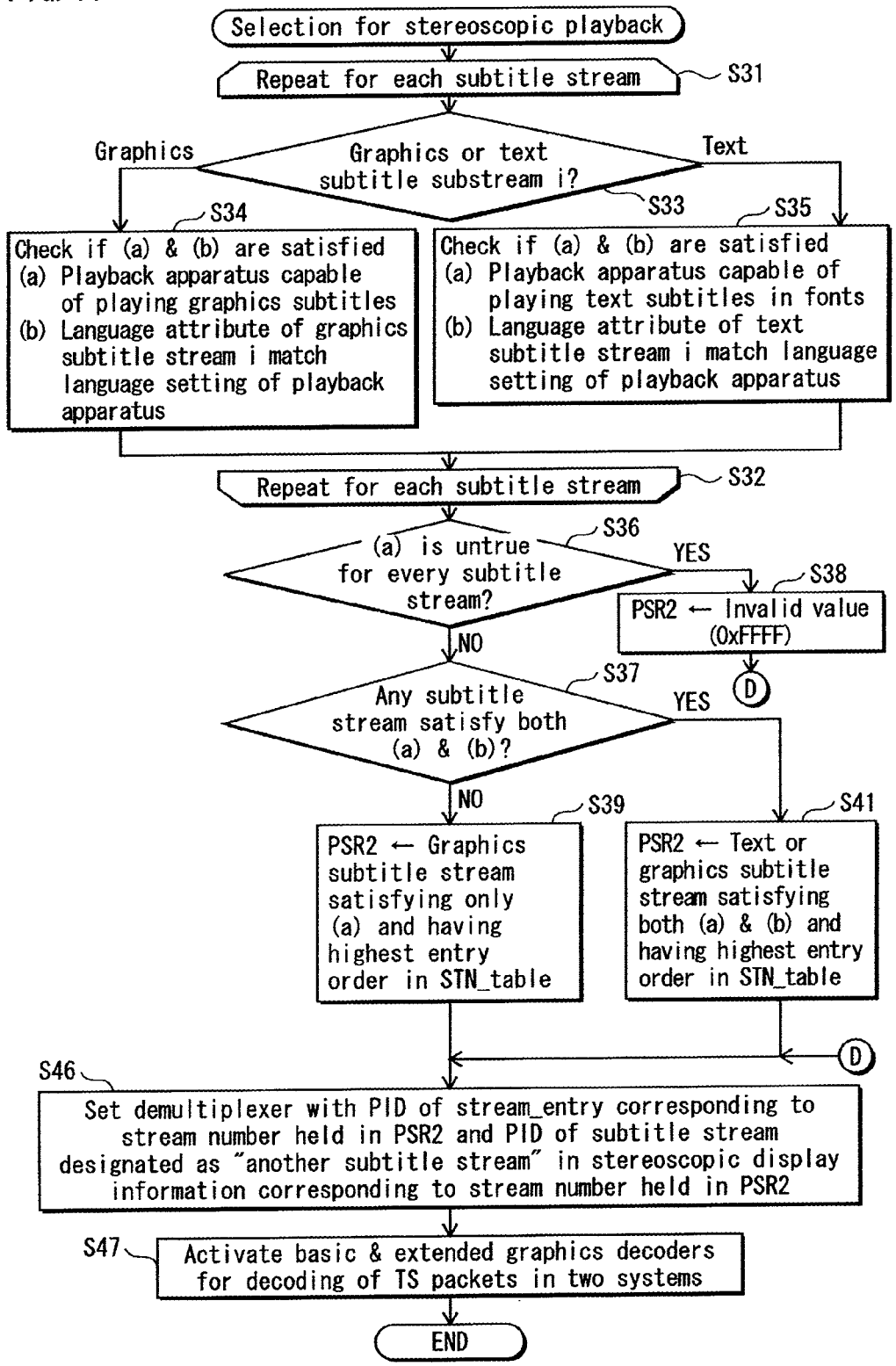
FIG. 44 is a flowchart showing the selection procedure for executing stereoscopic playback.
Figure 48B:
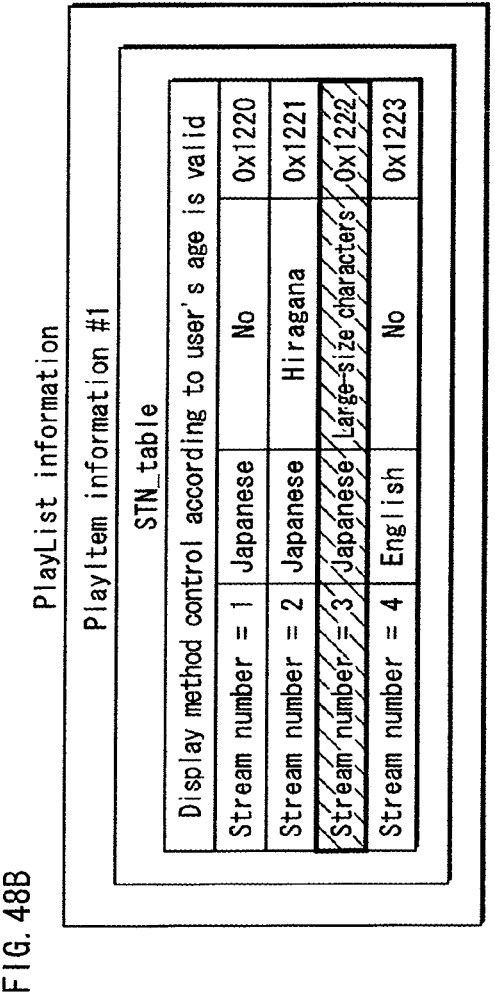
FIGS. 48A-48E depict subtitles displayed by the playback apparatus according to the configuration information indicating that "the user's age=70"
Figure 48E:
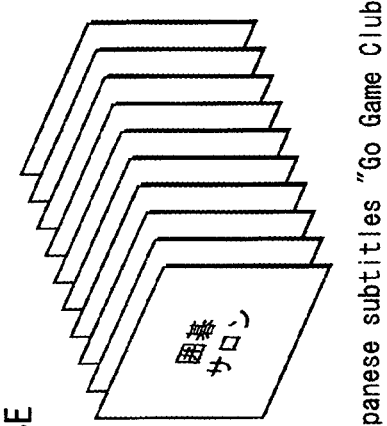
Figure 48A:
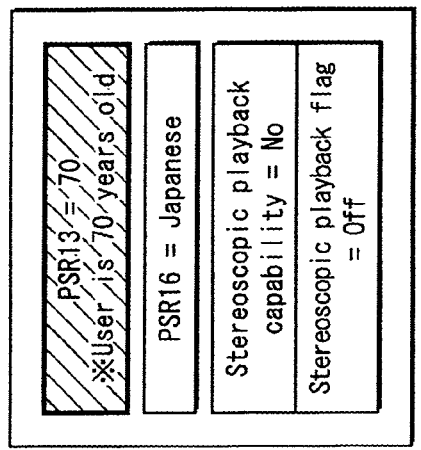
Figure 48C:
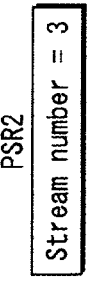
Figure 48D:
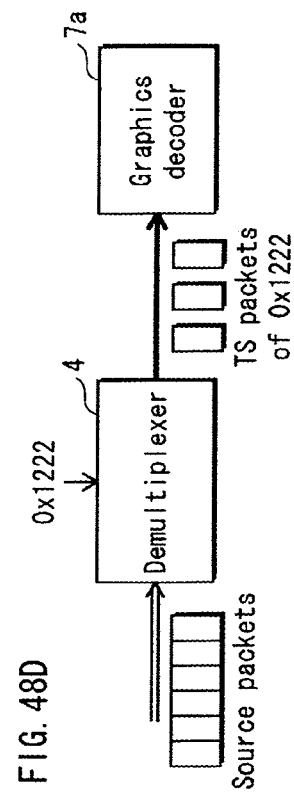

FIG. 44 is a flowchart showing the selection procedure for executing stereoscopic playback.

The steps similar to the steps in the flowchart shown in FIG. 42 are denoted by the same reference numerals and no overlapping description is given here.

In Step S46, the demultiplexer is set to perform packet filtering based on the PID of the stream_entry corresponding to the stream number held by the PSR 2 and also on the PID of a subtitle stream designated as "another subtitle stream" in a corresponding piece of stereoscopic-display information.

In Step S47, the basic graphics decoder and the enhanced graphics decoder are activated to decode TS packets in the two systems.

This concludes the description of the selection procedure for making settings of stereoscopies viewing. The following now describes the specific processes of the selection procedure in detail.

The following describes the specific processes by way of examples depicted in FIGS. 45 and 46.

FIG. 45 depict AV streams to be played and a corresponding piece of PlayList information. FIG. 45A depicts an internal structure of the AV streams, which are identical to the internal structure depicted in FIG. 6B.

FIG. 45B depicts an internal structure of the corresponding piece of PlayList information. In this piece of PlayList information, the PlayItem information 1 includes an STN_table in which four subtitle streams are each assigned with a stream number. The display format information in the STN_table indicates that the display method control according to the user's age is valid. The stream information in the STN_table assigns the stream numbers 1-4 sequentially to the subtitle stream composed of TS packets having the PID "0x1220", the subtitle stream composed of TS packets having the PID "0x1221", the subtitle stream composed of TS packets having the PID "0x1222", and the subtitle stream composed of TS packets having the PID "0x1223". The respective subtitle streams have the language code set to Japanese, Japanese, Japanese, and English and also have the character attribute indicating No (i.e., no subtitles), Hiragana, large-size characters, and No.

In the PlayList information depicted in FIG. 45B, the Extension_Data includes an STN_table_extension in which four subtitle streams are each assigned with a stream number. The display format information in the STN_table indicates that the display method control according to the stereoscopic playback settings is valid. The stream information in the STN_table assigns the stream numbers 6-9 sequentially to the subtitle stream composed of TS packets having the PID "0x1225", the subtitle stream composed of TS packets having the PID "0x1240", the subtitle stream composed of TS packets having the PID "0x1226" and the subtitle stream composed of TS packets having the PID "0x1241". The respective subtitle streams have the language code set to Japanese, Japanese, English, and English and also have the stereoscopic-display information indicating the following settings. The stereoscopic-display information of the stream having the stream number=6 indicates that the stream should be paired with the stream having the stream number=7. The stereoscopic-display information of the stream having the stream number=7 indicates that the stream should be paired with the stream having the stream number=66*l*. The stereoscopic-display information of the stream having the stream number=8 indicates that the stream should be paired with the stream having the stream number=9. The stereoscopic-display information of the stream having the stream number=9 indicates that the stream should be paired with the stream having the stream number=8.

FIG. 46 depicts the specific contents of the subtitles. The run-length data contained in the TS packets having the PID "0x1221" represents the subtitles in Japanese Hiragana alphabet that means "Let's get started!".

The run-length data contained in the TS packets having the PID "0x1222" represents the subtitles with large-size Japanese character that means "Go Game Club".

The run-length data contained in the TS packets having the PID "0x1242" represents the subtitles in English that reads "This is stereogram".

The run-length data contained in the TS packets having the PID "0x1243" represents the subtitles in English that reads "This is stereogram" that is slightly different in display position.

In this specific example, a video stream is multiplexed with, in addition to a subtitle stream representing subtitles in normal-size characters, a subtitle stream representing subtitles in larger-size characters than the normal size. By virtue of this, either of the two subtitle streams is appropriately specified and the graphics decoder outputs the specified subtitle stream. This arrangement eliminates the need to provide the playback apparatus with a function of enlarging subtitles. As a consequence, the playback apparatus can be simplified in structure and manufactured at low cost.

FIG. 47 depict the subtitles displayed by the playback apparatus according to the configuration information indicating that "the user's age=4". FIG. 47A depicts specific details of the configuration information. As depicted in the figure, the value of the PSR 13 indicating the user's age is set to "4", which means that the user is at the age of 4. In addition, the PSR 16, which indicates the language settings, is set to a value corresponding to the "Japanese" language. The stereoscopic capability is set to "No", and the stereoscopic playback flag is set to "OFF". When the playback apparatus having the configuration information described above reads the PlayList information depicted in the figure mentioned above, the procedure described above is executed. As a result, the subtitle stream having the "stream number=2" depicted in FIG. 47B is set to be selected.

As a result, the PSR 2 is set to indicate that stream number=2, which means that the PSR 2 is set to indicate the PID "0x1221", which is associated in the STN_table with the stream number=2 as indicated by FIG. 47C. Accordingly, TS packets having the PID "0x1221" are selectively output to the video decoder 5 as depicted in FIG. 47C. As a result, the Japanese subtitles, which means "Let's get started!!" depicted in FIG. 46 are overlaid on the video images being displayed.

FIG. 48 illustrate the subtitles displayed by the playback apparatus according to the configuration information indicating that "the user's age 70". FIG. 48A depicts specific details of the configuration information. As depicted in the figure, the value of the PSR 13 indicating the user's age is set to "70", which means that the user is at the age of 70. In addition, the PSR 16, which indicates the language settings, is set to a value corresponding to the "Japanese" language. The stereoscopic capability is set to the value indicating "No", and the stereoscopic playback flag is set to "OFF". When the playback apparatus having the configuration information described above reads the PlayList information depicted in the figure mentioned above, the procedure described above is executed. As a result, the subtitle stream having the "stream number=3" depicted in FIG. 47B is set to be selected. As a result, the PSR 2 is set to indicate that stream number=3, which means that the PSR 2 is set to indicate the PID "0x1222", which is associated in the STN_table with the stream number=3 as indicated by FIG. 48C. Accordingly, the demultiplexer 4 selectively output TS packets having the PID "0x1222" to the video decoder 5 as depicted in FIG. 48C. As a result, the Japanese subtitles, which means "Go Game Salon" depicted in FIG. 46 are overlaid on the video images being displayed.

Figure 49E:
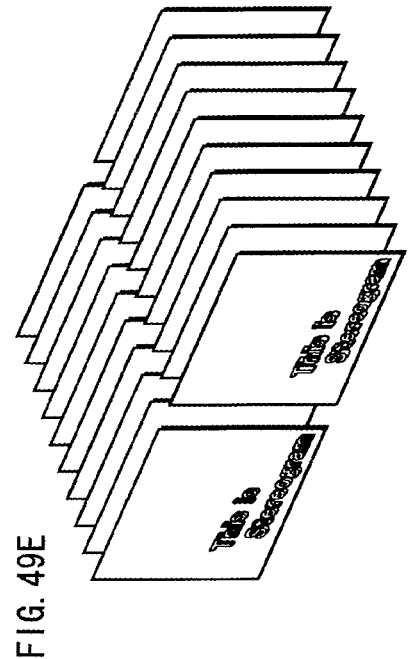
FIGS. 49A-49E depict subtitles displayed by the playback apparatus according to the configuration information indicating that "stereoscopic capability=ON".
Figures 49A, 49B, 49C, 49D:
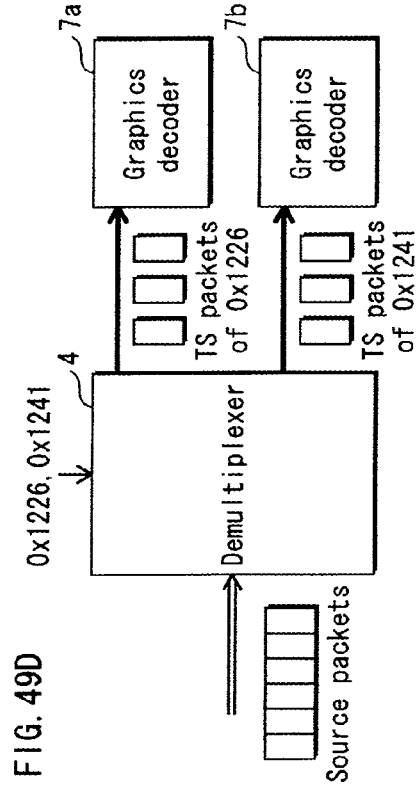

FIG. 49 illustrate the subtitles displayed by the playback apparatus according to the configuration information indicating that "stereoscopic capability ON". FIG. 49A depicts specific details of the configuration information. As depicted in the figure, the stereoscopic capability is set to "ON", and the stereoscopic playback flag is set to "ON". In addition, the PSR 16, which indicates the language settings, is set to a value corresponding to the "English" language. When the playback apparatus having the configuration information described above reads the PlayList information depicted in the figure mentioned above, the procedure described above is executed. As a result, the two subtitle stream having the "stream numbers=8 and 9" depicted in FIG. 49B are set to be selected. As a result, the PSR 2 is set to indicate that stream numbers=8 and 9. Consequently, the demultiplexer 4 is set for the PIDs "0x1226" and "0x1241" which are associated in the STN_table with the stream numbers=8 and 9. Accordingly, TS packets having the PIDs "0x1226" and "0x1241" are selectively output to the video decoder 5. As a result, the English subtitles that reads "This is stereogram" are depicted in FIG. 46 are overlaid to present stereoscopic viewing on the video images being displayed.

(Supplemental Notes)

Up to this point, the description has been given of the best modes of embodying the present invention known by the applicant at the time of filing the present application. However, regarding the following technological topics, further improvements and modifications may be added. It is optional whether to implement the embodiments in the manner described, or to use any of the improvements/modifications, is at the arbitrary discretion of the one implementing the invention.

(Implementation as Recording Apparatus)

The playback apparatus 102 includes a local storage including a built-in media drive and a removable medium drive. Since it is assumed in this structure that the writing will be performed to the built-in media drive and the removable medium, the playback apparatus described in the present specification can be said to have a dual function as a recording apparatus. When the playback apparatus 102 functions as a recording apparatus, the writing of PlayList information is performed according to the following two modes.

i) When the playback apparatus 102 has a function of executing playback of a virtual package, PlayList information is written as follows. That is, when the BD-ROM is loaded, according to a request from an application, additional content corresponding to the BD-ROM is acquired from a WWW server via a network. The acquired additional content includes the PlayList information. In the playback apparatus 102, a control unit that performs recording control writes the acquired PlayList information to the local storage according to a request from the application. By doing this, the contents recorded on the BD-ROM are combined with the additional contents recorded in the local storage to constitute the virtual package.

Here, the BD-ROM has recorded thereon an identifier of a disk root certificate, an identifier of an organization to which BD-ROM contents have been distributed, and a identifier o the BD-ROM. An area in which the additional contents are to be stored is specified by a file path including the disk root certificate identifier, the organization identifier, and the BD-ROM identifier.

The application performs the writing by passing to the control unit the file path that specifies the area in which the additional content is to be stored.

When the local storage has a file system with restrictions on the names of directories and files to be 255 characters or less, the file path used for writing to the local storage includes file names and extensions in a 8.3-format file system in which a directory name is limited to 8 characters or less and a file name as well as an extension name is limited to three characters or less.

ii) When the playback apparatus 102 supports the function of receiving an on-demand manufacturing service or an electronic sales service (MODEST), the PlayList information is written in the following manner.

When the playback apparatus 102 receives PlayList information supplied via the on-demand manufacturing service or the electronic sales service, a default directory and a MODEST directory are created below the root directory of the removable medium, and a BDMV directory is crated be low the MODEST directory. The MODEST directory is a first MODEST directory, which is the MODEST directory that is created when the service is received for the first time. At the time of receiving the service for the second time onward, the control unit of the playback apparatus 102 creates another MODEST directory corresponding to each service.

As described above, upon acquiring PlayList information, the control unit writes a start-up program to the default directory, and writes the PlayList information to the BDMV directory below the MODEST directory. This start-up program is a first program to be executed when the recording medium is loaded in the recording apparatus 102. The start-up program causes the playback apparatus 102 to display a menu allowing a user to make an operation for selecting a BDMV directory. In response to such a user operation, the playback apparatus 102 executes a root change function. In response to a user operation made on the menu, the root change function causes the playback apparatus to recognize as the root directory the MODEST directory to which the selected BDMV directory belongs. The root change function enables executing playback control, by the same control procedure as playing back the BD-ROM, based on the acquired PlayList information.
(Java™ Application)

The BD-J application may be, for example, an Electronic Commerce (EC) client application, or may be an online game played against opponents on the Internet. Furthermore, by working together with a search engine, various online services can be provided to the user.
(Storage Location of Information Specifying Right View or Left View)

In the above example, it is the PlayList that includes information specifying a right-view stream or left-view stream in the case where stereoscopic display is not supported. Yet, this is merely one example and without limitation. For example, the configuration information of the playback apparatus 102 may include the information specifying right-view stream or left-view stream in the case where stereoscopic display is not supported. Accordingly, in the case where stereoscopic display is not supported, the playback apparatus 102 selects either of left- and right streams (select one video stream and one subtitle stream), according to the settings of the configuration information.

The information specifying a right-view stream or left-view stream may be registered into the playback apparatus by the user. Alternatively, a playback status register or general purpose register may be used to register the information specifying either of right- and left-view streams. The thus registered information is usable as configuration information.
(Variations of Nonvolatile Memory)

The non-volatile memory 109 may be implemented by the local storage or by a recording medium writable by the BD drive. Alternatively, the non-volatile memory 109 may be implemented by a medium accessible via the network I/F, as long as the medium is able to retain the stored data irrespective of the state of power supply to the playback apparatus.
(Information Registered in Advance)

User information indicating a preferable character size of subtitles may be registered in advance into the playback apparatus 102 and such information registered in advance may be used as configuration information. Alternatively, information registered in a player status register or a general purpose register included in the PSR set 12 may be used as the configuration information.

With the above arrangement, playback of subtitles is executed to automatically match the needs of the content user, although such needs cannot be known at the time of creating the content.

In addition, the above arrangement eliminates the needs of the content creator to provide a plurality of subtitle streams representing subtitles of differing character sizes. This leads to various advantages, such as the reduction of the required capacity of a recording medium and the reduction of the manufacturing cost of the content.
(Enlargement of Subtitles)

In the above embodiment, in order to display subtitles with large-size characters, a subtitle stream representing subtitles with large-size characters is provided in addition to a subtitle stream representing subtitles with normal-size characters. Alternatively, however, the scaler may enlarge subtitles presented with normal-size characters, if the user is an elderly person.
(Setting to Enable/Disable Function of Automatically Enlarging/Reducing Subtitle Character Size)

A function of enabling/disabling the automatic enlargement/reduction of the character size of subtitles may be provided. If the automatic enlargement/reduction function is enabled, the subtitles are presented with large-size characters. However, if the automatic enlargement/reduction function is disabled, the character size of subtitles is left unchanged even if the user of the playback apparatus 102 is judged to be an elderly person.
(Setting to Enable/Disable of Automatically Changing Alphabet Type of Subtitle Characters)

The playback apparatus 102 may be provided with a function of enabling/disabling the function of automatically changing the alphabet type of subtitles. If the function of automatically changing the subtitles is enabled, the playback apparatus 102 executes the processing as depicted in FIG. 10. However, if the function of automatically changing the subtitles is disabled, the playback apparatus 102 sets the demultiplexer 4 to the subtitle stream corresponding to the "Normal" alphabet type, even if the user of the playback apparatus 102 is judged to be a young child. As a consequence, the demultiplexer 4 demultiplexes the transport stream referred to by the PlayList to be played.
(Preference Settings)

For example, the user of the playback apparatus 102 may register user information indicating the user's age, preferred subtitles (e.g., subtitles in Hiragana are preferred), and so on. The playback apparatus 102 may store and use the user information as the configuration information. Alternatively, information registered in a player status register or a general purpose register included in the PSR set 12 may be used as the configuration information.
(Video Streams for Stereoscopic View)

In the above description, a pair of left- and right-view video streams are recorded on a BD-ROM but this is only one example. An EnhancedView video stream recorded on a BD-ROM may be a video stream with information indicating the depth value of per pixel for each of a plurality of pictures and playback of such a video stream is executed.
(Package to be Implemented)

When implementing an application execution apparatus, the following BD-J Extensions are preferably implemented in the application execution apparatus. The BD-J Extensions include various packages that have been specialized for providing functions exceeding GEM [1.0.2] to a Java™ format. Packages to which BD-J Extensions are provided are as follows.

org.bluray.media

This package provides specialized functions to be added to the Java™ Media FrameWork. Control for angles, audio, and subtitle selection are added to the package.

org.bluray.ti

This package includes a structure for referring to an API for operating by mapping "services" to "titles" according to GEM [1.0.2] and referring to title information from a BD-ROM, and a structure for selecting a new title.

org.bluray.application

This package includes an API for managing the life cycles of applications. Also, this package includes an API for referring to necessary information for signaling when executing applications.

org.bluray.ui

This package includes a class that defines constant numbers for key events specialized in the BD-ROM, and realizes synchronization with the video playback.

org.bluray.vfs

This package provides a binding scheme for binding contents that are recorded on the BD-ROM (on-disk contents) and contents in the Local Storage that are not recorded on the BD-ROM (off-disk contents), so that seamless playback of the contents are enabled regardless of the location of the contents.

The Binding Scheme associates contents residing on the BD-ROM (AV clips, subtitles, BD-J applications) with related contents residing on the Local Storage. This Binding Scheme realizes seamless playback regardless of the location of the contents.

(Application Range of Programming Language)

It is described in the above embodiment that Java™ language is used as the programming language for the virtual machine. However, the programming language is not limited to Java™, and other programming languages, such as B-Shell, Perl Script, and ECMA Script, which are used in UNIX™ OS and the like, may also be used.

(Changing to Multidrive)

The above-described embodiment describe a BD-ROM as an example of a recording medium, and a BD-ROM drive as an example of a specific device having a function of reading data from the BD-ROM. However, a BD-ROM is merely one example, and it is also possible to perform the operations described in the above embodiment when an optical disk medium such as BD-R, BD-RE, DVD, or CD is used as the recording medium, data having the above-described data structure is stored on such recording medium, and there is a drive device capable of reading such recording medium.

The recording media of the embodiments includes all types of package media such as optical disks, semi-conductor memory cards, etc. The recording media of the embodiment is described by way of an example related to an optical disk (for example, an existing read-only optical disk such as a BD-ROM or a DVD-ROM). However, the present invention is not limited to this. For example, it is possible that a terminal device having a function of writing 3D contents (for example, the function may be included in the playback apparatus, or may be included in an apparatus other than the playback apparatus) writes 3D contents, including data that is necessary for implementing the present invention and has been broadcast or distributed over a network, on a writable optical disk (for example, an existing writable optical disk such as BD-RE or DVD-RAM). The present invention may be implanted by executing playback of such a recording medium by the playback apparatus according to the present invention.

Also, it is possible to implement the present invention when the recording medium is, besides an optical disk, for example, a removable medium such as an SD memory card (semiconductor memory card).

Suppose, for example, a semiconductor memory is used instead of a BD-ROM. In this case, the structure depicted in FIG. 35 is modified as follows. That is, data stored in the semiconductor memory is read via an interface into the read buffer 1 and the read buffer 2 and transferred to the virtual file system 3. The virtual file system 3 then transfers the data to the heap memory 21, the dynamic scenario memory 23, the static scenario memory 13, the text subtitle decoder 18, and the demultiplexer 4.

More specifically, the structure depicted in FIG. 35 is modified as follows. That is, when a semiconductor memory card is inserted in a slot (not depicted) in the playback apparatus 102, the playback apparatus 102 and the semiconductor memory card are electrically connected via the memory card I/F. The data recorded on the semiconductor memory card is read, via the memory card I/F, into the read buffer 1 and the read buffer 2, and then transferred to the virtual file system 3. The virtual file system 3 then transfers the data to the heap memory 21, the dynamic scenario memory 23, the static scenario memory 13, the text subtitle decoder 18, and the demultiplexer 4.

From a standpoint, for example, of improving the confidentiality of data and copyright protection, there are cases in which portions of the data recorded on the BD-ROM are encoded as necessary.

For example, encryption may be applied to any of the data recorded on the BD-ROM. Specifically, for example, encryption may be applied to data corresponding to a video stream, data corresponding to an audio stream, and/or data corresponding to a stream that includes both video and audio.

The following describes decrypting encoded data that is among the data recorded on the BD-ROM.

The playback apparatus has stored in advance data corresponding to a key necessary for decrypting encoded data on the BD-ROM (for example, a device key).

On the other hand, the BD-ROM has recorded thereon data corresponding to the key necessary for decrypting encoded data (for example, an MKB (media key block) corresponding to the device key). The BD-ROM also has recorded thereon the key itself, for decrypting the encoded data, encoded (for example an encoded title key corresponding to the device key and the MKB), is recorded. Here, the device key, the MKB, and the encoded title key correspond to each other, and furthermore correspond to an identifier (for example, a volume ID) written in an area that cannot be normally copied on the BD-ROM (an area called BCA). If this combination is not correct, the code cannot be deciphered. Only if the combination is correct, the key necessary for deciphering the code (for example, a decoded title key obtained by decoding the encoded title key based on the device key, the MKB and volume key, can be derived, and with use of the key necessary for the encoding, the encoded data can be deciphered.

When the inserted BD-ROM is played back in the playback apparatus, encoded data cannot be played back unless the BD-ROM includes a device key that is paired with a title key or MKB (or corresponds to a title key or MKB). The reason is that the key necessary for deciphering the encoded data (the title key) is itself encoded when recorded on the BD-ROM (as an encoded title key), and if the combination of the MKB and the device key is not correct, the key necessary for deciphering the code cannot be derived.

On the other hand, the playback apparatus is configured so that, if the combination of the encoded title key, MKB, device key, and volume ID is correct, the video stream is decoded, for example with use of the key necessary for deciphering the code (the decoded title key obtained by decoding the encoded title key based on the device key, the MKB and the volume ID), and the audio stream is decoded by the audio decoder.

Although in the present embodiments, a BD-ROM is described as an example of a recording medium, the recording medium is not limited to being a BD-ROM, and the present invention can be implemented even when using, for example, a readable/writable semiconductor memory (for example, a semiconductor memory card having a nonvolatile property such as an SD card).

For example, the playback apparatus may be configured to record data corresponding to data recorded on the BD-ROM on a memory card with use of digital distribution, and to play back the data from the semiconductor memory card. When distributing the necessary data with use of digital distribution and recording the distributed data, it is preferable to distribute the data after having performed partial or entire decoding of the distributed data as necessary, and leaving data that is necessary for the semiconductor memory card in an encoded state.

The following describes operation using, for example, digital distribution, for recording data (distributed data) corresponding to the data described in the above embodiments on the semiconductor memory.

The playback apparatus described in the embodiments may be configured to perform the operations described above. Alternatively, the operations described above may be performed by a terminal apparatus dedicated to recording distributed data on a semiconductor memory that is separate from the playback apparatus in the embodiments. Here, an example of the playback apparatus performing the operations is described. Also, an SD card is described as an example of the recording destination.

When recording distributed data to the SD memory card inserted in the slot of the playback apparatus, first, transmission is requested of the distributed data to a distribution server (not depicted) that accumulates the distributed data. The playback apparatus reads, from the SD memory card, information for uniquely identifying the SD memory card that is inserted at the playback apparatus at this time (for example, a specific identification number assigned individually to the particular SD memory card, more specifically, a serial number of the SD memory card, etc.), and transmits the read identification information to the distribution server along with the distribution request.

This identification information for uniquely identifying the SD memory card corresponds to, for example, the above-described volume ID.

Meanwhile, in the distribution server, decoding is performed so that necessary data among the data that is distributed (video streams, audio streams, etc.) can be deciphered with use of the key that is necessary for deciphering the code (for example, the title key), and the necessary data is stored in the server.

For example, a private key is stored in the distribution server, and the distribution server is configured so that different public keys are dynamically created to correspond respectively to the semiconductor memory card-specific identification numbers.

Also, the distribution server is configured so that encoding is possible towards the key that is necessary for deciphering the encoded data itself (the title key) (in other words, configured so that an encoded title key can be generated).

The generated public key information includes information corresponding to the above-described MKB, volume ID, and encoded title key. If the combination of, for example, the semiconductor memory card-specific identification number, the actual public key included in the public key information described later, and the device key recorded in advance in the recording apparatus, is correct, the key necessary for deciphering the code (for example, the title key obtained by decoding the encoded title key based on, for example, the device key, the MKB, and the semiconductor memory card-specific identification number) is acquired, and with use of this acquired key (title key) necessary for deciphering the code, decoding of the encoded data can be performed.

Next, the playback apparatus records the received public key information and distributed data in the recording area of the semiconductor memory card inserted in the slot.

Next, the following describes an exemplary method for decoding and playing back encoded data, from among the data included in the public key information recorded in the recording area of the semiconductor memory card and the data included in the distribution data.

The received public key information is, for example, recorded on a device list indicating the public key itself (for example, the MKB and the encoded title key), signature information, the semiconductor memory card-specific identification number, and information pertaining to a device to be invalidated.

The signature information includes, for example, hash values of the public key information.

In the device list, information is recorded pertaining to, for example, an apparatus that is possibly performing unauthorized playback. This is for example a device key, an identification number of the playback apparatus, or an identification number of a decoder in the playback apparatus recorded in advance on the playback apparatus, information for uniquely specifying the device, a part included in the apparatus, or a function (program) of the apparatus possibly performing unauthorized playback.

The following description pertains to playback of encoded data from among the distribution data recorded in the recording area of the semiconductor memory card.

First, a check is performed pertaining to whether the encoded key itself may be operated before decoding the encoded data with use of the public key itself.

Specifically, the following checks are performed:

(1) whether there is a match between the semiconductor memory identification information included in the public key information and the specific identification number stored in advance on the semiconductor memory card, (2) whether there is a match between a hash value of the public key information calculated in the playback apparatus, and a hash value included in the signature information, and (3) whether, based on information indicated in the device list included in the public key information, the playback apparatus performing playback is possibly performing unauthorized playback (for example, by checking whether the device key included in the device list matches the device key stored in the playback apparatus in advance). These checks may be performed in any order.

Control is performed so that the playback apparatus does not decode the encoded data if any of the following is satisfied, in the above-described checks 1 to 3: i) the semiconductor memory-specific identification information included in the public key information does not match the specific identification number stored in advance on the semiconductor memory card, ii) the hash value of the public key information calculated in the playback apparatus does not match the hash value included in the signature information, or iii) a judgment is made that the playback apparatus performing the playback is possibly performing unauthorized playback.

Also, a judgment is made that the combination of the semiconductor memory-specific identification number, the public key included in the public key information, and the device key recorded in advance in the playback apparatus, is correct if i) the semiconductor memory card-specific identification information included in the public key information matches the specific identification number saved on the semiconductor memory card in advance, (ii), the hash value of the public key information calculated in the playback apparatus matches the hash value included in the signature information, and (iii) a judgment is made that the playback apparatus is not possibly performing unauthorized playback. When the combination is judged to be correct, the encoded data is deciphered with use of the key necessary for deciphering the code (based on a device key, the MKB and the semiconductor memory-specific identification number).

For example, when the encoded data is a video stream and an audio stream, the video decoder decodes (decodes) the video stream with use of the key necessary for deciphering the code (the title key obtained by decoding the encoded title key), and the audio decoder decodes (decodes) the audio stream with use of the key necessary for deciphering the code.

According to this type of structure, for any playback apparatus, parts, function (program), etc. that is possibly performing unauthorized use at the time of electronic distribution, information for the identification of such is provided to the device list, and if distribution is attempted, since playback decoding with use of public key information (the public key) can be suppressed on the playback apparatus side if information is included that is indicated in the device list, even if the combination of the semiconductor memory-specific identification number, the public key included in the public key information, and the device key recorded in the playback apparatus in advance, is correct, since control can be performed so that the deciphering of the encoded data is not performed, use of distributed data on an unauthorized device can be suppressed.

Also, it is preferable to use a structure in which the semiconductor memory card-specific identifier recorded in advance on the semiconductor memory card is stored in a highly confidential recording area. The reason is that when the specific number recorded on the semiconductor memory card (for example, in the example of an SD memory card, the SD memory card serial number, etc.) has been altered, illegal copying is facilitated. The reason is that different specific identification numbers are allocated to different semiconductor memory cards, but if the specific identification numbers are altered to be the same, the judgment in (1) becomes meaningless, and there is a possibility of illegal copying, corresponding to the number that was altered, being performed.

Accordingly, it is preferable for the information that is the semiconductor memory card-specific identification number to be recorded in a high-confidentiality recording area.

To realize this type of structure, for example by providing a recording area (called a second recording area) that is separate from the recording area (called a first recording area) that stores normal data as recording areas for recording high-confidentiality data that is semiconductor memory card-specific identifiers), and providing a control circuit for accessing the recording area, access to the second recording area can be made only via the control circuit.

For example, the data recorded in the second recording area has been encoded and recorded. For example, a circuit for decoding the encoded data is built into the control circuit. When there is access of the data in the second recording area via the control circuit, the structure need merely be such that the code is decoding and the decoded data is returned. Also, if the control circuit stores information of a storage location of data recorded in the second recording area, and there is a request to access the data, the corresponding storage location of the data need merely be specified, and the data read from the specified storage location be returned.

Upon issuing an access request to the data recorded in the second recording area to the control circuit via the memory card I/F (for example, semiconductor memory-specific identification number), applications that operate in the playback apparatus that request recording to the semiconductor memory card with use of digital distribution, the control circuit that received the request reads the data recorded in the second recording area and returns the data to the application operating in the playback apparatus. Along with the semiconductor memory card-specific identification number, the distribution request for the necessary data need only be requested from the distribution server, and the public key information sent from the distribution server and the corresponding request for distribution of the data, may be recorded to the first recording area.

Also, an application operating in the playback apparatus, that requests recording on the semiconductor memory card with use of digital distribution, before issuing the request to the control circuit via the memory card I/F to access the data recorded on the second recording area (for example, the semiconductor memory card-specific identification numbers), preferably checks in advance whether the application has been altered. For example, a digital certificate compliant with preexisting X.509 specifications may be used in the check for alteration.

Also, access to the distribution data recorded in the first recording area of the semiconductor memory card need not necessarily be access via a control circuit on the semiconductor memory card.

(Implementation as a Program)

The application program described in the embodiments can be made as described below. First, the software developer, with use of a programming language, writes a source program to realize the content of the flowcharts and the functional structural elements. When writing the source program that embodies the content of the flowcharts and the functional structural elements, the software developer uses the class structures, variables, array variables, and external function calls to write the program in accordance with the syntax of the programming language.

The written source programs are given as files to a compiler. The compiler translates the source programs and creates an object program.

The translation by the compiler is made up of the processes of syntax analysis, optimization, resource allocation, and code generation. Syntax analysis involves performing lexical analysis and semantic analysis of the source programs, and converting the source programs to an intermediary program. Optimization involves performing operations to divide the intermediary program into basic blocks, analyze the control flow of the intermediary program, and analyze the data flow of the intermediary program. In resource allocation, to improve suitability with a command set of a targeted processor, variables in the intermediary program are allocated to a register or a memory in a targeted processor. Code generation is performed by converting the intermediary commands in the intermediary program into program code, and obtaining an object program.

The object program generated here is made up of one or more program codes for executing, on a computer, the steps of the flowcharts and the various processes carried out by the functional structural elements in the embodiments. Here, program code may be any of various types such as native code of a processor or JAVA byte code. There are various formats for realization of the steps by the program code. If it is possible to use external functions to realize the steps, call statements that call such functions become program code. Also, there are cases in which a program code for realizing one step is attributed to separate object programs. In a RISC processor in which command types are limited, the steps of the flowcharts may be realized by combining calculation operation commands, logical calculation commands, branch instruction commands, etc.

When the object programs have been created, the programmer starts up a linker. The linker allocates the object programs and library programs to memory spaces, combines the object programs and library programs into one, and generates a load module. The load module generated thus is anticipated to be read by a computer, and causes the computer to execute the processing procedures and functional structural components shown in the flowcharts. The programs may be provided to users by being recorded on a recording medium that is readable by a computer.

(Implementation as LSI Alone)

The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Planar view Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus 102.

Such a system LSI can be embedded into various types of devices that can play back images, such as a television, game machine, personal computer, one-segment mobile phone, as well as into the playback apparatus 102. The system LSI thus greatly broadens the use of the present invention.

When an elementary buffer, video decoder, audio decoder, and graphics decoder are integrated into a system LSI, it is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback apparatus 101 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

In the embodiment, the invention is realized by middleware and hardware corresponding to the system LSI, hardware other than the system LSI, an interface portion corresponding to the middleware, an interface portion to intermediate between the middleware and the system LSI, an interface portion to intermediate between the middleware and the necessary hardware other than the system LSI, and a user interface portion, and when integrating these elements to form the playback apparatus, particular functions are provided by operating the respective elements in tandem.

Appropriately defining the interface corresponding to the middleware and the interface for the middleware and the system LSI enables parallel, independent development of the user interface portion, the middleware portion, and the system LSI portion of the playback apparatus respectively, and enables more efficient development. Note that there are various ways of dividing up the respective interface portions. For example, when the described video recorders 5a and 5b, audio decoder 9, color conversion units 15a and 15b, composite units 17a and 17b included in the system LSI 106 are fabricated on a single chip, development of an interface portion between the middleware to control these units and the middleware corresponding to these units is performed when developing the chip. After completion, including the developed middleware and interface portion in a storage unit such as a memory of the playback apparatus, along with integrating the chip into the playback apparatus, enables performing development of the playback apparatus and the chip in parallel, thereby improving development efficiency.

Versatility is improved when the same interface portion is used regardless of the type of developed chip and the middleware pertaining to the developed chip.

Needless to say, the portion structured as a system LSI in the above description is not limited to being structured as an LSI, and may instead be configured with use of a signal processing circuit that includes corresponding functions to those to be included in the system LSI.

Industrial Applicability

A recording medium, playback apparatus and playback method of the present invention enable dynamically switching between a monoscopic display and a stereoscopic display and highly usable in a movie industry concerned with the creation of AV contents, and a commercial equipment industry concerned with manufacture of equipment to perform such processing. For example, the present invention can be used as a BD-ROM disk, a BD-ROM player, etc.

| Reference Sings List | |
|---|---|
| 1, 2 | Read buffer |
| 3 | Virtual file system |
| 4 | Demultiplexer |
| 5a, 5b | Video decoder |
| 6a, 6b | Video plane |
| 7a, 7b | Graphics decoder |
| 8a, 8b | Graphics plane |
| 9 | Audio decoder |
| 10 | HDMI interface |
| 12 | Player status/setting register set |
| 13 | Static scenario memory |
| 14 | Playback control engine |
| 15a, 15b | Color conversion unit |
| 16a, 16b | Scaler unit |
| 17a, 17b | Composite unit |
| 18 | Text subtitle decoder |
| 21 | Heap memory |
| 22 | BD-J platform |
| 23 | Dynamic scenario memory |
| 24 | Mode management module |
| 25 | Command interpreter |
| 26 | UO detection module |
| 101 | BD-ROM |
| 102 | Playback apparatus |
| 103 | Television |
| 104 | Goggles |
| 105 | Front end unit |
| 106 | System LSI |
| 107 | Memory device |
| 108 | Back end unit |
| 109 | Nonvolatile memory |
| 110 | Host microcomputer |
| 111 | Network I/F |
| 112 | BD-ROM drive |
| 113 | Local storage |

What is claimed is:

1. A playback apparatus for executing playback of a subtitle stream recorded on a recording medium in synchronization with a video stream, the recording medium having subtitle streams and PlayList information, the PlayList information including playback section information and a display method flag, the playback section information defining a playback section by using information indicating an IN time that indicates a playback start point and an OUT time that indicates a playback end point on a playback time axis of the video stream, the playback section information including a first stream information table, the display method flag indicating whether stereoscopic display of subtitles is valid in the playback section, the first stream information table specifying a monoscopic subtitle stream to be used for presenting monoscopic display of subtitles in the playback section, if the display method flag indicates that stereoscopic display of subtitles is valid, the playlist information further including a second stream information table, the second stream information table specifying a left-view subtitle stream and a right-view subtitle stream used for presenting stereoscopic display of subtitles in the playback section, the playback apparatus comprising:
  a configuration storage operable to store configuration information of the playback apparatus;
  an acquirer operable to acquire, from a display connected to the playback apparatus, information indicating whether the display is capable of stereoscopic display,
  a judger operable to judge whether the configuration information indicates that the playback apparatus is set to enable stereoscopic display of subtitles, and whether the information acquired by the acquirer indicates that the display is capable of stereoscopic display,
  a selector operable to:
    select the left-view subtitle stream and the right-view subtitle stream specified by the second stream information table as the subtitle streams to be played back in synchronization with the video stream, if the judger judges that:
      the playback apparatus is set to enable stereoscopic display of subtitles;
      the display is capable of stereoscopic display; and
      the display flag indicates that stereoscopic display of subtitles is valid in the playback section; and
    select the monoscopic subtitle stream specified by the first stream information table as the subtitle stream to be played back in synchronization with the video stream, if the judger judges that one of:
      the playback apparatus is not set to enable stereoscopic display of subtitles; and
      the display is not capable of stereoscopic display; and
  a player operable to execute playback of each selected subtitle stream in synchronization with the video stream.

2. The playback apparatus of claim 1, wherein
the stereoscopic display of subtitles is realized by creating stereoscopic viewing by alternately displaying right-view subtitles obtained from the right-view subtitle stream and left-view subtitles obtained from the left-view subtitle stream.

3. The playback apparatus of claim 1, further comprising:
a demultiplexer, wherein
the player includes:
- a graphics decoder operable to decode the left-view subtitle stream to acquire left-view subtitles;
- a graphics decoder operable to decode the right-view subtitle stream to acquire right-view subtitles; and
- a video decoder operable to decode the video stream to acquire video images, the demultiplexer is operable to perform packet filtering to selectively output, to the video decoder and the graphics decoders, TS packets having a packet identifier specified by the selector from among a plurality of TS packets constituting the video stream, the right-view subtitle stream, and the left-view subtitle stream, and if the stereoscopic display of subtitles is valid, the selector is operable to make a selection by acquiring two packet identifiers of the two subtitle streams from the second stream information table and instructing the demultiplexer to perform the packet filtering based on the two packet identifiers.

4. The playback apparatus of claim 1, wherein the second stream information table is extended data included in the playlist information.

5. A playback method for execution by a computer to playback a subtitle stream recorded on a recording medium in synchronization with a video stream,
the recording medium having subtitle streams and PlayList information,
the PlayList information including playback section information and a display method flag,
the playback section information defining a playback section by using information indicating an IN time that indicates a playback start point and an OUT time that indicates a playback end point on a playback time axis of the video stream, the playback section information including a first stream information table,
the display method flag indicating whether stereoscopic display of subtitles is valid in the playback section,
the first stream information table specifying a monoscopic subtitle stream to be used for presenting monoscopic display of subtitles in the playback section, and
the computer having a configuration storage storing configuration information of the computer,
the playback method comprising:
  acquiring, from a display connected to the computer, information indicating whether the display is capable of stereoscopic display,
  judging whether the configuration information indicates that the computer is set to enable stereoscopic display of subtitles, and whether the information acquired in the acquiring indicates that the display is capable of stereoscopic display,
  selecting a left-view subtitle stream and a right-view subtitle stream specified by a second stream information table as the subtitle streams to be played back in synchronization with the video stream, if the judging judges that:
    the computer is set to enable stereoscopic display of subtitles;
    the display is capable of stereoscopic display; and
    the display flag indicates that stereoscopic display of subtitles is valid in the playback section; and
  selecting the monoscopic subtitle stream specified by the first stream information table as the subtitle stream to be played back in synchronization with the video stream, if the judging judges that one of:
    the computer is not set to enable stereoscopic display of subtitles; and
    the display is not capable of stereoscopic display; and
  executing playback of the selected subtitle streams in synchronization with the video stream.

6. A non-transitory computer-readable medium including a program comprising code operable to cause a computer to execute a playback method of playing back a subtitle stream recorded on a recording medium in synchronization with a video stream,
the recording medium having subtitle streams and PlayList information,
the PlayList information including playback section information and a display method flag,
the playback section information defining a playback section by using information indicating an IN time that indicates a playback start point and an OUT time that indicates a playback end point on a playback time axis of the video stream, the playback section information including a first stream information table,
the display method flag indicating whether stereoscopic display of subtitles is valid in the playback section,
the first stream information table specifying a monoscopic subtitle stream to be used for presenting monoscopic display of subtitles in the playback section, and
the computer having a configuration storage storing configuration information of the computer,
the playback method comprising:
  acquiring, from a display connected to the computer, information indicating whether the display is capable of stereoscopic display,
  judging whether the configuration information indicates that the computer is set to enable stereoscopic display of subtitles, and whether the information acquired in the acquiring indicates that the display is capable of stereoscopic display,
  selecting a left-view subtitle stream and a right-view subtitle stream specified by a second stream information table as the subtitle streams to be played back in synchronization with the video stream, if the judging judges that:
    the computer is set to enable stereoscopic display of subtitles;
    the display is capable of stereoscopic display; and
    the display flag indicates that stereoscopic display of subtitles is valid in the playback section; and
  selecting the monoscopic subtitle stream specified by the first stream information table as the subtitle stream to be played back in synchronization with the video stream, if the judging judges that one of:
    the computer is not set to enable stereoscopic display of subtitles; and
    the display is not capable of stereoscopic display; and
  executing playback of the selected subtitle streams in synchronization with the video stream.

* * * * *